US010423273B2

(12) United States Patent
Leigh et al.

(10) Patent No.: US 10,423,273 B2
(45) Date of Patent: Sep. 24, 2019

(54) DIFFERENTIAL TRANSMISSION FOR REDUCTION OF CROSS-TALK IN PROJECTIVE CAPACITIVE TOUCH SENSORS

(71) Applicant: Tactual Labs Co., New York, NY (US)

(72) Inventors: Darren Leigh, Round Hill, VA (US); Clifton Forlines, South Portland, ME (US)

(73) Assignee: Tactual Labs Co., New York, NY (US)

( * ) Notice: Subject to any disclaimer, the term of this patent is extended or adjusted under 35 U.S.C. 154(b) by 0 days.

(21) Appl. No.: 15/827,885

(22) Filed: Nov. 30, 2017

(65) Prior Publication Data

US 2018/0095592 A1    Apr. 5, 2018

Related U.S. Application Data

(62) Division of application No. 14/812,529, filed on Jul. 29, 2015.

(60) Provisional application No. 62/088,924, filed on Dec. 8, 2014.

(51) Int. Cl.
| | | |
|---|---|---|
| *G06F 3/041* | (2006.01) | |
| *G06F 3/044* | (2006.01) | |
| *G06F 3/0354* | (2013.01) | |
| *G06F 3/042* | (2006.01) | |

(52) U.S. Cl.
CPC ........ *G06F 3/0416* (2013.01); *G06F 3/03545* (2013.01); *G06F 3/041* (2013.01); *G06F 3/042* (2013.01); *G06F 3/044* (2013.01); *G06F 3/0418* (2013.01); *G06F 2203/04104* (2013.01); *G06F 2203/04108* (2013.01); *G06F 2203/04109* (2013.01)

(58) Field of Classification Search
CPC ...................................... G06F 3/044
See application file for complete search history.

(56) References Cited

U.S. PATENT DOCUMENTS

| | | | | |
|---|---|---|---|---|
| 2008/0012835 A1* | 1/2008 | Rimon | ..................... | G06F 3/038 345/173 |
| 2011/0063251 A1* | 3/2011 | Geaghan | ................. | G06F 3/044 345/174 |
| 2011/0084857 A1* | 4/2011 | Marino | ................... | G06F 3/044 341/5 |

(Continued)

*Primary Examiner* — Amr A Awad
*Assistant Examiner* — Stephen A Bray
(74) *Attorney, Agent, or Firm* — Adam Landa

(57) ABSTRACT

Differential transmission is provided in a capacitive sensor for reducing cross-talk between rows and columns. A capacitive touch sensitive device as disclosed herein includes row conductors and column conductors, a first row signal generator for transmitting a first row signal on a first row conductor, a second row signal generator for transmitting a second row signal on a second row conductor, and a touch processor for identifying a touch event on the touch interface by processing signals present on at least one of the column conductors. The first and second row signals together form a differential row group of signals that cancel each other out or at least substantially mitigate each other so as to reduce cross-talk interference in the sensor.

38 Claims, 35 Drawing Sheets

(56) References Cited

U.S. PATENT DOCUMENTS

| | | | | |
|---|---|---|---|---|
| 2014/0347076 A1* | 11/2014 | Barton | ............... | G06F 3/0488 324/663 |
| 2015/0193041 A1* | 7/2015 | Shepelev | ............... | G06F 3/044 345/174 |
| 2015/0301631 A1* | 10/2015 | Mirfakhraei | ............... | G06F 3/044 345/173 |
| 2016/0103525 A1* | 4/2016 | Snelgrove | ............... | G06F 3/044 345/174 |

* cited by examiner

Column signals resulting from a touch event with little cross-talk

Column signals resulting from a touch event with significant cross-talk.

DIFFERENTIAL TRANSMISSION FOR REDUCTION OF CROSS-TALK IN PROJECTIVE CAPACITIVE TOUCH SENSORS

FIELD

The disclosed system and method relate in general to the field of user input, and in particular to user input systems which provide differential transmission of signals in a fast projective capacitive touch sensor.

BRIEF DESCRIPTION OF THE DRAWINGS

The foregoing and other objects, features, and advantages of the disclosure will be apparent from the following more particular description of embodiments as illustrated in the accompanying drawings, in which reference characters refer to the same parts throughout the various views. The drawings are not necessarily to scale, emphasis instead being placed upon illustrating principles of the disclosed embodiments.

Figure 1:
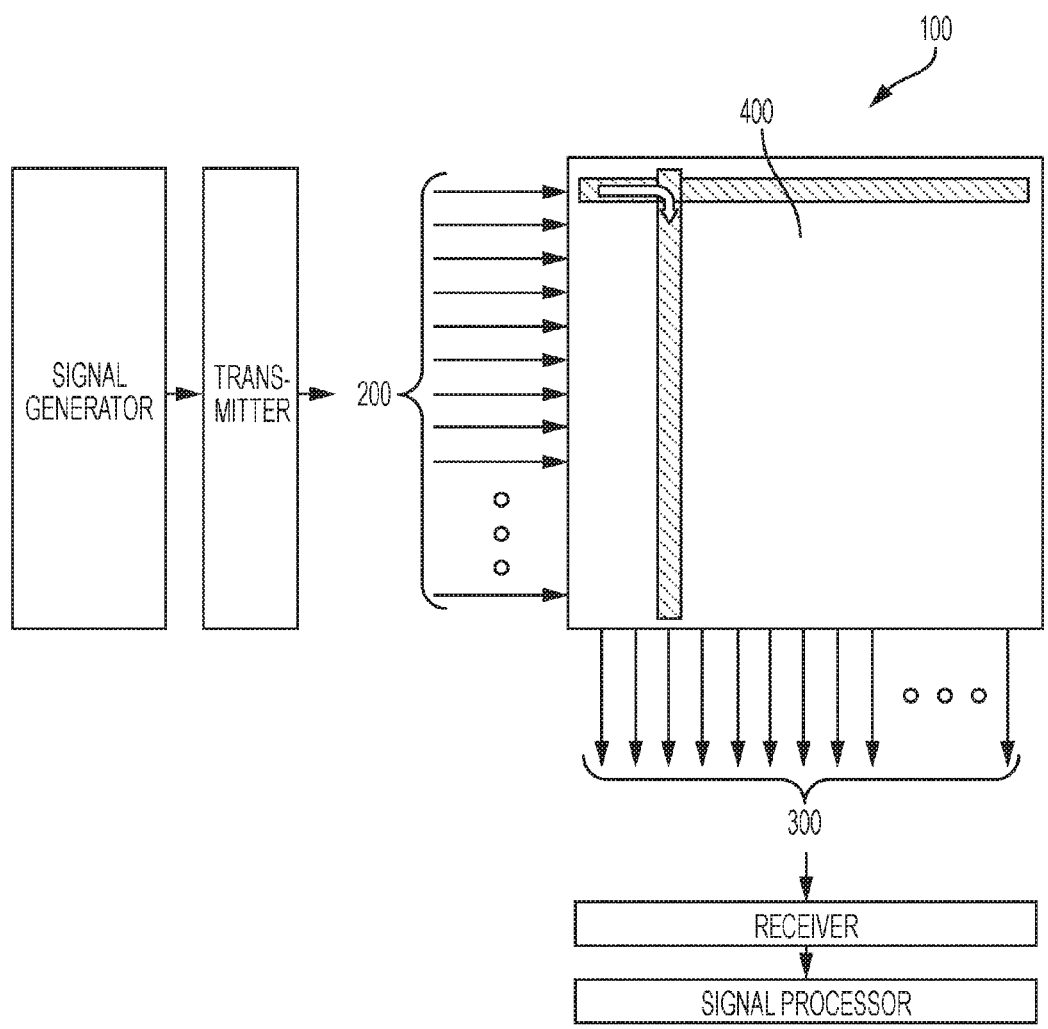
FIG. 1 provides a high level block diagram illustrating an embodiment of a low-latency touch sensor device.

Reference will now be made in detail to the preferred embodiments of the present invention, examples of which are illustrated in the accompanying drawings. The following description and drawings are illustrative and are not to be construed as limiting. Numerous specific details are described to provide a thorough understanding. However, in certain instances, well-known or conventional details are not described in order to avoid obscuring the description. References to one or an embodiment in the present disclosure are not necessarily references to the same embodiment; and, such references mean at least one.

DETAILED DESCRIPTION

This application relates to user interfaces such as the fast multi-touch sensors and other interfaces disclosed in U.S. patent application Ser. No. 14/466,624 filed Aug. 22, 2014 entitled "Orthogonal Signaling Touch User, Hand and Object Discrimination Systems and Methods," the entire disclosure of which is incorporated herein by reference.

In various embodiments, the present disclosure is directed to systems and methods for providing and operating projective capacitive touch sensitive devices. In an embodiment, the device includes a touch interface having row conductors and column conductors, a first row signal generator for transmitting a first row signal on a first row conductor, a second row signal generator for transmitting a second row signal on a second row conductor, and a touch processor for identifying a touch event on the touch interface by processing signals present on at least one of the column conductors.

The presently disclosed differential transmission systems and methods are advantageous in connection with capacitive touch sensors, and particularly with projective capacitive touch sensors that employ a multiplexing scheme based on orthogonal signaling such as but not limited to frequency-division multiplexing (FDM), code-division multiplexing (CDM), or a hybrid modulation technique that combines both FDM and CDM methods. References to frequency herein could also refer to other orthogonal signal bases. As such, this application incorporates by reference Applicants' prior U.S. patent application Ser. No. 13/841,436, filed on Mar. 15, 2013 entitled "Low-Latency Touch Sensitive Device" and U.S. patent application Ser. No. 14/069,609 filed on Nov. 1, 2013 entitled "Fast Multi-Touch Post Processing." These applications contemplate capacitive FDM, CDM, or FDM/CDM hybrid touch sensors which may be used in connection with the presently disclosed systems and methods. In such sensors, touches are sensed when a signal from a row is coupled to a column and received on that column.

This disclosure will first describe the operation of fast multi-touch sensors to which the present system and method for differential transmission can be applied. Details of the presently disclosed differential transmission systems and methods are then described further below under the heading "Differential Transmission."

As used herein, the phrase "touch event" and the word "touch" when used as a noun include a near touch and a near touch event, or any other gesture that can be identified using a sensor. In accordance with an embodiment, touch events may be detected, processed and supplied to downstream computational processes with very low latency, e.g., on the order of ten milliseconds or less, or on the order of less than one millisecond. Throughout this disclosure, the terms "touch", "touches," "contact," "contacts" or other descriptors may be used to describe events or periods of time in which a user's finger, a stylus, an object or a body part is detected by the sensor. In some embodiments, these detections occur only when the user is in physical contact with a sensor, or a device in which it is embodied. In other embodiments, the sensor may be tuned to allow the detection of "touches" or "contacts" that are hovering a distance above the touch surface or otherwise separated from the touch sensitive device. Therefore, the use of language within this description that implies reliance upon sensed physical contact should not be taken to mean that the techniques described apply only to those embodiments; indeed, nearly all, if not all, of what is described herein would apply equally to "touch" and "hover" sensors. Other types of sensors can be utilized in connection with the embodiments disclosed herein, including a camera, a proximity sensor, an optical sensor, a turn-rate sensor, a gyroscope, a magnetometer, a thermal sensor, a pressure sensor, a force sensor, a capacitive touch sensor, a power-management integrated circuit reading, a keyboard, a mouse, a motion sensor, and the like.

In an embodiment, the disclosed fast multi-touch sensor utilizes a projected capacitive method that has been enhanced for high update rate and low latency measurements of touch events. The technique can use parallel hardware and higher frequency waveforms to gain the above advantages. Also disclosed are methods to make sensitive and robust measurements, which methods may be used on transparent display surfaces and which may permit economical manufacturing of products which employ the technique. In this regard, a "capacitive object" as used herein could be a finger, other part of the human body, a stylus, or any object to which the sensor is sensitive. The sensors and methods disclosed herein need not rely on capacitance. With respect to the optical sensor embodiment disclosed below, such embodiments utilize photon tunneling and leaking to sense a touch event, and a "capacitive object" as used herein includes any object, such as a stylus or finger, that that is compatible with such sensing. Similarly, "touch locations" and "touch sensitive device" as used herein do not require actual touching contact between a capacitive object and the disclosed sensor.

FIG. 1 illustrates certain principles of a fast multi-touch sensor 100 in accordance with an embodiment. At reference no. 200, a different signal is transmitted into each of the surface's rows. The signals are designed to be "orthogonal", i.e. separable and distinguishable from each other. At reference no. 300, a receiver is attached to each column. The receiver is designed to receive any of the transmitted signals, or an arbitrary combination of them, and to individually measure the quantity of each of the orthogonal transmitted signals present on that column. The touch surface 400 of the sensor comprises a series of rows and columns (not all shown), along which the orthogonal signals can propagate. In an embodiment, the rows and columns are designed so that, when they are not subject to a touch event, a lower or negligible amount of signal is coupled between them, whereas, when they are subject to a touch event, a higher or non-negligible amount of signal is coupled between them. (In an embodiment, the opposite could hold—having the lesser amount of signal represent a touch event, and the greater amount of signal represent a lack of touch.) As discussed above, the touch, or touch event does not require a physical touching, but rather an event that affects the level of coupled signal.

With continued reference to FIG. 1, in an embodiment, generally, the capacitive result of a touch event in the proximity of both a row and column may cause a non-negligible amount of signal present on the row to be coupled to the column. More generally, touch events cause, and thus correspond to, the received signals on the columns. Because the signals on the rows are orthogonal, multiple row signals can be coupled to a column and distinguished by the receiver. Likewise, the signals on each row can be coupled to multiple columns. For each column coupled to a given row, the signals found on the column contain information that will indicate which rows are being touched simultaneously with that column. The quantity of each signal received is generally related to the amount of coupling between the column and the row carrying the corresponding signal, and thus, may indicate a distance of the touching object to the surface, an area of the surface covered by the touch and/or the pressure of the touch.

When a row and column are touched simultaneously, some of the signal that is present on the row is coupled into the corresponding column. (As discussed above, the term touch or touched does not require actual physical contact, but rather, relative proximity.) Indeed, in various implementations of a touch device, physical contact with the rows and/or columns is unlikely as there may be a protective barrier between the rows and/or columns and the finger or other object of touch. Moreover, generally, the rows and columns themselves are not in touch with each other, but rather, placed in a proximity that prevents more than a negligible amount of signal to be coupled there-between. Generally, the row-column coupling results not from actual contact between them, nor by actual contact from the finger or other object of touch, but rather, by the capacitive effect of bringing the finger (or other object) into close proximity—which close proximity resulting in capacitive effect is referred to herein as touch.)

The nature of the rows and columns is arbitrary and the particular orientation is irrelevant. Indeed, the terms row and column are not intended to refer to a square grid, but rather to a set of conductors upon which signal is transmitted (rows) and a set of conductors onto which signal may be coupled (columns). It is not even necessary that the rows and columns be in a grid at all. Other shapes are possible as long as a touch event will touch part of a "row" and part of a "column", and cause some form of coupling. For example, the "rows" could be in concentric circles and the "columns" could be spokes radiating out from the center. Moreover, it is not necessary for there to be only two types signal propagation channels: instead of rows and columns, in an embodiment, channels "A", "B" and "C" may be provided, where signals transmitted on "A" could be received on "B" and "C", or, in an embodiment, signals transmitted on "A" and "B" could be received on "C". It is also possible that the signal propagation channels can alternate function, sometimes supporting transmitters and sometimes supporting receivers. Three or more types of antenna conductors may be used rather than just "rows" and "columns." Many alternative embodiments are possible and will be apparent to a person of skill in the art after considering this disclosure.

As noted above, in an embodiment the touch surface 400 comprises of a series of rows and columns, along which signals can propagate. As discussed above, the rows and columns are designed so that, when they are not being touched, a negligible amount of signal is coupled between them. Moreover, a different signal is transmitted into each of the rows. In an embodiment, each of these different signals are orthogonal (i.e. separable and distinguishable) from one another. When a row and column are touched simultaneously, a non-negligible amount of the signal that is present on the row is coupled into the corresponding column. The quantity of the signal that is coupled onto a column may be related to the pressure or area of touch.

A receiver 300 is attached to each column. The receiver is designed to receive non-negligible amounts of any of the orthogonal signals, or an arbitrary combination of the orthogonal signals, and to identify the columns providing non-negligible amounts of signal. In an embodiment, the receiver may measure the quantity of each of the orthogonal transmitted signals present on that column. In this manner, in addition to identifying the rows in touch with each column, the receiver can provide additional (e.g., qualitative) information concerning the touch. In general, touch events may correspond to the received signals on the columns. For each column, the different signals received thereon indicate which of the corresponding rows is being touched simultaneously with that column. In an embodiment, the non-negligible quantity of each signal received may be related to the amount of coupling between the corresponding row and column and may indicate the area of the surface covered by the touch, the pressure of the touch, etc.

Simple Sinusoid Embodiment

In an embodiment, the orthogonal signals being transmitted into the rows may be unmodulated sinusoids, each having a different frequency, the frequencies being chosen so that they can be easily distinguished from each other in the receiver. In an embodiment, frequencies are selected to provide sufficient spacing between them such that they can be easily distinguished from each other in the receiver. In an embodiment, no simple harmonic relationships exist between the selected frequencies. The lack of simple harmonic relationships may mitigate non-linear artifacts that can cause one signal to mimic another.

Generally, a "comb" of frequencies, where the spacing between adjacent frequencies is constant, and the highest frequency is less than twice the lowest, will meet these criteria if the spacing between frequencies, $\Delta f$, is at least the reciprocal of the measurement period $\tau$. For example, if it is desired to measure a combination of signals (from a column, for example) to determine which row signals are present once per millisecond ($\tau$), then the frequency spacing ($\Delta f$) must be greater than one kilohertz (i.e., $\Delta f > 1/\tau$). According to this calculation, in an example case with only ten rows, one could use the following frequencies:

| | |
|---|---|
| Row 1: | 5.000 MHz |
| Row 2: | 5.001 MHz |
| Row 3: | 5.002 MHz |
| Row 4: | 5.003 MHz |
| Row 5: | 5.004 MHz |
| Row 6: | 5.005 MHz |
| Row 7: | 5.006 MHz |
| Row 8: | 5.007 MHz |
| Row 9: | 5.008 MHz |
| Row 10: | 5.009 MHz |

It will be apparent to one of skill in the art that frequency spacing may be substantially greater than this minimum to permit robust design. As an example, a 20 cm by 20 cm touch surface with 0.5 cm row/column spacing would require forty rows and forty columns and necessitate sinusoids at forty different frequencies. While a once per millisecond analysis rate would require only 1 KHz spacing, an arbitrarily larger spacing is utilized for a more robust implementation. The arbitrarily larger spacing is subject to the constraint that the maximum frequency should not be more than twice the lowest (i.e. $f_{max}<2(f_{min})$). In this example, a frequency spacing of 100 kHz with the lowest frequency set at 5 MHz may be used, yielding a frequency list of 5.0 MHz, 5.1 MHz, 5.2 MHz, etc. up to 8.9 MHz.

In an embodiment, each of the sinusoids on the list may be generated by a signal generator and transmitted on a separate row by the transmitter. To identify the rows and columns that are being simultaneously touched, a receiver receives any signals present on the columns and a signal processor analyzes the signal to determine which, if any, frequencies on the list appear. In an embodiment, the identification can be supported with a frequency analysis technique (e.g., Fourier transform), or by using a filter bank.

In an embodiment, from each column's signal, the receiver can determine the strength of each frequency from the list of frequencies found in the signal on that column. In an embodiment, where the strength of a frequency is greater than some threshold, the signal processor identifies there being a touch event between the column and the row corresponding to that frequency. In an embodiment, signal strength information, which may correspond to various physical phenomena including the distance of the touch from the row/column intersection, the size of the touch object, the pressure with which the object is pressing down, the fraction of row/column intersection that is being touched, etc. may be used as an aid to localize the area of the touch event.

Once the signals strengths have been calculated for at least two frequencies (corresponding to rows) or for at least two columns, a two-dimensional map can be created, with the signal strength being the value of the map at that row/column intersection. In an embodiment, the signals' strengths are calculated for each frequency on each column. Once signal strengths are calculated a two-dimensional map may be created. In an embodiment, the signal strength is the value of the map at that row/column intersection. In an embodiment, due to physical differences in the touch surface at different frequencies, the signal strengths need to be normalized for a given touch or calibrated. Similarly, in an embodiment, due to physical differences across the touch surface or between the intersections, the signal strengths need to be normalized for a given touch or calibrated.

In an embodiment, the two-dimensional map data may be thresholded to better identify, determine or isolate touch events. In an embodiment, the two-dimensional map data may be used to infer information about the shape, orientation, etc. of the object touching the surface.

Returning to the discussion of the signals being transmitted on the rows, a sinusoid is not the only orthogonal signal that can be used in the configuration described above. Indeed, as discussed above, any set of signals that can be distinguished from each other will work. Nonetheless, sinusoids may have some advantageous properties that may permit simpler engineering and more cost efficient manufacture of devices which use this technique. For example, sinusoids have a very narrow frequency profile (by definition), and need not extend down to low frequencies, near DC. Moreover, sinusoids can be relatively unaffected by 1/f noise, which noise could affect broader signals that extend to lower frequencies.

In an embodiment, sinusoids may be detected by a filter bank. In an embodiment, sinusoids may be detected by frequency analysis techniques (e.g., Fourier transform). Frequency analysis techniques may be implemented in a relatively efficient manner and may tend to have good dynamic range characteristics, allowing them to detect and distinguish between a large number of simultaneous sinusoids. In broad signal processing terms, the receiver's decoding of multiple sinusoids may be thought of as a form of frequency-division multiplexing. In an embodiment, other modulation techniques such as time-division and code-division multiplexing could also be used. Time division multiplexing has good dynamic range characteristics, but typically requires that a finite time be expended transmitting into (or analyzing received signals from) the touch surface. Code division multiplexing has the same simultaneous nature as frequency-division multiplexing, but may encounter dynamic range problems and may not distinguish as easily between multiple simultaneous signals.

Modulated Sinusoid Embodiment

In an embodiment, a modulated sinusoid may be used in lieu of, in combination with and/or as an enhancement of, the sinusoid embodiment described above. The use of unmodulated sinusoids may cause radiofrequency interference to other devices near the touch surface, and thus, a device employing them might encounter problems passing regulatory testing (e.g., FCC, CE). In addition, the use of unmodulated sinusoids may be susceptible to interference from other sinusoids in the environment, whether from deliberate transmitters or from other interfering devices (perhaps even another identical touch surface). In an embodiment, such interference may cause false or degraded touch measurements in the described device.

In an embodiment, to avoid interference, the sinusoids may be modulated or "stirred" prior to being transmitted by the transmitter in a manner that the signals can be demodulated ("unstirred") once they reach the receiver. In an embodiment, an invertible transformation (or nearly invertible transformation) may be used to modulate the signals such that the transformation can be compensated for and the signals substantially restored once they reach the receiver. As will also be apparent to one of skill in the art, signals emitted or received using a modulation technique in a touch device as described herein will be less correlated with other things, and thus, act more like mere noise, rather than appearing to be similar to, and/or being subject to interference from, other signals present in the environment.

In an embodiment, a modulation technique utilized will cause the transmitted data to appear fairly random or, at least, unusual in the environment of the device operation. Two modulation schemes are discussed below: Frequency Modulation and Direct Sequence Spread Spectrum Modulation.

Frequency Modulation

Frequency modulation of the entire set of sinusoids keeps them from appearing at the same frequencies by "smearing them out." Because regulatory testing is generally concerned with fixed frequencies, transmitted sinusoids that are frequency modulated will appear at lower amplitudes, and thus be less likely to be a concern. Because the receiver will "un-smear" any sinusoid input to it, in an equal and opposite fashion, the deliberately modulated, transmitted sinusoids can be demodulated and will thereafter appear substantially as they did prior to modulation. Any fixed frequency sinusoids that enter (e.g., interfere) from the environment, however, will be "smeared" by the "unsmearing" operation, and thus, will have a reduced or an eliminated effect on the intended signal. Accordingly, interference that might otherwise be caused to the sensor is lessened by employing frequency modulation, e.g., to a comb of frequencies that, in an embodiment, are used in the touch sensor.

In an embodiment, the entire set of sinusoids may be frequency modulated by generating them all from a single reference frequency that is, itself, modulated. For example, a set of sinusoids with 100 kHz spacing can be generated by multiplying the same 100 kHz reference frequency by different integers. In an embodiment this technique can be accomplished using phase-locked loops. To generate the first 5.0 MHz sinusoid, one could multiply the reference by 50, to generate the 5.1 MHz sinusoid, one could multiply the reference by 51, and so forth. The receiver can use the same modulated reference to perform the detection and demodulation functions.

Direct Sequence Spread Spectrum Modulation

In an embodiment, the sinusoids may be modulated by periodically inverting them on a pseudo-random (or even truly random) schedule known to both the transmitter and receiver. Thus, in an embodiment, before each sinusoid is transmitted to its corresponding row, it is passed through a selectable inverter circuit, the output of which is the input signal multiplied by +1 or −1 depending on the state of an "invert selection" input. In an embodiment, all of these "invert selection" inputs are driven from the same signal, so that the sinusoids for each row are all multiplied by either +1 or −1 at the same time. In an embodiment, the signal that drives the "invert selection" input may be a pseudorandom function that is independent of any signals or functions that might be present in the environment. The pseudorandom inversion of the sinusoids spreads them out in frequency, causing them to appear like random noise so that they interfere negligibly with any devices with which they might come in contact.

On the receiver side, the signals from the columns may be passed through selectable inverter circuits that are driven by the same pseudorandom signal as the ones on the rows. The result is that, even though the transmitted signals have been spread in frequency, they are despread before the receiver because they have been ben multiplied by either +1 or −1 twice, leaving them in, or returning them to, their unmodified state. Applying direct sequence spread spectrum modulation may spread out any interfering signals present on the columns so that they act only as noise and do not mimic any of the set of intentional sinusoids.

In an embodiment, selectable inverters can be created from a small number of simple components and/or can be implemented in transistors in a VLSI process.

Because many modulation techniques are independent of each other, in an embodiment, multiple modulation techniques could be employed at the same time, e.g. frequency modulation and direct sequence spread spectrum modulation of the sinusoid set. Although potentially more complicated to implement, such multiple modulated implementation may achieve better interference resistance.

Because it would be extremely rare to encounter a particular pseudo random modulation in the environment, it is likely that the multi-touch sensors described herein would not require a truly random modulation schedule. One exception may be where more than one touch surface with the same implementation is being touched by the same person. In such a case, it may be possible for the surfaces to interfere with each other, even if they use very complicated pseudo random schedules. Thus, in an embodiment, care is taken to design pseudo random schedules that are unlikely to conflict. In an embodiment, some true randomness may be introduced into the modulation schedule. In an embodiment, randomness is introduced by seeding the pseudo random generator from a truly random source and ensuring that it has a sufficiently long output duration (before it repeats). Such an embodiment makes it highly unlikely that two touch surfaces will ever be using the same portion of the sequence at the same time. In an embodiment, randomness is introduced by exclusive or'ing (XOR) the pseudo random sequence with a truly random sequence. The XOR function combines the entropy of its inputs, so that the entropy of its output is never less than either input.

A Low-Cost Implementation Embodiment

Touch surfaces using the previously described techniques may have a relatively high cost associated with generating and detecting sinusoids compared to other methods. Below are discussed methods of generating and detecting sinusoids that may be more cost-effective and/or be more suitable for mass production.

Sinusoid Detection

In an embodiment, sinusoids may be detected in a receiver using a complete radio receiver with a Fourier Transform detection scheme. Such detection may require digitizing a high-speed RF waveform and performing digital signal processing thereupon. Separate digitization and signal processing may be implemented for every column of the surface; this permits the signal processor to discover which of the row signals are in touch with that column. In the above-noted example, having a touch surface with forty rows and forty columns, would require forty copies of this signal chain. Today, digitization and digital signal processing are relatively expensive operations, in terms of hardware, cost, and power. It would be useful to utilize a more cost-effective method of detecting sinusoids, especially one that could be easily replicated and requires very little power.

In an embodiment, sinusoids may be detected using a filter bank. A filter bank comprises an array of bandpass filters that can take an input signal and break it up into the frequency components associated with each filter. The Discrete Fourier Transform (DFT, of which the FFT is an efficient implementation) is a form of a filter bank with evenly-spaced bandpass filters that is commonly used for frequency analysis. DFTs may be implemented digitally, but the digitization step may be expensive. It is possible to implement a filter bank out of individual filters, such as passive LC (inductor and capacitor) or RC active filters. Inductors are difficult to implement well on VLSI processes, and discrete inductors are large and expensive, so it may not be cost effective to use inductors in the filter bank.

At lower frequencies (about 10 MHz and below), it is possible to build banks of RC active filters on VLSI. Such active filters may perform well, but may also take up a lot of die space and require more power than is desirable.

At higher frequencies, it is possible to build filter banks with surface acoustic wave (SAW) filter techniques. These allow nearly arbitrary FIR filter geometries. SAW filter techniques require piezoelectric materials which are more expensive than straight CMOS VLSI. Moreover, SAW filter techniques may not allow enough simultaneous taps to integrate sufficiently many filters into a single package, thereby raising the manufacturing cost.

In an embodiment, sinusoids may be detected using an analog filter bank implemented with switched capacitor techniques on standard CMOS VLSI processes that employs an FFT-like "butterfly" topology. The die area required for such an implementation is typically a function of the square of the number of channels, meaning that a 64-channel filter bank using the same technology would require only $\frac{1}{256}$th of the die area of the 1024-channel version. In an embodiment, the complete receive system for the low-latency touch sensor is implemented on a plurality of VLSI dies, including an appropriate set of filter banks and the appropriate amplifiers, switches, energy detectors, etc. In an embodiment, the complete receive system for the low-latency touch sensor is implemented on a single VLSI die, including an appropriate set of filter banks and the appropriate amplifiers, switches, energy detectors, etc. In an embodiment, the complete receive system for the low-latency touch sensor is implemented on a single VLSI die containing n instances of an n-channel filter bank, and leaving room for the appropriate amplifiers, switches, energy detectors, etc.

Sinusoid Generation

Generating the transmit signals (e.g., sinusoids) in a low-latency touch sensor is generally less complex than detection, principally because each row requires the generation of a single signal while the column receivers have to detect and distinguish between many signals. In an embodiment, sinusoids can be generated with a series of phase-locked loops (PLLs), each of which multiply a common reference frequency by a different multiple.

In an embodiment, the low-latency touch sensor design does not require that the transmitted sinusoids are of very high quality, but rather, accommodates transmitted sinusoids that have more phase noise, frequency variation (over time, temperature, etc.), harmonic distortion and other imperfections than may usually be allowable or desirable in radio circuits. In an embodiment, the large number of frequencies may be generated by digital means and then employ a relatively coarse analog-to-digital conversion process. As discussed above, in an embodiment, the generated row frequencies should have no simple harmonic relationships with each other, any non-linearities in the described generation process should not cause one signal in the set to "alias" or mimic another.

In an embodiment, a frequency comb may be generated by having a train of narrow pulses filtered by a filter bank, each filter in the bank outputting the signals for transmission on a row. The frequency "comb" is produced by a filter bank that may be identical to a filter bank that can be used by the receiver. As an example, in an embodiment, a 10 nanosecond pulse repeated at a rate of 100 kHz is passed into the filter bank that is designed to separate a comb of frequency components starting at 5 MHz, and separated by 100 kHz. The pulse train as defined would have frequency components from 100 kHz through the tens of MHz, and thus, would have a signal for every row in the transmitter. Thus, if the pulse train were passed through an identical filter bank to the one described above to detect sinusoids in the received column signals, then the filter bank outputs will each contain a single sinusoid that can be transmitted onto a row.

Transparent Display Surface

It may be desirable that the touch surface be integrated with a computer display so that a person can interact with computer-generated graphics and imagery. While front projection can be used with opaque touch surfaces and rear projection can be used with translucent ones, modern flat panel displays (LCD, plasma, OLED, etc.) generally require that the touch surface be transparent. In an embodiment, the present technique's rows and columns, which allow signals to propagate along them, need to be conductive to those signals. In an embodiment, the present technique's rows and columns, which allow radio frequency signals to propagate along them, need to be electrically conductive.

If the rows and columns are insufficiently conductive, the resistance per unit length along the row/column will combine with the capacitance per unit length to form a low-pass filter: any high-frequency signals applied at one end will be substantially attenuated as they propagate along the poor conductor.

Visually transparent conductors are commercially available (e.g. indium-tin-oxide or ITO), but the tradeoff between transparency and conductivity is problematic at the frequencies that may be desirable for some embodiments of the low-latency touch sensor described herein: if the ITO were thick enough to support certain desirable frequencies over certain lengths, it may be insufficiently transparent for some applications. In an embodiment, the rows and/or columns may be formed entirely, or at least partially, from graphene and/or carbon nanotubes, which are both highly conductive and optically transparent.

In an embodiment, the rows and/or columns may be formed from one or more fine wires that block a negligible amount of the display behind them. In an embodiment, the fine wires are too small to see, or at least too small to present a visual impediment when viewing a display behind it. In an embodiment, fine silver wires patterned onto transparent glass or plastic can be used to make up the rows and/or columns. Such fine wires need to have sufficient cross section to create a good conductor along the row/column, but it is desirable (for rear displays) that such wires are small enough and diffuse enough to block as little of the underlying display as appropriate for the application. In an embodiment, the fine wire size is selected on the basis of the pixels size and/or pitch of the underlying display.

As an example, the new Apple Retina displays comprises about 300 pixels per inch, which yields a pixel size of about 80 microns on a side. In an embodiment, a 20 micron diameter silver wire 20 centimeters long (the length of an iPad display), which has a resistance of about 10 ohms, is used as a row and/or column and/or as part of a row and/or column in a low-latency touch sensor as described herein. Such 20 micron diameter silver wire, however, if stretched across a retina display, may block up to 25% of an entire line of pixels. Accordingly, in an embodiment, multiple thinner diameter silver wires may be employed as a column or row, which can maintain an appropriate resistance, and provide acceptable response with respect to radiofrequency skin depth issues. Such multiple thinner diameter silver wires can be laid in a pattern that is not straight, but rather, somewhat irregular. A random or irregular pattern of thinner wires is likely to be less visually intrusive. In an embodiment, a mesh of thin wires is used; the use of a mesh will improve robustness, including against manufacturing flaws in patterning. In an embodiment, single thinner diameter wires may be employed as a column or row, provided that the thinner wire is sufficiently conductive to maintain an appropriate level resistance, and acceptable response with respect to radiofrequency skin depth issues.

Figure 2:
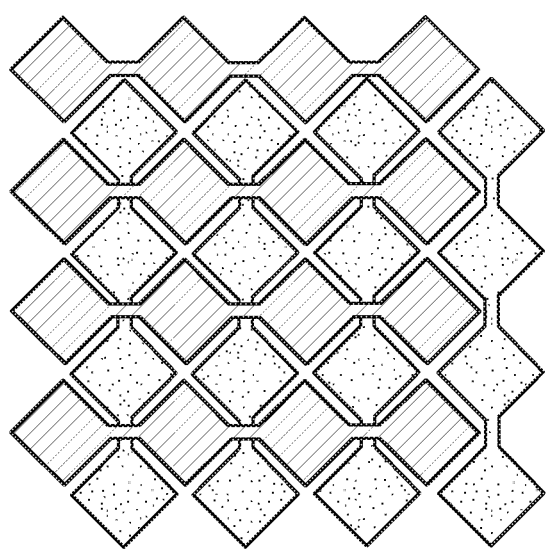
FIG. 2 illustrates an embodiment of a layout for crossing conductive paths that can be used in an embodiment of a low-latency touch sensor device.

FIG. 2 illustrates an embodiment of a row/column touch surface that has a diamond-shaped row/column mesh. This mesh pattern is designed to provide maximal and equal surface area to the rows and columns while permitting minimal overlap between them.

A touch event with an area greater than one of the diamonds will cover at least part of a row and a column, which will permit some coupling of a row signal into the overlapped column. In an embodiment, the diamonds are sized to be smaller than the touching implement (finger, stylus, etc.). In an embodiment, a 0.5 cm spacing between rows and columns performs well for human fingers.

In an embodiment a simple grid of wires is employed as the rows and columns. Such a grid would provide less surface area for the rows and columns, but can suffice for radio frequency signals, and provide a sufficient non-negligible coupling which can be detected by a receiver.

In an embodiment, the "diamond patterns" for the rows and columns, as shown in FIG. 2, can be created by using a randomly connected mesh of thin wires that fills the space of the indicated shapes, or by combining wire mesh and an another transparent conductor such as ITO. In an embodiment, thin wires may be used for long stretches of conductivity, e.g., across the entire screen, and ITO may be used for local areas of conductivity, such as the diamond-shaped areas.

An Optical Embodiment

While radiofrequency and electrical methods of implementing the described fast multi-touch technique have been discussed above, other media can be employed as well. For example, the signals can be optical signals (i.e., light), having waveguides or other means for the rows and columns. In an embodiment, the light, used for the optical signals may be in the visible region, the infrared and/or the ultraviolet.

In an embodiment, instead of electrically conductive rows and columns that carry radiofrequency signals, the rows and columns could comprise optical waveguides, such as optical fiber, fed by one or more light sources that generate orthogonal signals and are coupled to the waveguides by an optical coupler. For example, a different distinct wavelength of light could be injected into each row fiber. When a human finger touches a row fiber, some of the light in it will leak (i.e., couple) into the finger, due to frustrated total internal reflection. Light from the finger may then enter one of the column fibers, due to the reciprocal process, and propagate to a detector at the end of the fiber.

In an embodiment, optical signals may be generated with LEDs of different wavelengths, or by using optical filters. In an embodiment, custom interference filters are employed. In an embodiment, the different wavelengths of light present on the fiber columns can be detected using optical filter banks. In an embodiment, such optical filter banks may be implemented using custom interference filters. In an embodiment, wavelengths of light outside the visible spectrum (e.g., infrared and/or ultraviolet light) may be used to avoid adding extra visible light to the display.

In an embodiment, the row and column fibers may be woven together so that a finger can touch them simultaneously. In an embodiment, the woven construction may be made as visually transparent as needed to avoid obscuring the display.

Fast Multi-Touch Post Processing

After the signal strengths from each row in each column have been calculated using, for example, the procedures described above, post-processing is performed to convert the resulting 2-D "heat map" into usable touch events. In an embodiment, such post processing includes at least some of the following four procedures: field flattening, touch point detection, interpolation and touch point matching between frames. The field flattening procedure subtracts an offset level to remove crosstalk between rows and columns, and compensates for differences in amplitude between particular row/column combinations due to attenuation. The touch point detection procedure computes the coarse touch points by finding local maxima in the flattened signal. The interpolation procedure computes the fine touch points by fitting data associated with the coarse touch points to a paraboloid. The frame matching procedure matches the calculated touch points to each other across frames. Below, each of the four procedures is described in turn. Also disclosed are examples of implementation, possible failure modes, and consequences, for each processing step. Because of the requirement for very low latency, the processing steps should be optimized and parallelized.

We first describe the field flattening procedure. Systematic issues due to the design of the touch surface and sensor electronics may cause artifacts in each column's received signal strength. These artifacts can be compensated-for as follows. First, because of cross-talk between the rows and columns, the received signal strength for each row/column combination will experience an offset level. To a good approximation, this offset level will be constant and can be subtracted off.

Second, the amplitude of the signal received at a column due to a calibrated touch at a given row and column intersection will depend on that particular row and column, mostly due to attenuation of the signals as they propagate along the row and column. The farther they travel, the more attenuation there will be, so columns farther from the transmitters and rows farther from the receivers will have lower signal strengths in the "heat map" than their counterparts. If the RF attenuation of the rows and columns is low, the signal strength differences may be negligible and little or no compensation will be necessary. If the attenuation is high, compensation may be necessary or may improve the sensitivity or quality of touch detection. Generally, the signal strengths measured at the receivers are expected to be linear with the amount of signal transmitted into the columns. Thus, in an embodiment, compensation will involve multiplying each location in the heat map by a calibration constant for that particular row/column combination. In an embodiment, measurements or estimates may be used to determine a heat map compensation table, which table can be similarly used to provide the compensation by multiplication. In an embodiment, a calibration operation is used to create a heat map compensation table. The term "heat map" as used herein need not require an actual map of heat, but rather the term can mean any array of at least two dimensions comprising data corresponding to locations.

In an exemplary embodiment, the entire field flattening procedure is as follows. With nothing touching the surface, first measure the signal strength for each row signal at each column receiver. Because there are no touches, substantially the entire signal received is due to cross-talk. The value measured (e.g., the amount of each row's signal found on each column) is an offset level that needs to be subtracted from that position in the heat map. Then, with the constant offsets subtracted, place a calibrated touch object at each row/column intersection and measure the signal strength of that row's signal at that column receiver. The signal processor may be configured to normalize the touch events to the value of one location on the touch surface. We can arbitrarily choose the location likely to have the strongest signals (because it experiences the least attenuation), i.e. the row/column intersection closest to the transmitters and receivers. If the calibrated touch signal strength at this location is $S_N$ and the calibrated touch signal strength for each row and column is $S_{R,C}$ then, if we multiply each location in the heat map by $(S_N/S_{R,C})$, then all touch values will be normalized. For calibrated touches, the normalized signal strength for any row/column in the heat map will be equal to one.

Figure 3:
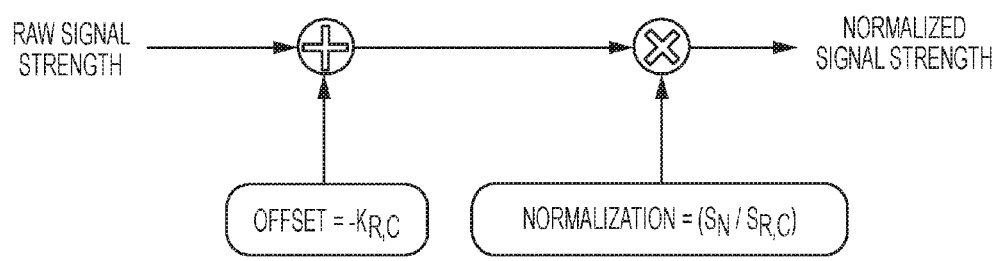
FIG. 3 shows a block diagram illustrating a field flattening procedure.

The field flattening procedure parallelizes well. Once the offsets and normalization parameters are measured and stored—which should only need to be done once (or possibly again at a maintenance interval)—the corrections can be applied as soon as each signal strength is measured. FIG. 3 illustrates an embodiment of a field flattening procedure.

In an embodiment, calibrating each row/column intersection may be required at regular or selected maintenance intervals. In an embodiment, calibrating each row/column intersection may be required once per unit. In an embodiment, calibrating each row/column intersection may be required once per design. In an embodiment, and particularly where, e.g., RF attenuation of the rows and columns is low, calibrating each row/column intersection may not be required at all. Moreover, in an embodiment where the signal attenuation along the rows and columns is fairly predictable, it may be possible to calibrate an entire surface from only a few intersection measurements.

If a touch surface does experience a lot of attenuation, the field flattening procedure will, at least to some degree, normalize the measurements, but it may have some side effects. For example, the noise on each measurement will grow as its normalization constant gets larger. It will be apparent to one of skill in the art, that for lower signal strengths and higher attenuations, this may cause errors and instability in the touch point detection and interpolation processes. Accordingly, in an embodiment, care is taken to provide sufficient signal strength for the largest attenuation (e.g., the farthest row/column intersection).

We now turn to touch point detection. Once the heat map is generated and the field flattened, one or more coarse touch points can be identified. Identifying the one or more coarse touch points is done by finding local maxima in the normalized (i.e., flattened) signal strengths. A fast and parallelizable method for finding the one or more touch points involves comparing each element of the normalized heat map to its neighbors and label it a local maximum if it is strictly greater than all of them. In an embodiment, a point is identified as a local maximum if it is both strictly greater than all of its neighbors and above a given threshold.

It is within the scope of this disclosure to define the set of neighbors in various ways. In an embodiment, the nearest neighbors are defined by a Von Neumann neighborhood. In an embodiment, the nearest neighbors are defined by a Moore neighborhood. The Von Neumann neighborhood may consist of the four elements that are vertically and horizontally adjacent to the element in the center (i.e. the elements to the north, south, east and west of it). This is also called a "four-connected" neighborhood. More complex (i.e., larger) Von Neumann neighborhoods are also applicable and may be used. The Moore neighborhood consists of the eight elements that are vertically, horizontally and diagonally adjacent to the element in the center (i.e. the elements to the north, south, east, west, northeast, northwest, southeast and southwest of it). This is also called the "eight-connected" neighborhood.

The neighborhood chosen will depend on the interpolation scheme used to calculate the fine touch points. This is illustrated in further detail below.

In a given neighbor comparison, a special case may exist where an element's normalized signal strength is equal to one or more of its neighbors, strictly, or within a tolerance to allow for noise levels. In an embodiment, neither point in such pairs is considered to be a touch point even if they have values above the threshold. In an embodiment, both points in such pairs are considered to be touch points. In an embodiment, regions where two or more neighboring points have approximately the same value are treated as one touch event. In an embodiment, regions where two or more neighboring points have approximately the same value are treated as a different type of touch event (e.g., perhaps someone has their wrist in contact with the touch surface) from the regions where a single local maxima can be found.

Turning now to the interpolation procedure. Once the coarse touch points have been determined (i.e., identified), fine touch points can be computed using interpolation. In an embodiment, the capacitive contact of a distributed touch is fit to a model function having a maximum. In an embodiment, the model function is a second-order function in two or more dimensions. In an embodiment, the second-order function is a paraboloid. In an embodiment, the paraboloid model is an acceptable approximation for a variety of objects that may be used to touch a touch surface, such as a finger or stylus. Moreover, as discussed below, the paraboloid model is relatively non-intensive computationally. In an embodiment, a more complex or more computationally intensive model may be used to provide more accurate estimation of the touch from the flattened heat map. For the purposes of the discussion below, the paraboloid is used as an illustrative example, but as will be apparent to one of skill in the art, other models, including models of greater or lesser complexity may be employed for the purpose of interpolation.

Figure 4:
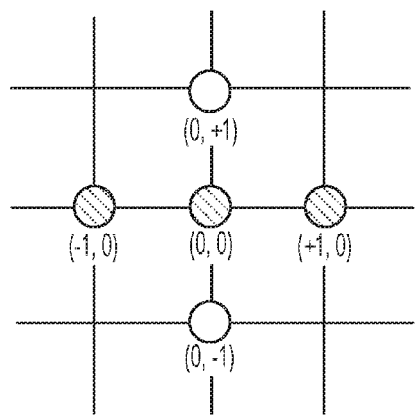
FIG. 4 shows a diagram illustrating a four-connected neighborhood around a local maximum.

FIG. 4 illustrates a Von Neumann neighborhood around an exemplary local maximum. For such a four-connected, or Von Neumann, neighborhood, the relevant points would look like those shown, with the central element being the local maximum and the subscripts being the coordinates of a particular element relative to it. The positions and signal strengths of the five elements allow us to fit them to the following equation defining a paraboloid:

$$Ax^2+Cy^2+Dx+Ey+F=z$$

Where x and y are the position of an element, z is the signal strength of the element, and A, C, D, E and F are the coefficients of the second-order polynomial. Relative to the central point, all of element x, y positions are constant. The z values are the measured signal strengths at each element, and thus are known. In an embodiment, five simultaneous equations can be used to solve for the five unknown polynomial coefficients. Each equation represents one of the five points, including the central point and its four neighbors.

In an embodiment, a Vandermonde-like matrix can be employed to solve for the polynomial coefficients, as follows:

$$\begin{bmatrix} x_{0,1}^2 & y_{0,1}^2 & x_{0,1} & y_{0,1} & 1 \\ x_{-1,0}^2 & y_{-1,0}^2 & x_{-1,0} & y_{-1,0} & 1 \\ x_{0,0}^2 & y_{0,0}^2 & x_{0,0} & y_{0,0} & 1 \\ x_{1,0}^2 & y_{1,0}^2 & x_{1,0} & y_{1,0} & 1 \\ x_{0,-1}^2 & y_{0,-1}^2 & x_{0,-1} & y_{0,-1} & 1 \end{bmatrix} \begin{bmatrix} A \\ C \\ D \\ E \\ F \end{bmatrix} = \begin{bmatrix} z_{0,1} \\ z_{-1,0} \\ z_{0,0} \\ z_{1,0} \\ z_{0,-1} \end{bmatrix}$$

Substituting in the values for the element positions, we get:

$$\begin{bmatrix} 0 & 1 & 0 & 1 & 1 \\ 1 & 0 & -1 & 0 & 1 \\ 0 & 0 & 0 & 0 & 1 \\ 1 & 0 & 1 & 0 & 1 \\ 0 & 1 & 0 & -1 & 1 \end{bmatrix} \begin{bmatrix} A \\ C \\ D \\ E \\ F \end{bmatrix} = \begin{bmatrix} z_{0,1} \\ z_{-1,0} \\ z_{0,0} \\ z_{1,0} \\ z_{0,-1} \end{bmatrix}$$

And then solve for the polynomial coefficients by inverting the constant Vandermonde-like matrix:

$$\begin{bmatrix} 0 & 1 & 0 & 1 & 1 \\ 1 & 0 & -1 & 0 & 1 \\ 0 & 0 & 0 & 0 & 1 \\ 1 & 0 & 1 & 0 & 1 \\ 0 & 1 & 0 & -1 & 1 \end{bmatrix}^{-1} = \frac{1}{2}\begin{bmatrix} 0 & 1 & -2 & 1 & 0 \\ 1 & 0 & -2 & 0 & 1 \\ 0 & -1 & 0 & 1 & 0 \\ 1 & 0 & 0 & 0 & -1 \\ 0 & 0 & 2 & 0 & 0 \end{bmatrix}$$

This yields:

$$\begin{bmatrix} A \\ C \\ D \\ E \\ F \end{bmatrix} = \frac{1}{2}\begin{bmatrix} 0 & 1 & -2 & 1 & 0 \\ 1 & 0 & -2 & 0 & 1 \\ 0 & -1 & 0 & 1 & 0 \\ 1 & 0 & 0 & 0 & -1 \\ 0 & 0 & 2 & 0 & 0 \end{bmatrix}\begin{bmatrix} z_{0,1} \\ z_{-1,0} \\ z_{0,0} \\ z_{1,0} \\ z_{0,-1} \end{bmatrix}$$

In an embodiment, the polynomial coefficients are a linear combination of the signal strengths and only simple multiplication, involving negation and a single shift, are required to calculate them; accordingly, they can be efficiently computed in an FPGA or ASIC.

At the maximum of the paraboloid, both partial derivatives are zero:

$$\frac{\partial x}{\partial z} = 2Ax + D = 0 \text{ and } \frac{\partial y}{\partial z} = 2Cy + E = 0$$

This will occur at the point $x_f$, $y_f$ where:

$$x_f = -\frac{D}{2A} \text{ and } y_f = -\frac{E}{2C}$$

Thus, in an embodiment where the neighborhood data is fit to a paraboloid, and because a paraboloid has one maximum, that maximum is used as a location of the fine touch point. In an embodiment utilizing the four-connected neighborhood, the values $x_f$ and $y_f$ are independent of each other, with $x_f$ depending only on the signal strengths of the elements to the left and right of the center point, and $y_f$ depending only on the signal strengths of the elements above and below it.

Figure 5:
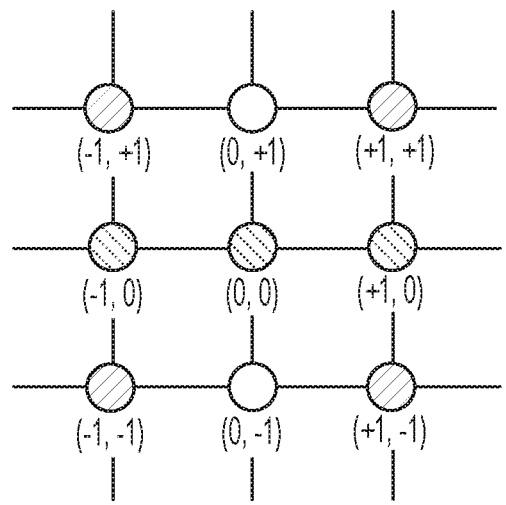
FIG. 5 shows a diagram illustrating an eight-connected neighborhood around a local maximum.

FIG. 5 illustrates a Moore or eight-connected neighborhood around a local maximum. For such an eight-connected, or Moore, neighborhood, the relevant points would appear as shown, with the central element being the local maximum and the subscripts being the coordinates of a particular element relative to it. The positions and signal strengths of the nine elements can be fit to a paraboloid equation. Because more input data is available in this example than the previous example, a somewhat more complex equation for a parabolid can be employed:

$$Ax^2 + Bxy + Cy^2 + Dx + Ey + F = z$$

This equation has an added xy cross term and a new B coefficient that permits the model to compensate for elongation in a direction other than x or y. Again, relative to the central point, all of the element x, y positions are constant and the z values are known. Nine simultaneous equations (one per element) can be used to determine (i.e., overdetermine) the six unknown polynomial coefficients. A least-squares technique may be used to solve for the six unknown polynomial coefficients.

A Vandermonde-like matrix may be used to fit the polynomial. Unlike the embodiment described above, the matrix is non-square, with nine rows and six columns.

$$\begin{bmatrix} x_{-1,1}^2 & xy_{-1,1} & y_{-1,1}^2 & x_{-1,1} & y_{-1,1} & 1 \\ x_{0,1}^2 & xy_{0,1} & y_{0,1}^2 & x_{0,1} & y_{0,1} & 1 \\ x_{1,1}^2 & xy_{1,1} & y_{1,1}^2 & x_{1,1} & y_{1,1} & 1 \\ x_{-1,0}^2 & xy_{-1,0} & y_{-1,0}^2 & x_{-1,0} & y_{-1,0} & 1 \\ x_{0,0}^2 & xy_{0,0} & y_{0,0}^2 & x_{0,0} & y_{0,0} & 1 \\ x_{1,0}^2 & xy_{1,0} & y_{1,0}^2 & x_{1,0} & y_{1,0} & 1 \\ x_{-1,-1}^2 & xy_{-1,-1} & y_{-1,-1}^2 & x_{-1,-1} & y_{-1,-1} & 1 \\ x_{0,-1}^2 & xy_{0,-1} & y_{0,-1}^2 & x_{0,-1} & y_{0,-1} & 1 \\ x_{1,-1}^2 & xy_{1,-1} & y_{1,-1}^2 & x_{1,-1} & y_{1,-1} & 1 \end{bmatrix}\begin{bmatrix} A \\ B \\ C \\ D \\ E \\ F \end{bmatrix} = \begin{bmatrix} z_{-1,1} \\ z_{0,1} \\ z_{1,1} \\ z_{-1,0} \\ z_{0,0} \\ z_{1,0} \\ z_{-1,-1} \\ z_{0,-1} \\ z_{1,-1} \end{bmatrix}$$

All of the entires in the Vandermonde-like matrix are constant, and the z values are known so, substituting in the constant values, yields $$\begin{bmatrix} 1 & 1 & 1 & -1 & -1 & 1 \\ 0 & 0 & 1 & 0 & -1 & 1 \\ 1 & -1 & 1 & 1 & -1 & 1 \\ 1 & 0 & 0 & -1 & 0 & 1 \\ 0 & 0 & 0 & 0 & 0 & 1 \\ 1 & 0 & 0 & 1 & 0 & 1 \\ 1 & -1 & 1 & -1 & 1 & 1 \\ 0 & 0 & 1 & 0 & 1 & 1 \\ 1 & 1 & 1 & 1 & 1 & 1 \end{bmatrix}\begin{bmatrix} A \\ B \\ C \\ D \\ E \\ F \end{bmatrix} = \begin{bmatrix} z_{-1,1} \\ z_{0,1} \\ z_{1,1} \\ z_{-1,0} \\ z_{0,0} \\ z_{1,0} \\ z_{-1,-1} \\ z_{0,-1} \\ z_{1,-1} \end{bmatrix}$$

Because the Vandermonde-like matrix is non-square, it cannot be inverted to solve for the polynomial coefficients. It can be solved, however, using its Moore-Penrose pseudo-inverse and performing a least squares fit to the polynomial coefficients. In an embodiment, the pseudo inverse is defined as:

$$pinv(X) = (X^T X)^{-1} X^T$$

$$pinv\begin{bmatrix} 1 & 1 & 1 & -1 & -1 & 1 \\ 0 & 0 & 1 & 0 & -1 & 1 \\ 1 & -1 & 1 & 1 & -1 & 1 \\ 1 & 0 & 0 & -1 & 0 & 1 \\ 0 & 0 & 0 & 0 & 0 & 1 \\ 1 & 0 & 0 & 1 & 0 & 1 \\ 1 & -1 & 1 & -1 & 1 & 1 \\ 0 & 0 & 1 & 0 & 1 & 1 \\ 1 & 1 & 1 & 1 & 1 & 1 \end{bmatrix} =$$

$$\frac{1}{36}\begin{bmatrix} 6 & -12 & 6 & 6 & -12 & 6 & 6 & -12 & 6 \\ -9 & 0 & 9 & 0 & 0 & 0 & 9 & 0 & -9 \\ 6 & 6 & 6 & -12 & -12 & -12 & 6 & 6 & 6 \\ -6 & 0 & 6 & -6 & 0 & 6 & -6 & 0 & 6 \\ 6 & 6 & 6 & 0 & 0 & 0 & -6 & -6 & -6 \\ -4 & 8 & -4 & 8 & 20 & 8 & -4 & 8 & -4 \end{bmatrix}$$

giving:

$$\begin{bmatrix} A \\ B \\ C \\ D \\ E \\ F \end{bmatrix} = \frac{1}{36} \begin{bmatrix} 6 & -12 & 6 & 6 & -12 & 6 & 6 & -12 & 6 \\ -9 & 0 & 9 & 0 & 0 & 0 & 9 & 0 & -9 \\ 6 & 6 & 6 & -12 & -12 & -12 & 6 & 6 & 6 \\ -6 & 0 & 6 & -6 & 0 & 6 & -6 & 0 & 6 \\ 6 & 6 & 6 & 0 & 0 & 0 & -6 & -6 & -6 \\ -4 & 8 & -4 & 8 & 20 & 8 & -4 & 8 & -4 \end{bmatrix} \begin{bmatrix} z_{-1,1} \\ z_{0,1} \\ z_{1,1} \\ z_{-1,0} \\ z_{0,0} \\ z_{1,0} \\ z_{-1,-1} \\ z_{0,-1} \\ z_{1,-1} \end{bmatrix}$$

The polynomial coefficients are a linear combination of the signal strengths. The multiplications are slightly more complicated, but many of the multiplicands can be factored out and applied a single time near the end of the calculation. The purpose of this step is to find the maximum of a paraboloid. Accordingly, overall scale factors are irrelevant, and focus need only be on relative values and arguments which maximize the function, in an embodiment, many of the operations may be able to cancel out, improving the efficiency of implementation.

As above, the fine touch point is presumed at the maximum of the paraboloid, where both partial derivatives are zero:

$$\frac{\partial x}{\partial z} = 2Ax + By + D = 0 \text{ and } \frac{\partial y}{\partial z} = Bx + 2Cy + E = 0$$

This will occur at the point $x_f$, $y_f$ where:

$$x_f = (BE-2CD)/(4AC-B^2) \text{ and } y_f = (DB-2AE)/(4AC-B^2)$$

For the eight-connected neighborhood, the values $x_f$ and $y_f$ are not independent of each other. Both depend on the signal strengths of all eight neighbors. Thus, this approach may have an increased computational burden and the possibility that certain combinations of signal strengths will produce singular values for the fine touch points. In an embodiment using the least-squares approach on the eight Moore neighbors, such an implementation is more robust against noisy signal strength values. In other words, in an embodiment, small errors in one signal strength will be compensated for by the increased amount of data used in the calculation, and the self-consistency of that data.

Moreover, the eight-connected neighborhood provides a B coefficient—an extra piece of information—that might prove useful as part of a user interface. The B coefficient of the xy cross-term can be used to characterize asymmetry in the fitted paraboloid and, along with the aspect ratio information inherent in the A and C coefficients, which could allow software to determine the angle at which a touch is occurring.

Figure 6:
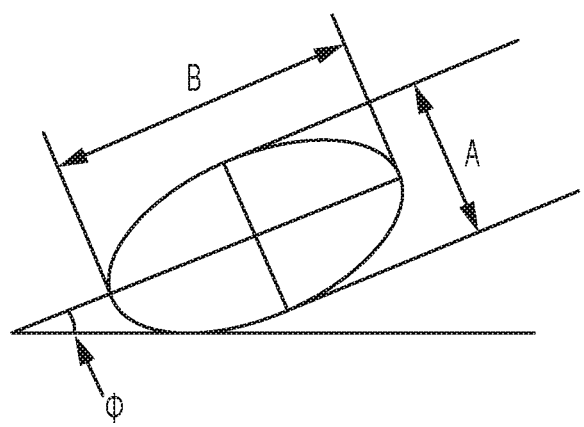
FIG. 6 shows a geometric view illustrating an elliptical fit to an asymmetric touch point.

FIG. 6 shows an example touch point with an elliptical cross section, which could be obtained by truncating the paraboloid at a particular z value. The values of a and b can be obtained from the A and C coefficients of the polynomial, and they provide information about the aspect ratio of the object touching the surface. For example, a finger or stylus would not necessarily be circularly symmetric, and the ratio of a to b could provide information about its shape.

Knowledge of the angle φ can provide information on the orientation of the ellipse, and might, for example, indicate which way a finger or stylus is pointing. φ can be calculated from the eigenvalues and eignevectors of the 2×2 matrix M given by the following:

$$M = \begin{bmatrix} A & B/2 \\ B/2 & C \end{bmatrix}$$

This matrix will have two eignevalues and two eigenvectors. The eigevector associated with the largest eigenvalue will point in the direction of the ellipse's major axis. The other eigenvector will point in the direction of the minor axis. The eigenvalues, $\lambda_1$ and $\lambda_2$ can be computed as follows:

$$\lambda_i = \frac{tr(M) \pm \sqrt{tr(M)^2 - 4\det(M)}}{2}$$

Where tr(M) is the trace of the matrix M, which is equal to AC, and det(M) is the determinant of the matrix M, which is equal to $AC-B^2/4$.

Once the eigenvalues are obtained, we can use the Cayley-Hamilton theorem to compute the eigenvectors. The eigenvector associated with $\lambda_1$ is either of the columns of the matrix $M-\lambda_2 I$ and the eigenvector associated with $\lambda_2$ is either of the columns of the matrix $M-\lambda_1 I$. Note the reversal of the eigenvalue indexes. The angle φ that the major axis of the ellipse makes with respect to the x axis of our coordinate system is the arctangent of the slope of the eigenvector. The slope of the eigenvector is just $\Delta y/\Delta x$.

As discussed above, the interpolation step requires determining a fine touch point, e.g., using data acquired from a flattened heat map, but is not limited to the illustrative paraboloid model discussed above. The purpose of determining a fine touch point is to permit the post-processor to provide better granularity in touch points, and specifically, to provide granularity that exceeds the sensor's intersections. Stated another way, the modeled and interpolated fine touch point can land directly on a row/column intersection, or anywhere in between the intersections. There may be a tradeoff between the accuracy of the model and its computational requirements; similarly, there may be a tradeoff between the accuracy of the model and its ability to provide an interpolated fine touch point that corresponds with the actual touch. Thus, in an embodiment, a model is selected to require the smallest computational load while providing sufficient correspondence between the interpolated touch point and the actual touch. In an embodiment, a model is selected to require sufficient correspondence between the interpolated touch point and the actual touch, and the processing hardware is selected to accommodate the computational load of the model. In an embodiment, a model is selected that does not exceed the computational capacity of pre-selected hardware and/or other software operating the touch interface.

Turning to the frame matching procedure, to properly track objects moving on the touch surface over time, it is important to match the calculated touch points to each other across frame boundaries, and thus, e.g., to track objects moving on the touch surface as they move. Stated another way, each calculated touch point in one frame should be identified in, or have another disposition (e.g., removed) in, the subsequent frame. While this is a fundamentally difficult problem, which may be insoluble in the general case, an embodiment can be implemented using both geometry and the laws of physics. Because the items that are in contact with the touch surface are of finite size and move according to certain physical principles, certain cases can be ignored as being outside of plausible ranges. Moreover, in an embodiment, the frame rate should be sufficient to permit object tracking (that is, frame-to-frame touch point tracking) with reasonable certainty. Thus, for example, where objects to be tracked are either known to move at a maximum rate across the touch surface or the tracking is designed to track the objects only up to a maximum rate, a frame rate can be selected that will permit tracking with reasonable certainty. For example, if a maximum rate of movement across the rows or columns of the touch surface is, e.g., 1000 rows or columns per second, then a frame rate of 1000 Hz will "see" an object move no more than 1 row or column per frame. In an embodiment, touch point interpolation (as discussed above) can provide a more precise measure of the touch point location, and thus, intra-row and intra-column positions are readily identifiable as described more fully herein.

Fingers and styluses have a minimum size and are unlikely to approach each other closely enough to cause an ambiguous case. They also travel at speeds characteristic of the motion of a human arm and its parts (e.g., wrist, elbow, fingers, etc.), which bounds the problem. Because the touch surface of the presently disclosed sensor has a relatively high update rate, which, in an embodiment, may be on the order of one kilohertz or more, fingers and styluses touching the surface cannot move very far or at extreme angles during the update period from one frame to the next. Because of the limited distances and angles, tracking can be somewhat simplified according to the present disclosure.

In an embodiment, tracking of objects moving on the touch surface over time is performed by comparing data from one frame to one or more past frames. In an embodiment, data concerning past frames (e.g., a heat map) may be maintained in a temporary buffer. In an embodiment, processed data concerning past frames (e.g., field flattened heat map or fitted polynomial coefficients) may be maintained in a temporary buffer. In an embodiment, the data concerning a past frame that is maintained in a temporary buffer may include, or may consist of, an interpolated fine touch point coordinate for each fine touch point in the prior frame, and, to the extent such exists, vectors concerning prior motion of those fine touch points. The temporary buffer may retain data concerning one or more past frames, and may cease to retain the data when it is no longer relevant to later calculations.

In an embodiment, the frame matching process initially presumes that an object's touch point in the current frame i is probably the touch point in the prior frame (i.e., i−1) which is geometrically closest to it.

In an embodiment, data concerning the motion of a touch point (e.g., velocity and direction) are determined and stored in connection with one or more frames. In an embodiment, data concerning the motion of a touch point is used to predict a likely location for that touch point in the next frame. Data concerning the motion of a touch point may comprise, for example, velocity or change in position, and may come from one or more prior frames. In an embodiment, predicting a likely location in a frame is done by considering the motion between two frames—yielding a per-frame displacement and its direction. In an embodiment, predicting a likely location in a frame is done by considering the motion in three or more frames. Using fine touch point positional information from three or more frames may yield a more precise prediction as it can take into account acceleration and changes of direction in addition to per-frame displacement and direction. In an embodiment, more weight is assigned to more recent frame data than to older frame data. A frame matching process then may initially presume that an object's touch point in the current frame i probably corresponds with the touch point in the prior frame (i.e., i−1) that is associated with the predicted likely location closest to the touch point in the current frame.

In an embodiment, data concerning the size (magnitude) of a touch point (e.g., the A and C coefficients of a paraboloid) is determined and stored in connection with one or more frames. A frame matching process may initially presume that the size of a given object in the current frame i probably corresponds with the size of that object in the prior frame (i.e., i−1).

In an embodiment, data concerning the change in size (magnitude) of a touch point over time are determined and stored in connection with one or more frames. In an embodiment, data concerning the change in size of a touch point in a frame (e.g., since the last frame, or over a plurality of frames) is used to predict a likely size for that touch point in the next frame. A frame matching process may initially presume that an object in the current frame i probably corresponds with an object in the prior frame (i.e., i−1) that is associated with the predicted likely size nearest the size of the touch point in the current frame.

In an embodiment, data concerning the change in rotational orientation (e.g., the B coefficient of a paraboloid) of a touch point over time are determined and stored in connection with one or more frames. In an embodiment, data concerning the rotational orientation of a touch point in a frame (e.g., since the last frame, or over a plurality of frames) is used to predict a rotational orientation for that touch point in the next frame. A frame matching process may initially presume that an object in the current frame i probably corresponds with an object in the prior frame (i.e., i−1) that is associated with the predicted likely rotational orientation nearest the rotational orientation of the touch point in the current frame. In an embodiment, the rotational orientation of a touch point could permit single touch point control (e.g., single finger control) of rotation, thus, for example, the rotation of one finger on a screen could provide sufficient information to, for example, rotate a view—a function that traditionally requires two rotating points of contact with a touch surface. Using data describing rotational orientation over time, rotational velocity can be computed. Similarly, data concerning rotational orientation or rotational velocity can be used to compute rotational acceleration. Thus, rotational velocity and rotational acceleration both utilize rotational orientation. Rotational orientation, rotational velocity and/or rotational acceleration may be computed for a touch point and output by or used by the frame matching process.

In an embodiment, heuristics for frame matching include changes in distance and in the velocity vectors of the touch points. In an embodiment, heuristics for frame matching include one or more of the following:

an object's touch point in frame i+1 is probably the touch point in frame i which is geometrically closest to it;

an object's touch point in frame i+1 is probably the touch point in frame i which is closest to the point where it would be predicted to be given the object's velocity history; and an object's touch point in frame i+1 will be of a similar size to its touch point in frame i.

Other combinations of historical data may be used without departing from the scope of this disclosure. In an embodiment, both prior positions and the velocity histories may be used in a heuristic frame matching process. In an embodiment, prior positions, the velocity histories and size histories may be used in a heuristic frame matching process. In an embodiment, prior positions and other historical information may be used in a heuristic frame matching process.

In an embodiment, historical information over a plurality of frames is used in a heuristic frame matching process. Other combinations will be apparent to one of skill in the art in view of the foregoing disclosure.

Fast Multi-Touch Noise Reduction

In an embodiment, methods and systems are provided to overcome certain conditions in which noise produces interference with, or phantom touches in, the Fast Multi-Touch (FMT) sensor. In embodiments of the sensor described above, rows have a signal transmitted thereon and the transmitted signal is coupled to columns in proximity to a touch or touches, when a touch or touches are applied to or near the surface of the sensor. (In some cases, the touch or touches can cause a reduction of the row signal in the column.) The locations of touches are determined by reading the signals from the columns and determining the rows in which they were produced.

When the sensor as described above is used in the presence of certain conditions (e.g., electromagnetic noise), it is possible for a column to receive a signal from another source that is can be confused with a known signal generated by one of the rows of the device. In such case, the device may report a phantom touch, determining that the signal received in the column is coming from a row, which in fact it is not. The present embodiments provide methods and devices for reducing or eliminating the occurrence of such phantom touches.

Thus, in an embodiment of the sensor, both the rows and the columns of the device are configured to both transmit unique signals, and also to receive signals from the columns or rows of the device respectively. In an embodiment, a detected signal from Row N in a given column may be considered a touch if that column's transmitted signal were simultaneously detected in Row N. In other words, both the row and the column must receive the other's transmitted signal in order for the device to report a touch at the intersection of the row and column. A signal that is received in either the row or the column that is not matched in this manner may be rejected as, for example, noise from an external source. In an alternative embodiment, both a detected signal from Row N in a given column, and a detected signal from the given column in Row N may each be considered a touch regardless of whether matching is found. While this configuration may not provide the benefits of the matching described above, it may provide for a sensor with increased sensitivity.

In an embodiment, unique signals may be transmitted on all rows and columns. In an embodiment, unique signals may be transmitted on each row in one or more subsets of rows. In an embodiment, unique signals may be transmitted on each column in one or more subsets of columns. In an embodiment, all rows and columns are configured to detect the unique signals. In an embodiment, each row in one or more subsets of rows is configured to detect the unique signals. In an embodiment, each column in one or more subsets of columns is configured to detect the unique signals.

Figure 7:
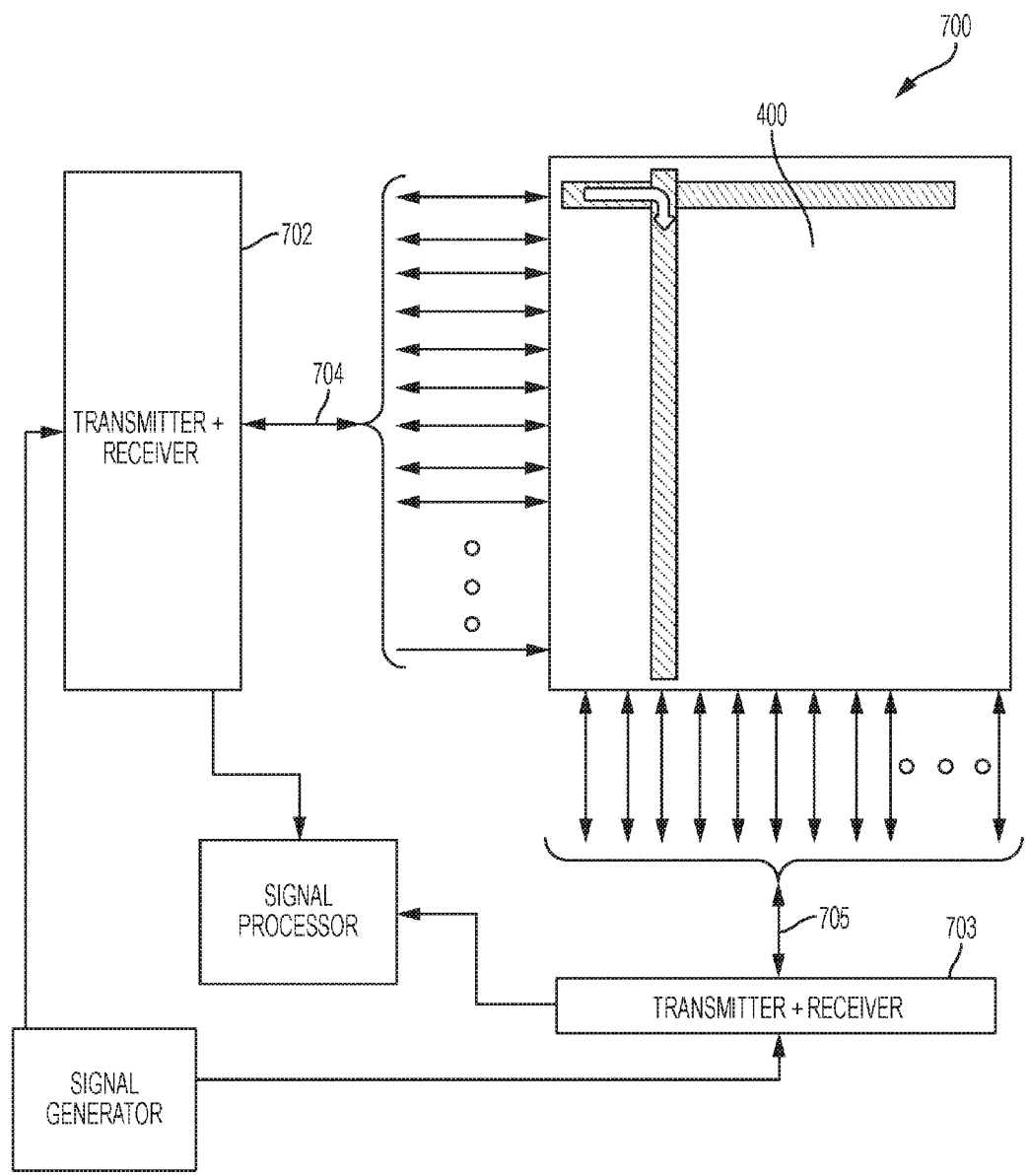
FIG. 7 provides a high level block diagram illustrating an embodiment of a low-latency touch sensor device configured for noise reduction.

FIG. 7 illustrates certain principles of a fast multi-touch sensor 700 in accordance with an embodiment of the touch sensor. A transmitter and receiver 702 are attached to each row and a transmitter and receiver 703 are attached to each column. The transmitters shown at 702 may be discrete from or part of the same element as the transmitters shown at 703. Likewise, the receivers shown at 702 may be discrete from or part of the same element as the receivers shown at 703. The transmitters at 702 and 703 may themselves be discrete elements or may simply comprise a connection to a source of signal such as a signal generator, or may be part of the signal generator. Likewise, the receivers shown at 702 and 703 may be discrete elements or may simply comprise a connection to the signal processor, or part of the signal processor. Reference no. 704 represents both the transmitted row signals and the received row signals and reference no. 705 represents both the transmitted column signals and the received column signals. At least one subset of the transmitted row signals are designed to be orthogonal, i.e. separable and distinguishable from each other. Likewise, at least one subset of the transmitted column signals are designed to be orthogonal with respect to each other. The receivers are designed to receive any of the transmitted signals, or an arbitrary combination of them, while the signal processor is configured to individually measure the quantity of at least some of the orthogonal signals present on a column or row. In an embodiment, each of the orthogonal signals transmitted on the rows can be received and measured by the receiver/signal processor for a column, and each of the orthogonal signals transmitted on the columns can be received and measured by the receiver/signal processor for a row. As discussed above, the distinction between receiver and signal processor that is shown in the drawing as a convenience for the reader, as is the distinction between signal generator and transmitter. For example, a row or column may be connected directly to a signal processor, and thus the signal processor also acts as a receiver; similarly a row or column may be connected to a signal generator, and thus, the signal generator would act as the transmitter. In an embodiment, all of the signal generators and receivers\signal processors could be integrated within the same mixed-signal ASIC.

Generally, in the present sensor, the signal coupled between the rows and columns changes when they are not subject to a touch event versus when they are. In an embodiment, the rows and columns are configured such that, when they are not subject to a touch event, a lower or negligible amount of signal is coupled between them, whereas, when they are subject to a touch event, a higher or non-negligible amount of signal is coupled between them. In an embodiment, the rows and columns are configured such that, when they are subject to a touch event, a lower or negligible amount of signal is coupled between them, whereas, when they are not subject to a touch event, a higher or non-negligible amount of signal is coupled between them. In an embodiment, the signal coupled between the rows and columns changes when they are not subject to a touch event versus when they are. As discussed above, the word touch, or phrase touch event does not require a physical touching, but rather, requires an event affecting the sensor (e.g., but not noise) and which affects the level of coupled signal. In this respect, hovering is considered a touch event. Further, a "level" or "amount" of signal as used herein includes not only a discrete predetermined level but a relative amount of signal, a range of amounts of signal, an amount of signal that is determined dynamically at intervals of time or when a touch event determination is made, or any combination thereof. Thus, in an embodiment, the present sensor and configuration is able to identify touch events resulting from a change in the signal coupled between one or more rows and one or more columns.

As used below, for convenience of description, the terms transmitting conductor and receiving conductor will be used. The transmitting conductor may be a row or column carrying a signal e.g., from a signal generator. In this respect, "conductor" as used herein includes not only electrical conductors but other paths on which signals flow. A receiving conductor may be a row or column carrying a signal resulting from the coupling of a touch event when a touch event occurs in the proximity of the receiving conductor, and not carrying the signal resulting from the coupling of a touch event when no touch event occurs in the proximity of the receiving conductor. In an embodiment, a receiver/signal processor measures the quantity of each of the orthogonal transmitted signal on a receiving conductor which signals resulted from the coupling of a touch event. Measuring the quantity allows for identification of a touch event. The receiver/signal processor may comprise a DSP, a filter bank, or a combination thereof. In an embodiment, the receiver/signal processor is a comb filter providing bands corresponding to the orthogonal signals.

Because any touch event in proximity to a row-column intersection may change both the row-signal present on the column, and the column-signal present on the row, in an embodiment, any signal on a column or row that does not have a corresponding row or column counterpart may be rejected. In an embodiment, a row-signal received at a column receiver/signal processor is used in locating or identifying a touch event if a corresponding column-signal is received at a corresponding row receiver/signal processor. For example, a detected signal from Row R in Column C is only considered to be caused by a touch event if Column C's transmitted signal is also detected in Row R. In an embodiment, Column C and Row R simultaneously transmit signals that are orthogonal to the other row and column signals, and orthogonal to each other. In an embodiment, Column C and Row R do not simultaneously transmit signals, but rather, each transmits its signal in an allotted time slice. In such an embodiment, signals only require orthogonality from other signals transmitted in the same time slice.

As illustrated, in an embodiment, a single signal generator may be used to generate the orthogonal signals for both the rows and the columns, and a single signal processor may be used to process the received signals from both the rows and the columns. In an embodiment, one signal generator is dedicated to generating row signals and a separate signal generator is dedicated to generating column signals. In an embodiment, a plurality of signal generators is dedicated to generating row signals and the same, or a separate plurality of signal generators is dedicated to generating column signals. Likewise, in an embodiment, one signal processor is dedicated to processing row signals and a separate signal processor is dedicated to processing column signals. In an embodiment, a plurality of signal processors are dedicated to processing row signals and the same, or a separate plurality of signal processors are dedicated to processing column signals.

In an embodiment, each receiving conductor is associated with a filter bank which acts as its receiver and signal processor, the filter bank being adapted to distinguish between a plurality of orthogonal signals. In an embodiment, a filter bank associated with a receiving-conductor row is adapted to distinguish between all orthogonal signals that can result from a touch event associated with that receiving-conductor row; likewise, a filter bank associated with a receiving conductor column is adapted to distinguish between all orthogonal signals that can result from a touch event associated with that receiving-conductor column.

In an embodiment, each row and each column may be associated with a signal, and the signal associated with each row or column is unique and orthogonal with respect to the signal for every other row or column. In such an embodiment, it may be possible to "transmit" all row and column signals simultaneously. Where design or other constraints require, or where it is desirable to use fewer than one signal per row and column, time division multiplexing may be employed.

Figure 8:
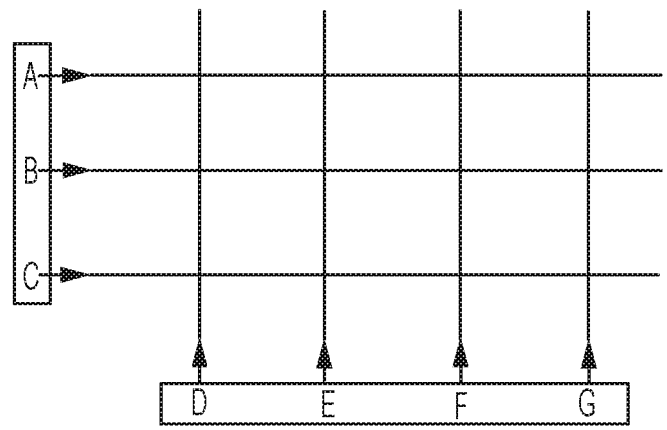
FIGS. 8-11, 12A and 12B are simplified diagrammatic illustrations of signal generation and transmission schemes.

FIG. 8 illustrates a simplified example of a transmission scheme having three rows and four columns. In this illustrated embodiment, each row and each column may be associated with a signal, and the signal associated with each row or column is unique and orthogonal with respect to the signal for every other row or column. Specifically, signals A, B and C are associated with rows 1, 2 and 3, while signals D, E, F and G are associated with columns 1, 2, 3 and 4. In this embodiment, it may be possible to "transmit" all row and column signals simultaneously, each row and column acting as a transmitting conductor, and to simultaneously have each row and column act as a receiving conductor, and thus being able to process all the signals that can result from a touch event simultaneously.

Figure 9:
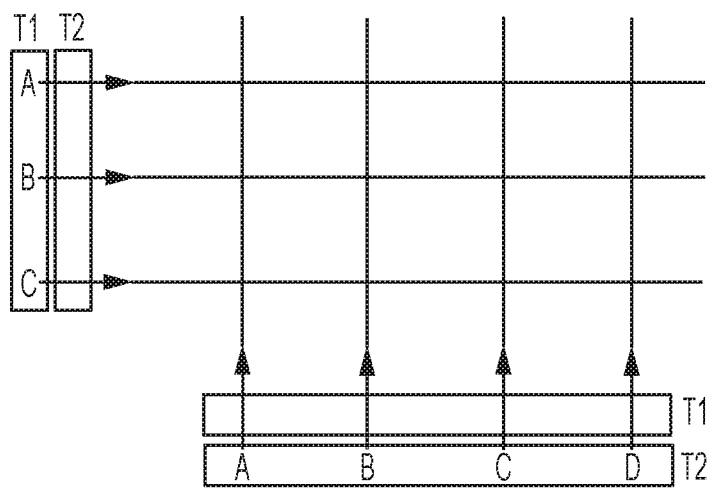

FIG. 9 illustrates a simplified example of another transmission scheme having three rows and four columns. In this illustrated embodiment, each row is associated with a signal, and the signal associated with each row is unique and orthogonal with respect to the signal for every other row, and each column is associated with a signal, and the signal associated with each column is unique and orthogonal with respect to the signal for every other column. In the illustrated embodiment, however, the signals associated with the rows are not all orthogonal with the signals associated with the columns, e.g., signal A is used for both rows and columns. Here, signals are transmitted on the rows, and received on the columns during a first time slice T1, and are transmitted on the columns, and received on the rows during a second time slice T2. In this manner, only four, rather than seven orthogonal signals are required for the implementation.

Figure 10:
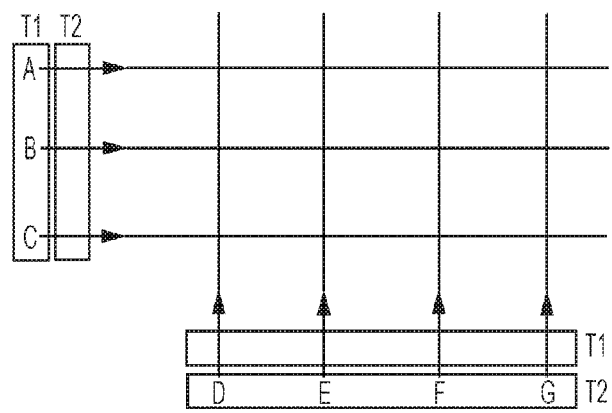
Figure 11:
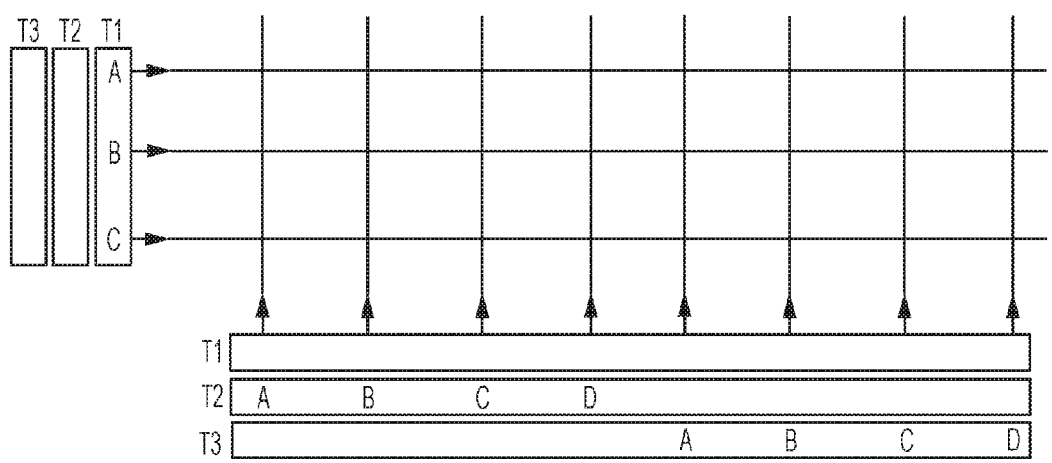

FIG. 10 illustrates a simplified example of yet another transmission scheme having three rows and four columns. In this illustrated embodiment, each row and column is associated with a signal, and the signal associated with each row and column is unique and orthogonal with respect to the signal for every other row and column. In the illustrated embodiment, however, even though the signals associated with the rows are all orthogonal with the signals associated with the columns, a constraint or other design consideration may make it desirable to time division multiplex the transmission of the signals. Here again, signals are transmitted on the rows, and received on the columns during a first time slice T1, and are transmitted on the columns, and received on the rows during a second time slice T2. Such an embodiment may be useful, for example, where the range of frequency available for transmission may be limited, and separation is important to reception. Accordingly, an assignment could be made as follows, permitting better separation for simultaneously transmitted signals:

Row A: 5.001 MHz
Row B: 5.003 MHz
Row C: 5.005 MHz
Column D: 5.000 MHz
Column E: 5.002 MHz
Column F: 5.004 MHz
Column G: 5.006 MHz FIG. 11 illustrates a simplified example of a transmission scheme having three rows and eight columns. In this illustrated embodiment, each row is associated with a signal, and the signal associated with each row is unique and orthogonal with respect to the signal for every other row, but the columns share unique orthogonal signals that overlap with the row signals as illustrated. In the illustrated embodiment, three time slices are employed to ensure that only unique orthogonal signals are simultaneously transmitted, and therefore, a filter bank or other signal processor can locate a touch event in accordance with these teachings.

Figure 12A:
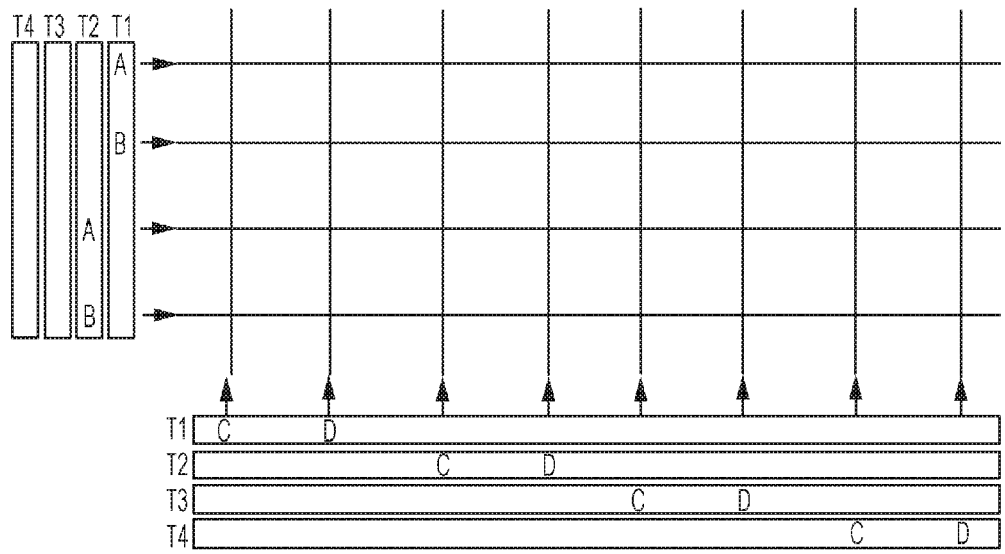

FIG. 12A shows an example of time division multiplexing applied within sets of columns and also within sets of rows in a sensor having four rows and eight columns. In this example, orthogonal frequencies A and B are transmitted on a first set of rows and orthogonal frequencies C and D are transmitted on a first set of columns during time slice T1. Orthogonal frequencies A and B are transmitted on a second set of rows and orthogonal frequencies C and D are transmitted on a second set of columns during a subsequent time slice T2. Orthogonal frequencies C and D are transmitted on a third set of columns during a subsequent time slice T3, and orthogonal frequencies C and D are transmitted on a fourth set of columns during a subsequent time slice T4. Optionally, orthogonal frequencies A and B may be transmitted on the first or second set of rows during time slices T3 and/or T4, for example, to provide greater resolution of touch events in time.

Figure 12B:
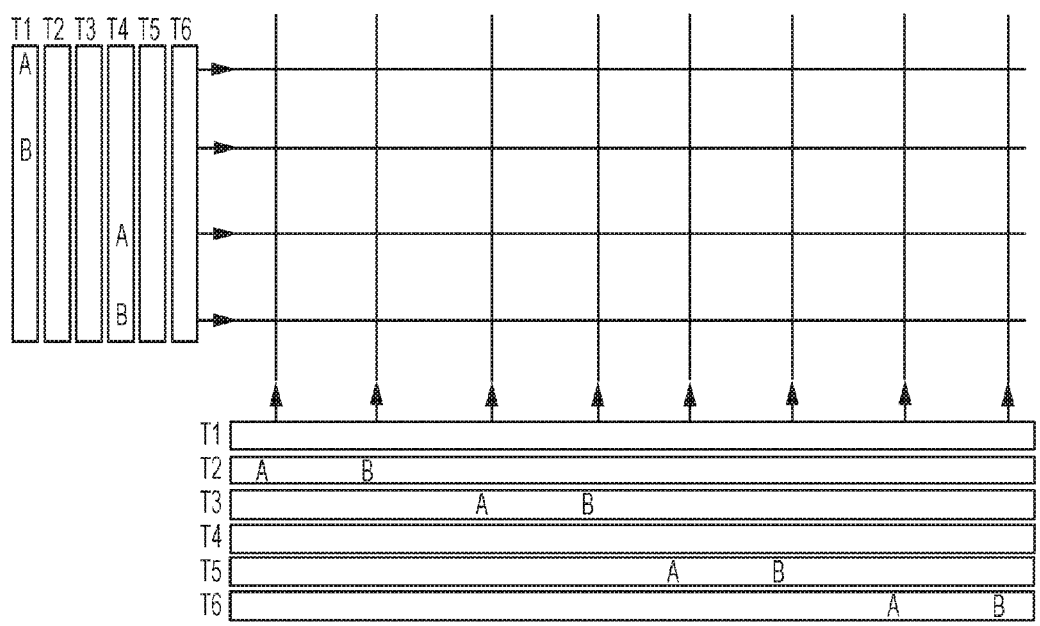

FIG. 12B illustrates a simplified example of another transmission scheme having four rows and eight columns. In this illustrated embodiment, only two orthogonal signals, A and B are used. In the illustrated embodiment, six time slices are employed to ensure that while the two unique orthogonal signals can be simultaneously transmitted, neither cannot be transmitted on more than one transmitting conductor at once. As illustrated, A and B are transmitted on rows 1 and 2 during the first time slice, columns 1 and 2 during the second time slice, columns 3 and 4 during the third, and so forth.

Factors affecting the choice of orthogonal signal generation and transmission scheme include, e.g., without limitation, the number of rows and number of columns in the sensor, the desired resolution of the sensor, the material and dimensions of the rows and columns, available signal processing power, and the minimum acceptable latency of the system. Numerous other variations can be made, and are within the scope and spirit of this disclosure and the attached claims. For example, it will be apparent to a person of skill in the art the various tradeoffs that can be made in selecting between the number of unique orthogonal signals and the number of time slices employed by a given touch detection system, provided however, that multiple signals are transmitted in the same time slice, and each of those multiple signals is orthogonal from all of the other signals transmitted in that time slice.

As noted above, a column receiver Rx on a particular column may receive an orthogonal signal that was transmitted on one or more of the row conductors, and the signal will be used by the signal processor to determine the row conductor responsible for the touch event coupling, thus yielding a row-column coordinate. In addition to the orthogonal signal transmitted on one or more rows, the column receiver Rx may "see" the signal originating from the column transmitter Tx, and its amplitude may be quite great, and thus, may interfere with the processing of lower amplitude signals that have traversed portions of a row and column. In an embodiment, the presently disclosed system and method provides for the removal of the column transmitter Tx signal from the signal processed by the column receiver Rx. Thus, in an embodiment, the orthogonal signal sent by the column transmitter Tx may be subtracted from the signal received at the column receiver Rx. Such subtraction may be provided electrically by a circuit comprising an inverter configured such that the inverse of the signal transmitted by the column transmitter Tx is added to the signal received by the column receiver Rx, thereby subtracting the transmitted column signal from the received column signal. Such a subtraction function may alternatively be provided in the signal processor (FIG. 7).

Dynamic Assignment of Possible Channels

The perceived quality of a touch sensor in a computer system depends on a high signal-to-noise ratio where-in user input signals are properly discerned from ambient electromagnetic noise. Such electromagnetic noise can stem from other components within the computer system of which the touch sensor is a part (e.g., an LCD information display) or from artificial or natural signals in the user's external environment (e.g., unwanted signal from a device's external AC power charger). These unwanted electromagnetic signals can be falsely detected by the touch sensor as user input and thereby produce false or noisy user commands.

In an embodiment, a system and method enables a touch sensor to reduce or eliminate such false or noisy readings and maintain a high signal-to-noise ratio, even if it is proximate to interfering electromagnetic noise from other computer system components or unwanted external signals. This method can also be used to dynamically reconfigure the signal modulation scheme governing select portions or the entire surface-area of a touch sensor at a given point in time in order to lower the sensor's total power consumption, while still optimizing the sensor's overall performance in terms of parallelism, latency, sample-rate, dynamic range, sensing granularity, etc.

Embodiments of the present system and method are particularly advantageous when applied to a capacitive touch sensor whose performance depends on the accurate reading of electromagnetic signals, and particularly for a capacitive touch sensor that employs frequency-division multiplexing (FDM) to increase the scan-rate and lower the latency of reported touch input events to a computer system. In this respect, the present embodiments may be applied to sensors such as those disclosed in Applicant's U.S. patent application Ser. No. 13/841,436 filed on Mar. 15, 2013 entitled "Low-Latency Touch Sensitive Device" and U.S. patent application Ser. No. 14/069,609 filed on Nov. 1, 2013 entitled "Fast Multi-Touch Post Processing," which contemplate a capacitive frequency-division multiplexing touch sensor as an embodiment.

Embodiments of the Dynamic Assignment Process

Step 1: Reasonably Identify the Touch Signals and the Noise

The touch sensor can analyze all the signals it receives when it is known that no user is touching the sensor, or if actual touch signals are reasonably known (i.e. if it is known that some parts of the touch surface are being touched while other parts are not being touched).

Such determinations of whether or not and where a touch sensor is being touched can be formed and strengthened through analyzing a combination of readings from the sensor itself, other common computer input sensors like accelerometers, the computer system's power status (e.g. if the computer is placed into "sleep mode," etc.), the event stream from currently running software applications on the computer system, etc. This analytic process of relying on data from more than one sensor in a computer system to draw a conclusion about system state, the state of system components, or the state of the user is commonly called "sensor fusion" in the art.

With an analytic judgment about known touches in-hand, all of the touch sensor's received signals can then be compared against signals received for these known touches. The resulting differences between signals the sensor has measured, and what should have been measured (given what is known about current or prior touch events) can then be used to mitigate the noise and interference.

In an embodiment of this method, some of this measurement of interfering signals can happen at design time, at least for the portions of interference thereof that will be predictable at design time. In another embodiment of this method, some of the measurement can happen at manufacturing or testing time. In another embodiment, some of the measurement can happen during a pre-use period when it is reasonably known that the user is not touching the touch sensor. In another embodiment, some of the measurement can occur when the user is touching the sensor at known positions. In another embodiment, some of the measurement can occur at times between user touches when it is predicted by other sensors or algorithmically that the user is not touching the touch surface.

In another embodiment, some of the measurement can occur statistically by software that can gauge the statistical patterns and likelihood of a user's touches. For example, the user-interface (UI) could have buttons placed at only certain positions on the touch surface, so that these are the only places that a user is likely to be touching at a given time. When touched at one of these known positions, the difference between the touch/no-touch states could be very obvious even in the presence of noise. In an embodiment, the UI can be designed such that a button must be held down for a certain defined period of time (perhaps indicated by the display), yielding a pre-determined period over which the touch may be detected even in the presence of noise. In another embodiment, a slider or two-dimensional "pointer" could be used instead of a button as these UI controls require a user to follow an arbitrary path that is either known by the UI ahead of time, or which can be dynamically determined (to some extent) by other sensors on the device through sensor fusion. In an embodiment, such a UI slider could be the single "slide-to-open" slider control commonly found on the "lock-screen" of touch-friendly operating systems like but not limited to iOS, Android, other Linux variants, or Windows. In related embodiments, any such unlocking gesture control can be used. In an embodiment, a virtual keyboard provides known touch locations as the letters in a word can be easily and accurately predicted through looking at the neighboring letters.

In an embodiment, such analysis and any touch processing described herein could be performed on a touch sensor's discrete touch controller. In another embodiment, analysis and/or touch processing could be performed by a touch processor that comprises another computer system component such as but not limited to an ASIC, MCU, FPGA, CPU, GPU, SoC, DSP or a dedicated circuit. The term "hardware processor" as used herein means any of the above devices or any other device which performs computational functions.

Step 2: Avoid the Interference

Once noisy readings are identified as "interference" based on known touch signals and/or via statistical inference as recounted in Step 1, such knowledge of electromagnetic interference can be used to avoid collisions between certain portions of the frequency-, time- or code-space where such noise can or will possibly be sensed by the touch sensor. Collisions between known touch signals and identified electromagnetic interference can be avoided through a variety of techniques or combinations of techniques such as but not limited to:

If there are identified signal frequencies that have no or little interference, then the touch sensor should be configured to use them. If there are time slots that have little or no interference, then the touch sensor should be configured to use them. If there are codes that have little or no interference, then the touch sensor should be configured to use them. If there are combinations of frequency, time and code that have little or no interference, then the touch sensor should be configured to use them.

For touch sensors that employ frequency division multiplexing (FDM), the signal frequencies that the touch sensor employs do not have to be contiguous. If some parts of the frequency band are occupied by interference, then the touch sensor can be configured to avoid those frequencies. If some parts of the frequency band are occupied by interference at certain known times, then the touch sensor can be configured to avoid using those signal frequencies at those known times. If some parts of the frequency band are occupied by relatively static interference at certain known times, the signals transmitted by the touch sensor can be modulated at those times in a fashion whereby demodulation will cancel out or eliminate the known interference. For example, in an embodiment of this modulation technique, if the interference is a steady sinusoid at some frequency of interest, binary phase shift keying (BPSK) should be used to modulate the frequency emitted by the touch sensor so that, when the opposite BPSK is used to demodulate the resulting sum of the signal received from the touch sensor and the interfering signal, an equal portion of the interference has been multiplied by the positive phase and an equal portion has been multiplied by the negative phase so that, when the signals are integrated over the total reception period, the interference signal has summed to something negligible. Other forms of modulation with similar effect are possible.

If a touch sensor using FDM employs a fast Fourier transform to perform frequency analysis, or a similar fast algorithm in which the number of frequency bins is constrained by the algorithm or nature of the algorithm, the sensor can use a larger transform with a larger number of bins (perhaps the next size up) so that there are extra possible receive frequencies. The touch sensor can be configured prior to manufacturing with the ability to transmit at any of these frequencies. In this manner, if some of the frequency bins contain interference, these can be avoided in favor of frequencies that have little or no interference.

Step 3: Avoid Unwanted Hot-Spots

If some of the electromagnetic interference cannot be completely eliminated through use of the aforementioned techniques, a touch sensor can be configured to ensure that such noise is spread evenly across the sensor's surface-area, to minimize any operational problems posed by the remaining interference.

In an embodiment, a touch sensor can be configured and paired with custom application programming interfaces (APIs) to ensure that more noise-tolerant UI elements with respect to ensuring a good user experience are placed on portions of the touch surface with more noise, and that portions of the UI that require near noise-free input commands due to the need for precision control are associated with parts of the touch sensor's surface that are affected by little or no interference. In other embodiments, essentially the reverse of this concept is utilized. That is, a developer API can be used to flag UI elements which then dictate the placement of high performance modulation schemes on the touch surface.

In another embodiment, unwanted electromagnetic noise can be mitigated by remapping the timing, frequencies and codes assigned to touch sensor signals. The division of these signals associated with the rows and columns of a touch sensor need not have a fixed relationship, and can be dynamically remapped as desired. For example, in an embodiment, a touch sensor that employs FDM may always transmit a sinusoid of a particular frequency for a given row, or it may remap the frequencies that it transmits dynamically. For example, if the touch sensor's transmitter and receiver are capable of operating at "n" different frequencies, and if "m" of those frequencies have been determined to contain a sufficiently small amount of interference, and the number of touch sensor rows (simultaneously transmitted frequencies) is "r" (where "n" is greater than or equal to "m" which is greater than or equal to "r"), then the touch sensor can choose "r" frequencies out of the set of "m" and map those to the rows in a manner designed to minimize degradation to the user-experience. In another embodiment, the sensor's chosen set of operating frequencies can be re-mapped dynamically, every frame, in a random or pseudo-random fashion so that there is a negligible correlation of noise statistics between different portions of the touch surface, over a noticeable time. More specifically, a touch sensor can choose the "r" frequencies out of the "m"-possible if they have the least noise or, it may choose among them dynamically and randomly (or pseudo-randomly) in a manner designed to minimize the correlation of noise statistics between different portions of the touch surface, over a noticeable time. Similar methods can be used for time slots, codes or other modulation schemes or combinations thereof.

In another embodiment, for a touch sensor that primarily employs FDM, where "m" frequencies, which have been determined to contain a sufficiently small amount of interference, is greater than or equal to the number of "r" frequencies required to simultaneously transmit a unique frequency on each sensor row, a touch sensor can employ a dynamic FDM modulation scheme that optimizes the latency and sample-rate performance of specific portions of the touch sensor's surface-area based on the known layout and requirements of UI controls. Here-in, the known locations at a given point in time of UI controls demanding high-precision, low-latency user input are mapped onto corresponding portions of the surface-area of the touch sensor for which the signal modulation scheme has been optimized at a given point in time for high performance. Such dynamic mapping between the locations and performance requirements of the computer system's software-defined UI controls and the locations and performance requirements of the surface-area of the touch sensor could be explicitly defined by the application developer before run-time or defined by operating system logic and analysis at run-time of UI controls—with communication between the application, operating system, and touch-surface defined by application programming interfaces (APIs). Simultaneously alongside these high performance regions, other adjacent regions of the same surface-area could employ lower performance frequency, time or code modulation schemes. Running only select regions of the surface-area of a touch sensor with a modulation scheme optimized for high performance in terms of parallelism, latency, sample-rate, dynamic range, sensing granularity, etc. has the added benefit of potentially lowering the total energy consumed by the touch sensor in order to both sense and process user input, as only specific regions of the sensor are operated at demanding performance levels—enabling the remainder of the surface-area to operate with a modulation scheme that optimizes energy savings over performance. Such a dynamic modulation scheme can be updated and reoptimized as fast as every new frame of sensor input.

In another embodiment, for a touch sensor that primarily employs FDM, where the set of "m"-possible frequencies identified with the least noise is a number lower than the number of "r" unique sensor signals required to assign a unique frequency to each row of the touch sensor, the sensor can be configured to employ a hybrid modulation approach that combines time, code or other modulation schemes with frequency division. In an embodiment of this method, the specific hybrid modulation approach can be dynamically chosen and re-evaluated by the touch sensor—as fast as every new frame of sensor input—to optimize for the lowest latency and the highest touch-event sample-rate across the entire sensor's surface-area. In another embodiment of this method, the specific hybrid modulation approach can be dynamically chosen and re-evaluated by the touch sensor to optimize the latency and sample-rate performance of specific portions of the surface-area of the touch sensor based on the known layout and requirements of UI controls. Here-in, the known locations at a given point in time of UI controls demanding high-precision, low-latency user input are mapped onto corresponding portions of the surface-area of the touch sensor for which the signal modulation scheme has been optimized at a given point in time for high performance in terms of parallelism, latency, sample-rate, dynamic range, sensing granularity, etc. Such dynamic mapping between the locations and performance requirements of the computer system's software-defined UI controls and the locations and performance requirements of the surface-area of the touch sensor could be explicitly defined by the application developer before run-time or defined by operating system logic and analysis at run-time of UI controls— with communication between the application, operating system, and touch-surface defined by application programming interfaces (APIs). Simultaneously alongside these high performance regions, other adjacent regions of the same surface-area could employ lower performance frequency, time or code modulation schemes. Running only select regions of the surface-area of a touch sensor with a modulation scheme optimized for high performance in terms of parallelism, latency, sample-rate, dynamic range, sensing granularity, etc. has the added benefit of potentially lowering the total energy consumed by the touch sensor in order to both sense and process user input, as only specific regions of the sensor are operated at demanding performance levels— enabling the remainder of the surface-area to operate with a modulation scheme that optimizes energy savings over performance. Such a dynamic modulation scheme can be updated and reoptimized as fast as every new frame of sensor input.

In another embodiment, for a touch sensor that primarily employs FDM, where the set of "m"-possible frequencies identified with the least noise is a number lower than the number of "r" unique sensor signals required to assign a unique frequency to each row of the touch sensor, the sensor can be configured to enter a time-division multiplexing (TDM) mode for a given time period, choosing one of the frequencies in "m" and sampling rows and columns sequentially as is typical in a TDM approach. Switching a primarily FDM sensor to a pure TDM mode for a given time period ensures accurate input, at the expense of the frame-rate and latency of sensor readings.

In another embodiment, for a touch sensor that primarily employs FDM, where the set of "m"-possible frequencies identified with the least noise is a number lower than the number of "r" unique sensor signals required to assign a unique frequency to each row of the touch sensor, the sensor can be configured to enter a hybrid FDM and TDM mode for a given time period, choosing a select number of the frequencies in "m" and thereby sequentially sampling multiple rows and columns in parallel to improve the frame-rate and latency of sensor readings over the performance limits of a purely sequential TDM mode. Such a hybrid FDM and TDM modulation scheme improves sensor parallelism and performance, while simultaneously mitigating the adverse impact of noisy readings that would have otherwise arisen from utilizing sensor signals outside of "m" that real-time, historical, and/or statistical analysis of the surrounding electromagnetic noise deemed more interference prone.

Step 4: Use Duplication of Sensing to Increase the Sensor's Signal-to-Noise Ratio A touch sensor can also utilize a number of techniques to decrease the influence of interference and other noise in the touch sensor. For example, in an embodiment for a touch sensor that employs FDM, a touch sensor could use multiple frequencies per row so that, even if the sensor cannot predict which frequency bins will be subject to interference, then it can measure each row (or column) in multiple ways and gauge the least noisy measurement (or combination of measurements), and then use those.

In cases where it is difficult to decide whether a measurement has been affected by interference or not, a touch sensor could employ a voting scheme whereby a voting plurality of measurements, or a similar statistical method, is used to determine which measurements to throw away, which to keep and the best way to statistically and mathematically combine the ones it keeps to maximize the signal-to-noise+interference ratio and thereby enhance the user experience. For example, in an embodiment, an FDM touch sensor subject to interference could transmit three different frequencies on each row, (where the frequencies are sufficiently separated so that interference between them is statistically unlikely) and measure the results. Then using a two-out-of-three voting system, the sensor can determine which of the frequencies has been degraded the most by interference and, either remove its measurement from consideration in the final measurement, or combine the remaining two in a statistically plausible manner (given what the sensor "knows" a priori about the interference and noise statistics) or include all three and combine them in a statistically plausible manner, weighting the influence of each frequency measurement by the statistical likelihood of its degradation by noise and interference.

Some methods that a touch sensor can employ in this manner include but are not limited to:
1. Using multiple frequencies per row. These frequencies could be employed simultaneously or in sequence.
2. Transmitting from rows to columns, and from columns to rows (either in sequence or simultaneously, as discussed in more detail above.) This could also be combined with the use of multiple frequencies above or with another combination of modulation schemes.
3. Using CDMA on top of FDM, or some combination of modulation schemes. Here it should be noted that CDMA signals, unlike those commonly employed by FDM techniques, are fundamentally "unnatural" and therefore are often more immune than FDM modulation schemes to a variety of naturally-occurring signals in a computer system's external environment.

User-Identification Techniques

In an embodiment, the fast multi-touch sensor is provided with the ability to identify touches as coming from the same hand, different hands of the same user, the same user, or different users. In an embodiment, the fast multi-touch sensor is provided with the ability to identify touches as coming from a portion of an object linked to touch areas, either through capacitive touch points on a single object to help determine its position and orientation or through a stylus held by a user who is also touching another area of the display simultaneously with a part of his/her body.

In the basic embodiment of the sensor initially discussed above, each row has a signal transmitter. The signal is coupled into nearby columns when a touch or touches are applied to the surface. The locations of these touches are determined by reading the signals from the columns and knowing in which rows they were produced.

Figure 13:
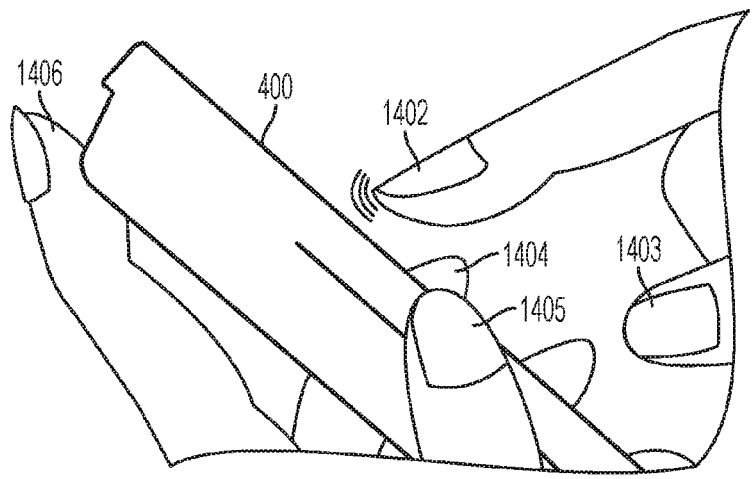
FIG. 13 shows a side view illustrating a user identification technique according to an embodiment of the disclosed system and method.

When a user makes contact with the sensor or with a device within which the sensor is integrated, or comes within a certain distance of the sensor or otherwise causes a touch event, at more than one location, there will ordinarily be a certain amount of coupling that will occur across touches made by the same user, as signals are transmitted by the user's body from one touch location to the other. With reference to FIG. 13, when a single touch or near touch is applied by a user's digit 1402 at the intersection of row r1 with column c1, coupling will occur between row r1 and column c1. If a second, contemporaneous touch or near touch is made by the user's second digit 1403 at the intersection of row r2 and column c2, coupling will occur between row r2 and column c2. Additionally, weaker coupling may occur between row r1 and column c2, as well as between r2 and column c1. In some embodiments, weaker coupling may occur between the columns and between the rows.

These weaker, body-transmitted signals, which might otherwise be dismissed as "noise" or "cross talk," can instead be used by the signal processor (FIG. 7) as an additional 'signal' to identify that a single user is responsible for both touches. In particular, to extend the above example, the coupling between row r1 and column c2, as well as between row r2 and column c1, might normally be considered 'noise', and filtered out (or otherwise ignored), to ensure a touch is not erroneously reported at the intersections of row r1 and column c2 or row r2 and column c1. The weaker, body-transmitted coupling might still be filtered to ensure only accurate touch locations are reported, but also interpreted to allow the system to identify that the touches come from the same user. The sensor 400 may be configured to detect weaker, body-transmitted coupling transmitted from any digit of the user's hand, including but not limited to locations 1404, 1405, or 1406 in addition to 1403. The signal processor (FIG. 7) may be configured to use such detection to identify touches as coming from the same hand, different hands of the same user, the same user, or different users.

In other embodiments of the touch sensor with user identification, a signal generator can be coupled to the user elsewhere, such as in a handheld unit, a pad under their chair, or indeed on an edge of the device into which the sensor is integrated. Such a generator can be used to identify the user making a particular touch, in a manner similar to that described above. In other embodiments, the signal generator might be integrated into a stylus, pen, or other object.

The following are examples of the types of weaker coupling that can be detected and used to identify touches as coming from the same hand, the same user, or different users: coupling between a row or column being touched by a first one of the user's digits and a row or column being touched by a second one of the user's digits; coupling between a row or column being touched by a user's digit and a row or column being touched by another part of the user's body (such as his palm); coupling between a row or column being touched by a part of the user's body (such as his digit or his palm) and a signal generator operatively connected to the user's body; and coupling between a row or column being touched by a part of the user's body (such as his digit or his palm) and a signal generator integrated into a stylus or pen; and coupling between a row or column being touched by a part of the user's body through a conductive intermediary object, such as stylus or other tangible, and coupling between a row or column being touched by a part of the user's body possibly through a conductive intermediary object such as a stylus or other tangible. As used herein, "touch" includes events where there is physical contact between a user and the disclosed sensor and also events where there is no physical contact but an action by the user that occurs in proximity to the sensor and is detected by the sensor.

The weaker couplings described above can be used to identify touches as coming from the same hand, different hands of the same user, the same user, or different users. For example, the presence of a weaker coupling that is relatively strong can be used to identify two touch events as coming from the same hand, such as from two digits of the same hand (e.g., the index finger and the thumb) or a digit and a palm of the same hand. As another example, the presence of a weaker coupling that is relatively weak (relative the previous example) can be used to identify two touch events as coming from different hands of the same person or a hand and another body part of the same person. As a third example, the absence of a weaker coupling can be used to identify two touch events as coming from different persons. Furthermore, the presence of a signal from a signal generator operatively connected to a user's body can be used to identify a touch as coming from a particular user, and the absence of such signal can be used to identify a touch as not coming from a particular user.

Fast Multi-Touch Stylus

In certain embodiments of the fast multi-touch sensor, the sensor is configured to detect the position of a stylus and, optionally, its tilt angle and angle of rotation about its longitudinal axis as well. Such embodiments begin with sensor hardware essentially as initially described above, and further utilize a stylus having a signal transmitter near its tip, from which signals are transmitted which are compatible (same or similar modulation scheme, similar frequency, etc.) with but orthogonal to the orthogonal signals that may be transmitted on the rows or columns. A switch, which could be any kind of a switch, including, e.g., proximity detector or pressure sensor, in the tip of the stylus can be used to control when the transmitter is on or off. The stylus can be configured such that, under normal operating conditions, the switch turns on the transmitter when the stylus is in contact with or within proximity to the fast multi-touch sensor's surface. In an alternate embodiment, the stylus is configured such that it constantly transmits a signal, and the state of the switch can change one or more properties of the signal, such as its frequency, amplitude, or the like. This allows the stylus to not only be used when it is in contact with the surface of the touch sensitive device, but also when it is slightly above as well, providing a "hover" capability.

In an embodiment, the signal transmitted by the stylus is similar to the orthogonal signals which may be transmitted onto the rows as discussed above, and the stylus can be treated essentially as an extra row. Signals emitted by the stylus are coupled into nearby columns and the amount of signal received on the columns can be used to determine the position of the pen with respect to them.

To provide the ability to measure the position of the stylus in two dimensions, receivers can be placed on the rows of the FMT sensor, as well as on the columns. The receivers on the rows do not need to be as complicated as those on the columns: the column receivers should be configured to pick up and discriminate between any of the signals that are transmitted onto the rows. However, the row receivers only need to be capable of picking up and discriminating between any signals that are transmitted by the stylus or, in some embodiments, multiple styli.

In an embodiment, the signals transmitted by the stylus are be distinct from those transmitted onto the rows so that there is no confusion between them. If the row signals are modulated, the stylus signals should be similarly modulated to be compatible with the other receivers. In an embodiment, such modulation requires a time reference which the multi-touch sensor can be configured to provide to the stylus via a communication channel. Such channel can be a radio link, an optical link, an acoustic or ultrasonic link, or the like. In an embodiment, the stylus receives the row signals and synchronizes its modulation to them, with no other communication channel involved.

As the stylus transmits its signals, they are received by the column and row receivers. The signal strengths on the rows and columns are used to determine the position of the stylus in two dimensions with respect to the rows and columns. Stronger signal strengths are an indication that the stylus is in relatively close proximity to the sensor and weaker signal strengths are an indication that the stylus is farther away. Interpolation can be used to determine the position of the stylus to a much finer resolution than the physical granularity of the rows and columns.

Stylus Tilt and Rotation

A more complex embodiment allows us to simultaneously measure both the tilt and rotation of the stylus as the user holds it, along with measuring the position of the stylus.

Instead of emitting a single signal, the stylus in this embodiment can emit multiple signals, each of which is transmitted from near the tip of the stylus, but from points spread around its circumference. While two such signals, 180 degrees apart, would provide some of the information required, at least three signals (ideally 120 degrees apart) are needed to unambiguously measure the tilt and rotation of the stylus, and four signals (ideally 90 degrees apart) would make the math and signal processing less cumbersome. The four-signal case is used in the examples below.

Measuring Stylus Tilt

Figure 14:
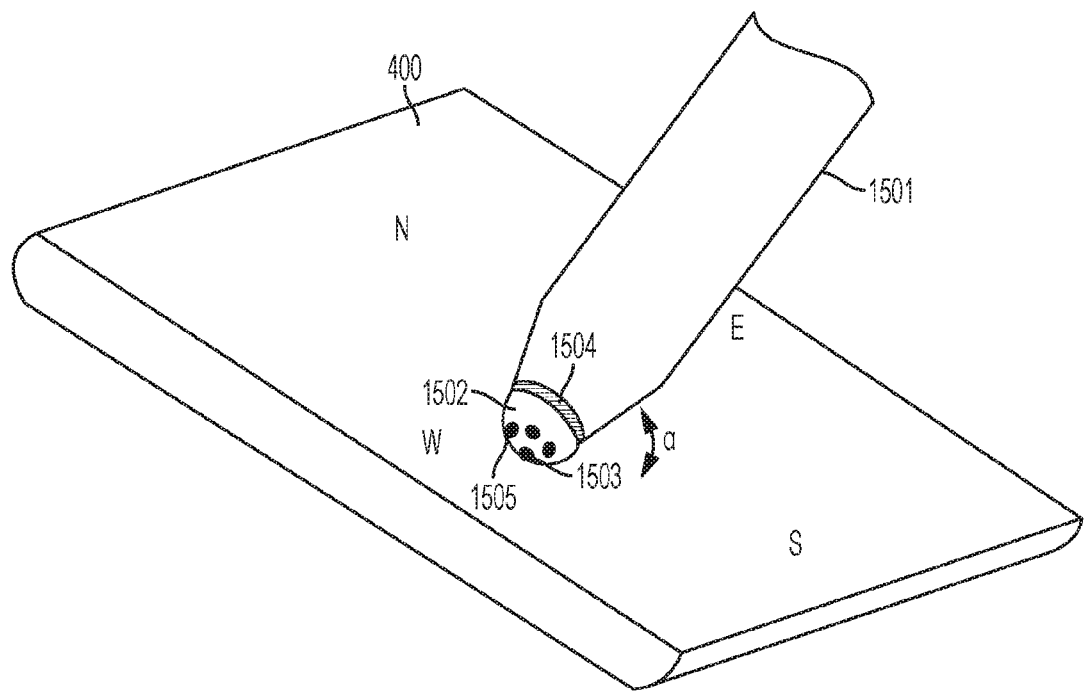
FIGS. 14 and 15 show perspective views illustrating fast multi-touch styli according to embodiments of the disclosed system and method.
Figure 15:
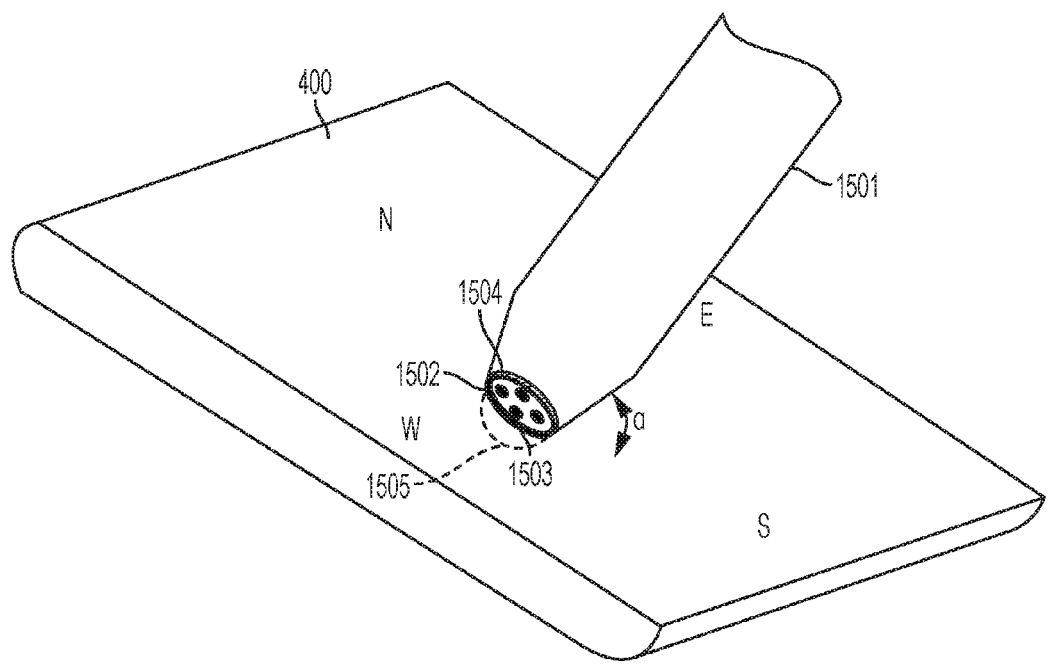

FIGS. 14 and 15 show two embodiments of a fast multi-touch stylus 1501 having transmitters 1502 at its tip 1505. In the embodiment of FIG. 14, the transmitters 1502 are external on the tip 1505 while in the embodiment of FIG. 15 the transmitters 1502 are internal to the tip 1505. The four transmitters 1502 are arranged around the circumference of the stylus 1501 and are oriented toward the North, East, South and West, respectively along the planar surface of the fast multi-touch sensor 400. Imagine that the starting position of the pen is parallel to the z-axis and perpendicular to the x- and the y-axis of the sensor's planar surface. As the stylus is tilted toward the east as shown, rotating along the x- or y-axis to an angle α with respect to the plane of the sensor 400, the east-facing transmitter 1503 moves closer to the surface of the sensor 400 in three-dimensional space relative to the north and south transmitters, and the west-facing transmitter moves farther away from the sensor relative to the north and south transmitters. This causes the orthogonal signal emitted by the east transmitter to couple more strongly with the nearby rows and columns, which can be measured by their receivers within the fast multi-touch sensor. The orthogonal signal emitted by the west transmitter couples less strongly with the nearby rows and columns, causing its signal to appear with lower strength in the receivers of those nearby rows and columns. By comparing the relative strengths of the east and west signals, we can determine the tilt angle α of the stylus. Tilt in the north-south direction can be determined by a similar process with the north and south orthogonal signals. In an embodiment, a switch or pressure sensor 1504 in the tip 1505 of the stylus 1501 is used to control when the transmitter is on or off. The stylus can be configured such that, under normal operating conditions, the switch 1504 turns on the transmitter when the stylus is in contact with or within proximity to the surface of the fast multi-touch sensor 400.

Measuring Stylus Rotation

Stylus rotation can be detected in a similar manner. As the x- and y-position of each of the stylus' four transmitters 1502 is rotated in parallel to the z-axis, the four transmitters on the pen will be linearly closer to or farther from the various rows and columns of the touch surface. These different linear distances between the x- and y-position of the stylus' transmitters relative to the FMT's various rows and columns result in different signal strengths picked up by the FMT's receivers. Rotating the stylus in parallel with the z-axis would change these linear distances, and thus the associated signal strengths. The x- and y-rotation angle of the stylus can be inferred from these differences in signal strengths.

Active Optical Stylus

Embodiments of the invention include a fast, accurate, low-latency stylus and sensor system that can be used for hand-written input on a computer display or touch sensor. In an embodiment, the stylus provides input that is fluid and natural, mimicking the experience of a pen or pencil. In this respect, the update rate of the system can be raised to over a kilohertz and the latency, from stylus movement to measured position and other parameters, can be lowered to less than one millisecond. Along with measuring the position of the stylus, its tilt angle and rotation can be measured. It is noted that the Active Optical Stylus described herein is compatible with computer displays and touch sensors of virtually all designs and is not limited to use with the fast multi-touch sensors described above.

The disclosed technique includes an optical method that uses Induced Total Internal Reflection (ITIR). The technique allows a plurality of styli to simultaneously be used for input purposes. The sensor system can be placed on top of a computer display (such as an LCD or OLED monitor), and the inferred sensor position and other parameters over time used to draw lines, curves, text, etc. on the computer display.

In an embodiment of the active optical stylus, the stylus emits light in a plurality of distinct patterns into the sensor surface. The sensor surface is a thin flat sheet (or some two-dimensional manifold) of material that is transparent or translucent at the wavelength of the light emitted from the stylus.

Figure 16:
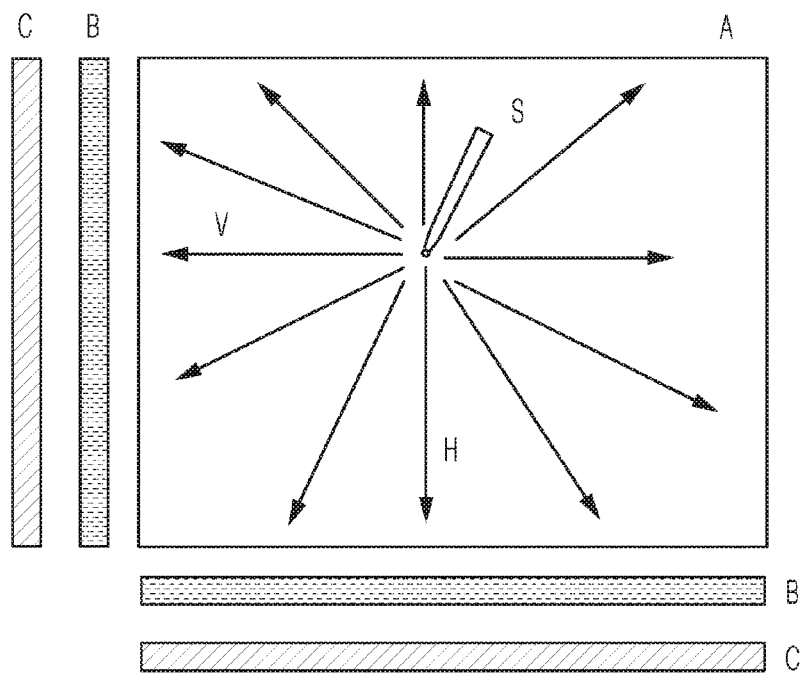
FIG. 16 shows a top view illustrating a sensor sheet and an active optical stylus.

FIG. 16 shows a top view of the sensor sheet and the system as a whole. The stylus (indicated by the letter S) shines light in a plurality of distinct patterns into the sensor sheet (indicated by the letter A). Through direction changing means, which may comprise particles suspended in a transparent medium, the sheet causes light at the pattern positions to become trapped inside the sensor sheet, where it propagates in all horizontal directions by total internal reflection. Angular filters (indicated by the letter B) only permit light in a small angle, i.e. a restricted angle, around the perpendicular to the sensor sheet edge to pass through the filter. Linear light sensors (indicated by the letter C) detect where along their length that light is impinging on them. In an embodiment, to detect the X, Y position of a single, simple stylus, it is only necessary to find the locations on the linear sensors on which the maximum amount of light is impinging. Light along the arrow labeled "V" provides the vertical position of the stylus. Light along the arrow labeled "H" provides the horizontal position. Light in other directions is filtered and ignored.

Figure 17:
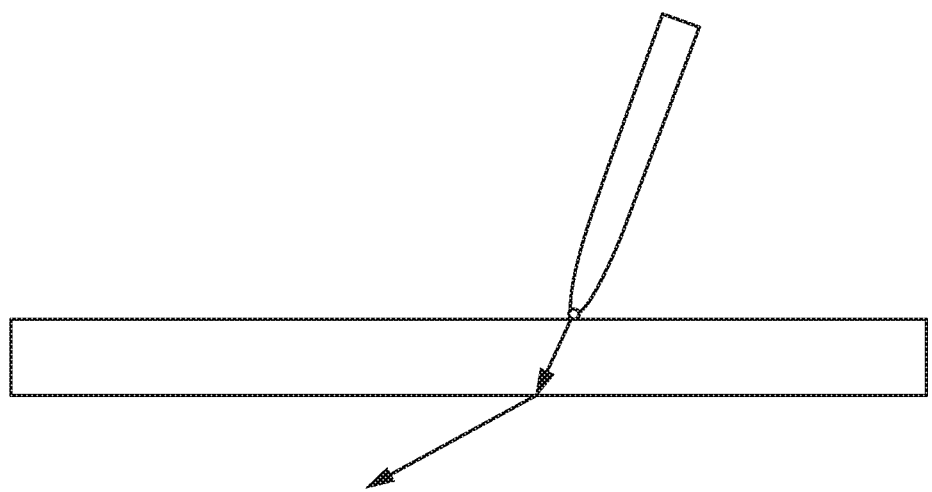
FIG. 17 shows a side view illustrating a sensor sheet and an active optical stylus.

FIG. 17 shows a side view of the sensor sheet. Normally, light entering a transparent material having an index of refraction higher than the surrounding medium will pass out the other side and be refracted at a shallower angle. It may not be possible for light emitted from the outside to be trapped inside, unless something like a scattering medium is in direct contact with the translucent material of a non-negligible area (as could happen in a frustrated total internal reflection situation). However, the non-negligible contact area required makes for a poor stylus because of the drag experienced by the contacting material and the difficulty in building a stylus that can tilt and still maintain the contact. A preferred embodiment uses a direction-changing means inside the transparent material.

Inside the sheet, some of the light emitted by the stylus interacts with the direction-changing means, which causes some light to become trapped in the sensor sheet and propagate outward away from the distinct pattern of light which the stylus emitted into the sheet at that position. The propagating light travels to the edge of the sheet where it reaches an angular filter. Light that is perpendicular to the filter (and the edge of the sheet) is allowed to pass to the linear light sensor.

Figure 18:
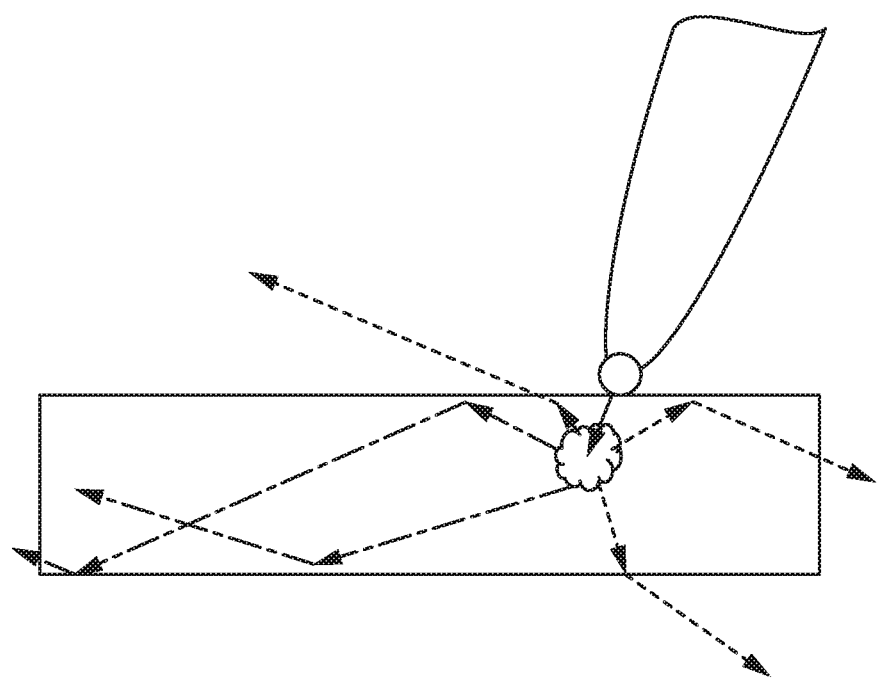
FIG. 18 shows a side view illustrating internal reflection in a sensor sheet in accordance with an embodiment of the disclosed active optical stylus.

FIG. 18 shows a side view of the sensor sheet. The direction-changing means inside the transparent material allows light emitted from the stylus to end up as light trapped inside the sheet, undergoing total internal reflection and propagating in all directions in the sheet. Light entering the sheet (solid arrow) enters the direction-changing means (the cloud shape). Light exits the direction-changing means in many directions, some of which are within the angle at which total internal reflection can occur (dashed arrows). Some are outside the angle at which total internal reflection can occur (dotted lines). This light cannot be trapped and leaves the sensor sheet. The direction-changing means could come from scattering but, in the preferred embodiment, it is a fluorescent or phosphorescent material which absorbs the light emitted by the stylus, and emits light at a different wavelength, which propagates outward in all directions.

The linear light sensor measures the amount of light impinging on it along its length, which allows us to infer the position of the stylus. The position along the linear light sensor which receives the maximum amount of light corresponds to the projection of the stylus position along that dimension.

The system can not only measure the position of the stylus on the sensor sheet, but it can also infer its tilt and rotation, if the stylus emits more than a single ray of light. If the stylus emits multiple rays of light, or perhaps cones or other shapes, the projection of these along the sides of the antenna sheet can be measured by the system, and that data used to simultaneously infer the position, tilt and rotation of the stylus.

Light Direction-Changing Property of the Material

Normally, light entering a thin transparent medium, like the sensor surface, will exit out the other side, and none of it will get trapped inside and propagate by total internal reflection. In order for the entering light to be trapped and propagate inside, some means is required to change its direction. In one embodiment, the sensor surface scatters some of the incoming light in different directions. Some of those directions are within the angle at which total internal reflection can occur. Scattering is not a preferred method because the there is no way to prevent the scattering from further changing the direction of the light, which will lower the amount of light received by the linear light sensors and also cause light to travel by non-straight-line paths, even after the first change of direction has occurred. Non-straight-line paths will cause light to appear to come from incorrect directions and will cause the system to yield false position readings.

The preferred direction-changing means is a one-time wavelength changing means, such as a fluorescent or phosphorescent material. Light emitted by the stylus at wavelength W1 enters the sensor sheet, where it interacts with the one-time wavelength changing means. Said means absorbs a portion of that light and emits light at wavelength W2 in multiple directions. Wavelength W1 could be in the ultraviolet portion of the electromagnetic spectrum. Wavelength W2 could be in the visible or infrared portion of the spectrum. A portion of the light at wavelength W2 now propagates along the sensor sheet via total internal reflection and nothing otherwise impedes it because the one-time wavelength changing means does not appreciably affect wavelength W2.

Angular Filters

Light propagating through the sensor surface reaches the edge from a multitude of angles. In order to infer the position of the stylus's light patterns inside the sensor surface, we want to restrict the linear light sensor's field of vision to a specific direction. In an embodiment, an angular filter provides this function. In the preferred embodiment, with a rectangular sensor sheet and linear light sensors on two of the sides, we want to restrict the field of view of the light sensors to directions perpendicular to the edges of the sensor sheet. This could be accomplished with a tiny set of "venetian blinds", similar to the way that privacy screen for computer monitors restrict the view to a narrow angle directly in front of the monitor.

Light impinging on the angular filter from directions outside the intended field of view should preferably be absorbed by the filter, or reflected in a manner such that the rejected light will not enter or be sensed by any of the linear light sensors in the system.

Figure 19:
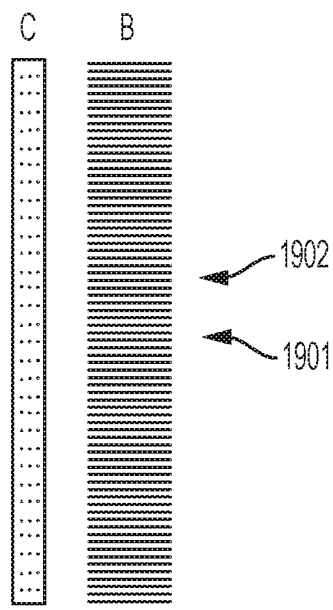
FIG. 19 shows a side view illustrating use of an angular filter in accordance with an embodiment of the disclosed active optical stylus.

FIG. 19 shows an angular filter (indicated by the letter B) in front of a linear light sensor Indicated by the letter C), seen from the top of the system. The angular filter only permits light to enter that is perpendicular to the filter (and the linear light sensor). The filter could be implemented in a manner similar to venetian blinds, with a plurality of perpendicular blades that block light which enters at other angles. In the case, light along arrow 1901 is allowed to enter and pass through the filter. Light along arrow 1902 is not permitted to enter, and is (preferentially) absorbed by the filter, or perhaps just reflected away. The linear light sensor can measure the amount of light impinging on it at a plurality of points along its length. The point at which the maximum amount of light impinges is probably the projection of the position of the stylus along the direction of the linear light sensor.

Linear Light Sensors

The linear light sensors measure the amount of light impinging on them at a plurality of positions along their length. They could be implemented by position sensitive detectors, linear CCD arrays, linear CMOS imager arrays, an array of photomultiplier tubes, and array of individual photodiodes, phototransistors, photo cells, or any other means of detecting light.

The Stylus

Figure 20:
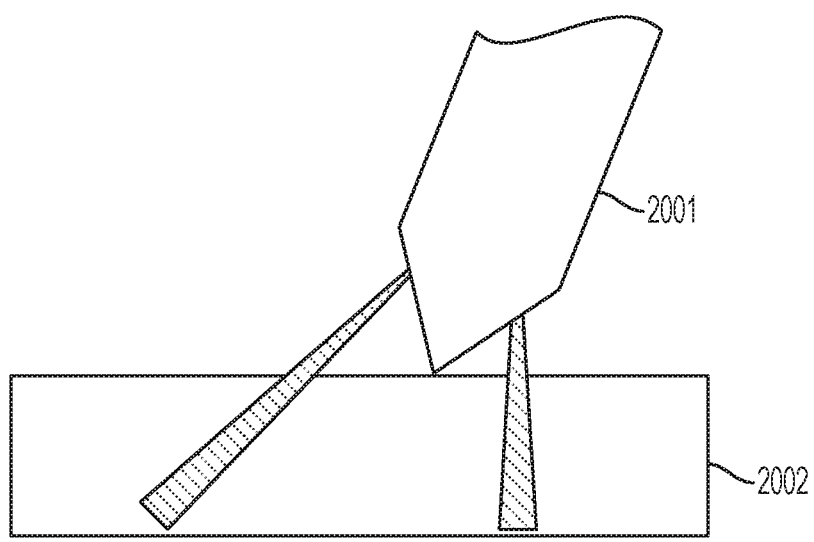
FIG. 20 shows a side view illustrating patterns emitted onto a sensor sheet by an active optical stylus.

With reference to FIG. 20, the stylus 2001 is a pen-shaped device that can emit light in a plurality of distinct patterns into the sensor sheet 2002 when the user holds it like a pen or pencil and draws on the surface of the sensor sheet 2002. The projections of the patterns along the edges of the sensor sheet can be used to infer the position, tilt and rotation of the stylus. If multiple styli are desired, they can emit their light one at a time, in a form of time-division multiplexing. This would require some form of synchronization between the styli, which could be implemented by a variety of simple communication channels, including but not limited to a radio link, ultrasound or an optical signal. The optical signal could be generated by the computer display below the sensor sheet, allowing the pens to be synchronized using almost no additional hardware.

The stylus could be constructed using a light source, such as a light-emitting diode, that is illuminated when a contact switch or pressure sensor senses that the stylus is in contact with the sensor sheet. Optical elements, such as lenses, diffraction gratings, light pipes, splitters, etc. could take the light from a plurality of light sources and create a different plurality of distinct patterns of light which could be projected into the sensor sheet. In an embodiment, the stylus could also be a non-contact light source such as a laser.

Single Spot Embodiment

Figure 21:
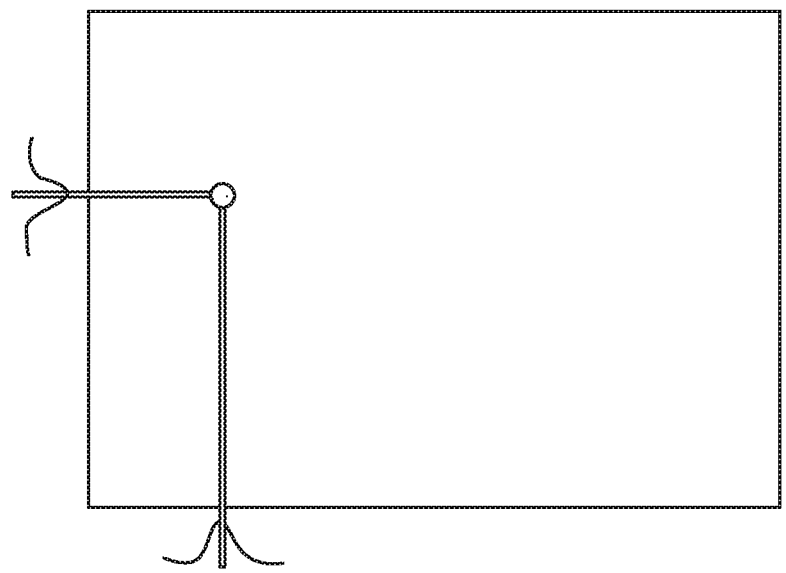
FIGS. 21-23 illustrate geometric projections of spots emitted by an active optical stylus along the edges of a sensor sheet.

In a basic embodiment of the technology, the stylus emits a single ray or cone of light, probably coaxially with respect to the stylus body. A single ray of light will cause simple, point-like projections of this pattern along the sides of the sensor sheet, allowing us to infer the position of the stylus. FIG. 21 shows the geometric projection of a spot emitted by a simple stylus along the edges of the sensor sheet. The maxima of the light detected by the linear light sensors along their lengths gives us the geometric projection of the illuminated spot on the sensor sheet. From this we can infer the sensor position.

Figure 22:
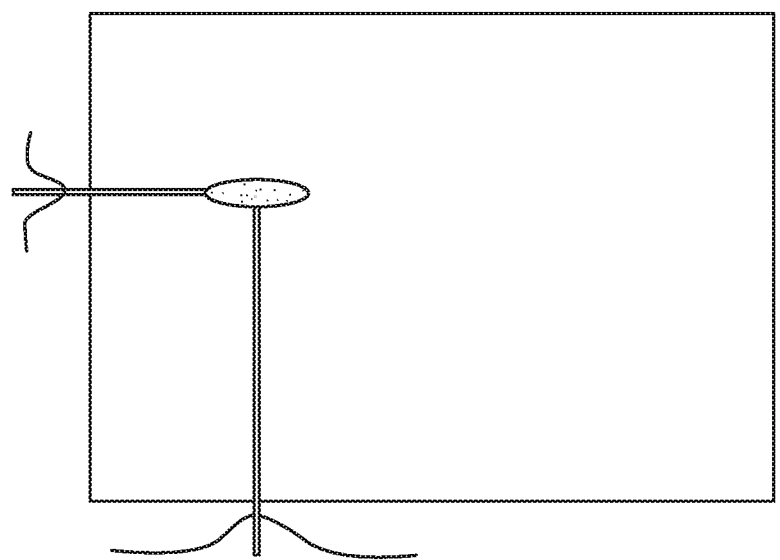

If the stylus emits a cone-shaped beam, it will intersect the sensor sheet in a circle (if the stylus is held perpendicular to the surface) or in an ellipse (if the stylus is tilted away from perpendicular). The projections of these intersections will have different shapes and widths allowing us to infer the tilt angle, as well as the angle relative to the sensor sheet edges that the stylus is being held. FIG. 22 shows the geometric projection of a spot emitted by a simple stylus along the edges of the sensor sheet. The maxima of the light detected by the linear light sensors along their lengths gives us the geometric projection of the illuminated spot on the sensor sheet. From this we can infer the sensor position.

Figure 23:
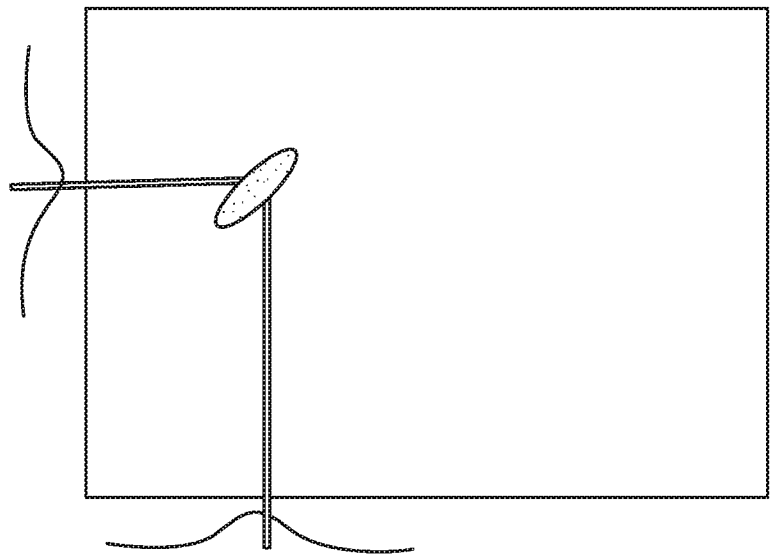

As shown in FIG. 23, if the stylus emit a cone of light, instead of a ray of light, where that cone intersect the sensor sheet will cause an ellipse. The projection of the ellipse may be different in one direction than it is in the other, allowing us to infer the tilt of the stylus.

Multiple Spot Embodiment

Figure 24:
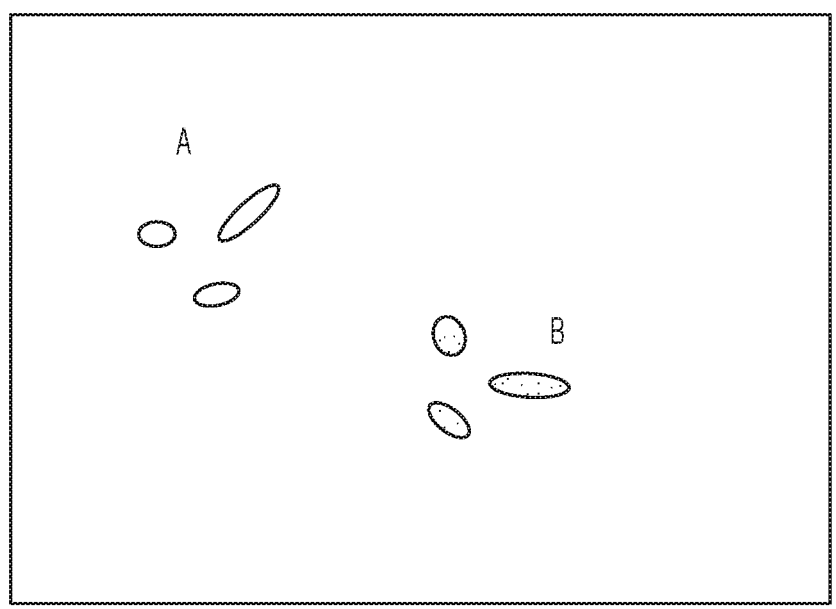
FIG. 24 shows a top view illustrating multiple patterns projected onto a sensor sheet.

If the stylus projects multiple patterns onto the sensor sheet, the projections of these along the sides of the sensor sheet can be used to infer the position, tilt and rotation angle of the stylus. As shown in FIG. 24, if both projections are wider than we would expect for a stylus held perpendicular to the sensor sheet, and yet are nearly equal in size, it is probable that the stylus is tilted at a 45-degree angle to the direction of the edges of the sensor sheet. The width of the projections can be used to infer the tilt angle from the vertical. The wider the projections, the greater the tilt.

Figure 25:
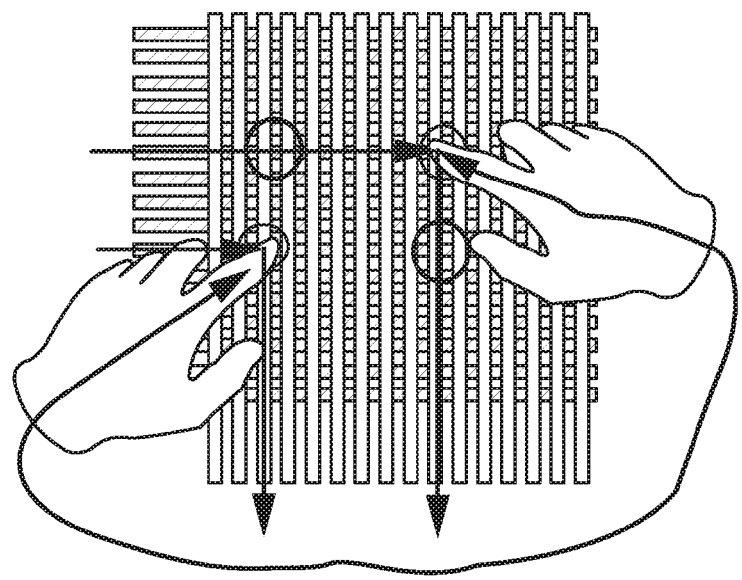
FIG. 25 shows a schematic top view illustrating crosstalk in an orthogonal signaling sensor when touched by two hands of the same person.

With reference to FIG. 25, if the stylus emits multiple patterns of light around its circumference, the projections of these along the edges of the sensor sheet can allow us to infer the sensor tilt and also the rotation around its axis, along with the location at which the stylus is touching the sensor sheet. The number and arrangement of the patterns projected by the stylus must be carefully chosen. For example, the patterns should not be evenly spaced around the circumference of the stylus because that might cause multiple rotation angles of the stylus to have the same projected light patterns along the edges of the sensor sheet. Even if this were the case, although the absolute rotation of the stylus could not always be measured, small relative rotations could be measured, which could still provide useful information to the user interface. The most straightforward way to infer the stylus position, tilt and rotation from the geometric projections of its emitted patterns might be to measure the projections for a wide variety of stylus positions, tilts and rotations, and then to map onto and interpolate between these to get from the projections back onto the stylus parameters. The two stylus patterns shown at A and B are identical, except that the stylus has been moved farther to the lower right and rotated clockwise by 45 degrees.

Solar Blind UV

Sunlight contains many wavelengths of light, and these might interfere with operation of the stylus system if that is used in sunlight. It would be advantageous for the stylus to emit at a wavelength which is either nonexistent or very weak in the solar spectrum as experienced at the earth's surface. One possibility is for the stylus to emit light in the solar blind region of the ultraviolet, where the oxygen in the earth's atmosphere absorbs most or all of those wavelengths. LEDs that emit in the solar blind portion of the UV spectrum are available on the commercial market.

A similar argument could be made for wavelengths of light from other sources (natural or artificial) that might impinge on the stylus system and impede its use.

Multiple Stylus Embodiment

If it is desired to use multiple styli simultaneously, a method must be used to disambiguate the signals from each. For example, time-division multiplexing can be used, in which case each stylus takes a turn emitting patterns (e.g., as shown in FIG. 20) into the sensor sheet.

Multiple styli could also use different direction-changing means, so that each could emit at a different wavelength and these different wavelengths could be distinguished after the direction-changing means by the linear light sensors.

In certain embodiments, all of the styli emit at the same time with the same wavelength, and disambiguate their contributions to the geometric projections along the sides of the sensor sheet in software or firmware, using knowledge of the possible and likely trajectories of the styli as they are being used.

User, Hand and Object Discrimination

Described above are various embodiments of capacitive FDM, CDM, and FDM/CDM hybrid touch sensors which may be used in connection with the presently disclosed orthogonal signaling touch user, hand and object discrimination systems and methods. In such sensors, touches are sensed when a signal from a row is coupled to a column and received on that column.

With reference to FIG. 25, in an orthogonal signaling touch sensor as described above, when a user touches with multiple fingers, crosstalk occurs as the signal from a row is coupled not only to the column where the touch occurs, but also to the columns of other touches by the same user. FIG. 25 shows the path of the crosstalk through the body of the user from one finger to another. In the figure, arrows show the path of the signals, white circles show the location of the sensed touches, and black circles show the location of the crosstalk among touches, i.e. where the crosstalk will be sensed on the touchscreen. This crosstalk signal is weaker than "real" signals because the signal from the row attenuates as it crosses through the body of the user.

The signal that is coupled across the body of the user attenuates as it travels through the body. As such, the signal sensed on each column that has traveled this path is considerably weaker than the signal sensed on each column from the touches themselves. This difference is helpful in distinguishing true touches from crosstalk "phantom" touches that are due to this coupling across the body. In general, a simple thresholding a received signal levels can distinguish these two signal strengths.

Figure 26:
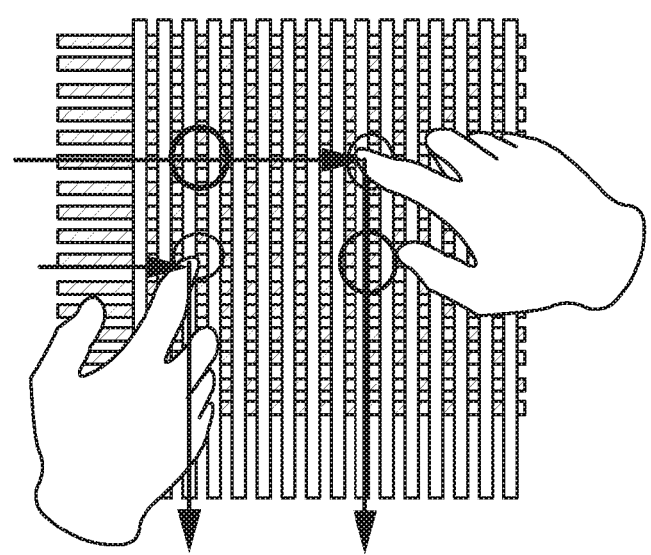
FIG. 26 shows a schematic top view illustrating lack of crosstalk in an orthogonal signaling sensor when touched by two hands of different persons.

A basic approach set forth in the section entitled "User-Identification Techniques" above looks for crosstalk caused by signal jumping between fingers of an individual user. If crosstalk is present, touches are deemed to come from same person. If not, they are deemed to come from multiple people. Referring to FIG. 25, this approach looks for crosstalk in the black circle areas after determining that there are two touches in the white areas. When this crosstalk is present, the two touches are deemed to come from the same user. FIG. 26 shows the same two touches made by two users, one finger from each user touching the touchscreen. Because the signal from each row does not couple to both columns, there will be no crosstalk between touches, and thus there will be no crosstalk present in the areas represented by the black circles. Accordingly, these two points can be recognized as coming from two users.

Another basic approach set forth in the section entitled "User-Identification Techniques" above sweeps the sensor for received signal, and identifies signal levels as "background noise", "touches", or "crosstalks". Two touches are deemed to come from the same user if there is an identified crosstalk signal that includes both touch frequencies. This basic approach ignores touch and crosstalk position and relies on traversing the identified touches and crosstalk signals to matching touch frequencies with crosstalk frequencies. The benefit of this basic approach, when compared to that discussed above, is that this method alleviates the need identifying the black areas depicted in FIG. 26. Whenever the need for further disambiguation arises, crosstalk and finger position can to be taken into account.

Figure 27:
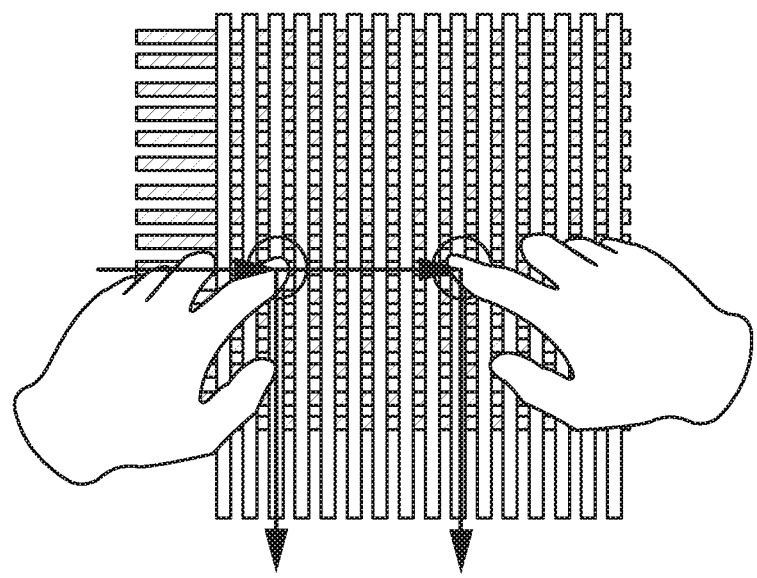
FIG. 27 shows a schematic top view of a sensor illustrating a problem that arises when two touches share a row or column.

However, a problem arises with some touch configurations in which the crosstalk points may be ambiguous. A simple example is that of two fingers that share an X or Y, as shown in FIG. 27. These two touches are hard to identify because the crosstalk that occurs between the points is masked by the touches themselves. That is, in this configuration, one cannot tell if these touches come from same person or multiple people. If the touches came from the same person, any crosstalk would produce an identical signal to that produced by the opposite touch point—thus one cannot directly determine that the signals were produced by crosstalk instead of an actual touch event.

A possible solution for the problem described immediately above is to check each touch for multiple frequencies. When two or more frequencies are measured, touches are identified by the frequency of greater magnitude and associated with other touches based on the secondary, less intense, frequencies present in the touch signal.

Figure 28:
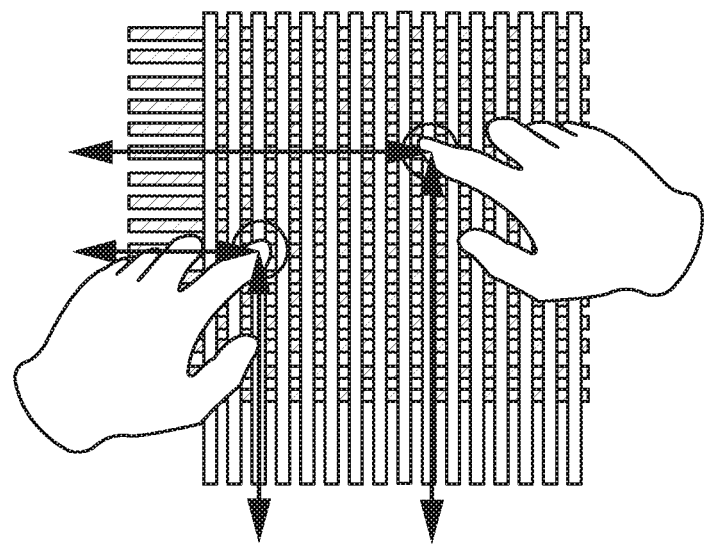
FIG. 28 shows a schematic top view illustrating an embodiment of the presently disclosed user, hand and object discrimination system wherein the touchscreen and/or processor are modified so as to generate orthogonal signals on every row and every column, and to sense all signals on every row and every column.

With reference to FIG. 28, in an embodiment of the presently disclosed discrimination techniques, the touchscreen and/or processor are modified so as to generate orthogonal signals on each row and each column, and to sense all signals on each row and each column. Touch sensing occurs in the same manner as described above, with the users' fingers coupling a signal from a row to a column or a column to a row. However, the system is now able to group touches both from crosstalk coupling row-to-column and crosstalk coupling column-to-row.

Beyond sensing coupling from row-to-column and column-to-row in order to determine touch locations, in an embodiment the disclosed system is capable of sensing row-to-row coupling and column-to-column coupling. In accordance with the previous system and method described above under the heading "User-Identification Techniques," in a one-finger touch, there is no signal from a row that is sensed by other rows. Similarly, there is no signal from a column that is sensed by other columns. Consider that each row and each column will have to ignore the signal they generate, since it will be present and very "loud", e.g. strong. Also consider that a row will probably see its neighboring rows when there is a touch since a finger is large enough to span multiple rows.

Figure 29:
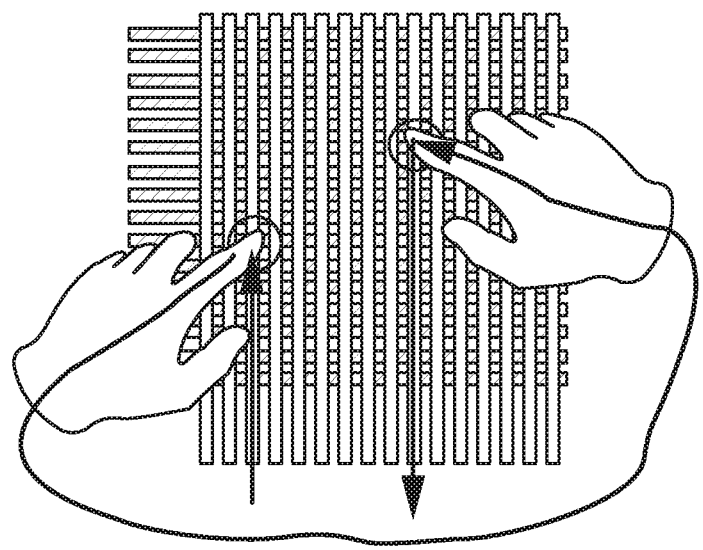
FIG. 29 shows a schematic top view of a sensor illustrating an instance wherein a single user is making two touches on the display, and a signal from one row is passing through his body to another row.

When a user touches the touchscreen with two or more fingers, he does couple the signal from a row to other rows, and the signal from a column to other columns. This crosstalk among rows and among columns is similar to the crosstalk among row/column pairs and can be used to determine that multiple touches are generated by the same user. FIG. 29 shows one such path from a row to another row. In this case, a single user is making two touches on the display, and the signal from one row is passing through their body to another row.

In accordance with FIG. 29, a signal generated on one column is coupled through the body of a user to another column, where it is sensed. When a signal is coupled from row-to-row or column-to-column one can determine that the two touches are coming from the same user. This figure only shows one signal path for clarity, but the same pathway will be present for signals traveling in the opposite direction, as well as row-to-row crosstalk as well as row-to-column and column-to-row coupling described previously.

Figure 30:
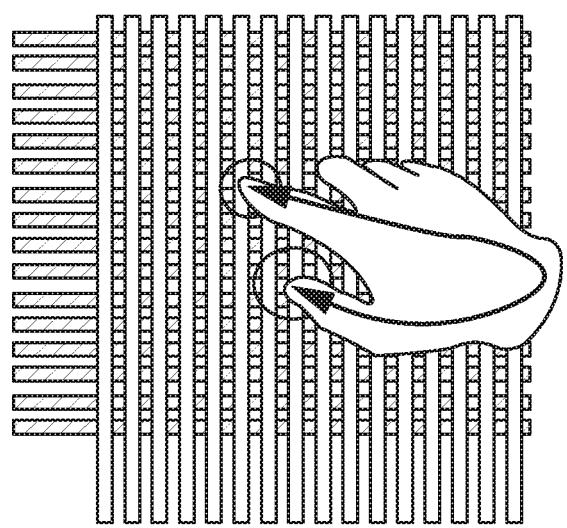
FIG. 30 shows a schematic top view of a sensor illustrating an instance wherein a signal is coupled through a user's hand.

FIG. 30 is a variation of FIG. 29, where the signal is coupled through the user's hand rather than between hands. In accordance with FIG. 30, a signal generated on one column is coupled through the body of a user to another column, where it is sensed.

Figure 31:
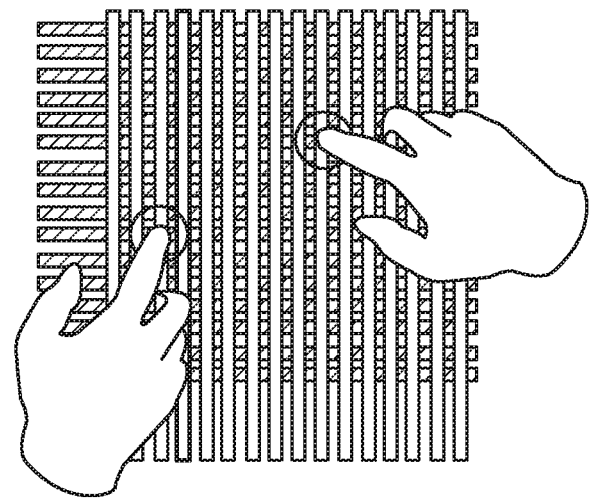
FIG. 31 shows a schematic top view of a sensor illustrating an instance wherein two touches are made by two different users and there is no row-to-row coupling or column-to-column coupling as there is no pathway for the signal to travel between users.

FIG. 31 shows two touches made by two different users. In this case, there is no row-to-row coupling or column-to-column coupling as there is no pathway for the signal to travel between users. With no coupling, these two points can be deemed to come from two separate individuals.

In an embodiment, the strength of the crosstalk is used by a processor, circuitry or other hardware to determine if the multiple points come from one hand, two hands of the same person, or touches from multiple people. The attenuation of a signal through the body differs depending on the number of hands used and the distance that the signal has to travel. Heuristically, the attenuation from finger to finger on one hand will be less than the attenuation from finger to finger on two different hands of same person, which will be less than the attenuation from the finger of one person to finger of a different person. The strength of the crosstalk can be used by the processor, circuitry or other hardware to distinguish two or more touch events, such as by distinguishing a two-handed gesture from a one-handed gesture, distinguishing two touch events as having been initiated by different users, distinguishing a passive object from a hand, identifying a passive object whether a user is touching the object or not, improving palm rejection and improving accidental-touch rejection.

By having multiple thresholds, one is able to determine, for example, if two touches come from one hand, two hands of the same person, or the hands of different people. In an embodiment, such thresholds are set adaptively as the touch-sensitive device is being used.

It should be noted that determining the physical source of a touch (hand, user, etc.) need not occur on each frame of input. In fact, it can occur as infrequently as once per the duration of a particular touch being made on the device. In some embodiments, it may be desirable from a performance, power, or other point of view to limit this checking appropriately. It can be done, for example, by intentionally checking only once, when the user first makes contact. Alternatively, the user differentiation checks can be on a slower cycle than the sensor (e.g., checking once every n frames, or once every m milliseconds). In contrast, user differentiation can be checked off-cycle with the rest of the sensing process.

In one such embodiment, the complexity of the system is reduced by time multiplexing the transmitting and receiving from row-to-column and column-to-row, and possibly by row-to-row and column-to-column as well. In this embodiment, the same orthogonal signal generation hardware and signal receiving hardware can be time-multiplexed to generate on rows and then columns and receive on columns and then rows and so on through the use of high-speed switches. In this manner, the required number of signal generators and receivers is significantly reduced.

Labeling

As we have described, it is desirable to be able to 'group' touch contacts by user—ideally, identifying contacts that come from the same hand, but also identifying contacts from the same user. As would be understood by one skilled in the art, labeling of a touch contact across scan cycles of a sensor device is done manually. In embodiments of the present invention, there is no "scan" per se, but there is nonetheless what might be thought of as an input frame each time the array is sampled, which might be thought of as a discretization of a user's continuous contact with the display. This discretization means that, from one frame to the next, devices must determine which contacts have persisted, and which have been replaced with a new contact. In various embodiments, the presently disclosed system and method of user, hand and object discrimination has at least three intersections with the area of labeling: the need to provide labels across frames, improving traditional unique labeling of contacts, and the use of traditional labeling to improve user identification.

The labeling of a contact across input frames is critical to traditional user interfaces built for touch (and non-touch) input. For example, if a user holds a button down, it should not activate. Two consecutive input frames may show a contact on the button; but is it the same one, or has the user lifted their finger and placed it back on the device? If the former, the button should not activate. If the latter, it should. This extends to continuous gestures as well: the dragging of an item might terminate when the finger is lifted from it; for each frame of input during the drag, the system must determine: is the contact that is a few millimeters away from the one in the previous frame the same finger, having moved between frames, or has the user lifted their finger, terminating a drag, and is now intending to point at a new item.

Traditional techniques for labeling of a contact involve heuristics such as examining the signal attributes describing the contact (e.g., signal strength), its shape, its orientation, and its proximity to a former contact. While an embodiment of the present invention may employ some or all of these traditional methods, the labeling of contacts can be further enhanced by the user differentiation techniques described herein: if two contacts, each seen in different frames, are being made by different users, the matter is settled: this is not the same contact.

Just as persistent labels are generated for contacts in a traditional device, a device employing the present invention would be enhanced through the labeling of contacts as belonging to the same user across frames. This might be called a "user ID" (UID) for a contact. It is noted that UID's might further identify a hand, and in this document "UID" is used to refer to embodiments in which hands are differentiated, and those where they are not. In embodiments in which the hands are differentiated, the UID would typically identify both user and hand. The labeling of contacts as belonging to the same user across frames would typically, though not always, be in addition to a traditional touch ID. In most embodiments of the present invention, the UID of a contact are continuously refreshed. However, in some embodiments, steps are taken to ensure the UID's persist.

For example, two users each put down a finger on the device, two unique UID's would be assigned to those contacts. As the users' fingers are moved across the display, those ID's would persist. When a second finger was added by each user, the present invention would pair those detected contacts, and apply the same UID's to the new contacts from each user. If one user then lifted their original finger, the UID of the second finger would persist, rather than generated anew. Further, if additional contacts were made to the device by that user, the UID would persist. In general, the goal is not only to differentiate touches between users, but also to, as much as possible, group touches within a user.

As discussed above, in some embodiments of the presently disclosed discrimination system and method, 'masking' may occur in which two contacts (or proximate finger detections) are made to the same sensing portion (row or column), which prevents the detection of cross-talk and thus user ID. In such embodiments, the labels applied to each contact, which persist across frames using the techniques described above, would be used to provide the UID. For example, if two fingers are touching the display, and are slid across its surface, each frame of input senses the contact and generates a UID. Just as the labeling of a contact across frames is enhanced by the UID as described above, so too is the generation of UID's aided by labeling in this special case.

When the touch is first made, as in traditional input devices, the contact is labeled in a way which persists across frames, using, for example, the techniques listed above. As the two fingers slide across the device, they might simultaneously come into contact with the same sensing row/column. For the input frames generated while the user is in contact with that row, no UID could be generated (in embodiments not employing the technique described above). A device utilizing the presently disclosed discrimination techniques could generate the UID, however, given the knowledge that the contact hasn't changed (i.e., contact "1" is still contact "1", and contact "2" is still labeled contact "2"), and copying the UID from an earlier frame.

Application Areas

Current multi-touch software interfaces in mobile and stationary computing typically cannot discriminate between different hands, whether from different users or the same user. The result is that single-user and single-display groupware applications must mitigate significant gestural ambiguity when interpreting the true intent of received user input which adversely limits application design, features and functionality. The presently disclosed techniques will remove many of these limitations for touch and stylus computing systems that rely on capacitive sensing to detect tactile input. For single-display groupware applications where multiple users share the same touch-input surface, a computing system will be able to reliably discern whether sensed multi-touch input is coming from the same user or different users. This new level of understanding resolves common sources of gestural input confusion such as discerning between two discrete single-touch drag events from two different users and a pinch-to-zoom event triggered by two fingers from the same user. Where any two contacts moving apart may previously have 'ZOOMED' a UI, a system employing the present invention might instead, when identifying the two contacts as coming from different users, 'tear' the object in half, or make a copy.

Objects

Objects other that user hands can be identified. Passive objects can be identified by a number of touches that are identified by the described technique. These multiple touches may be in characteristic relative positions to be able to disambiguate one object from another. In an embodiment, the positions of the touch points of one object can be in an equilateral triangle, while those of another form a non-equilateral triangle, a rectangle, or some other set of touch points that can be distinguished by their relative positions. In this way, objects can be distinguished from each other, and their translation and rotation with respect to the touch surface can be determined.

In an embodiment, the spacing of the touch points is not a simple ratio of the row or column spacing, allowing the translation or rotation of the object to be measured more accurately than if it were.

Figure 32:
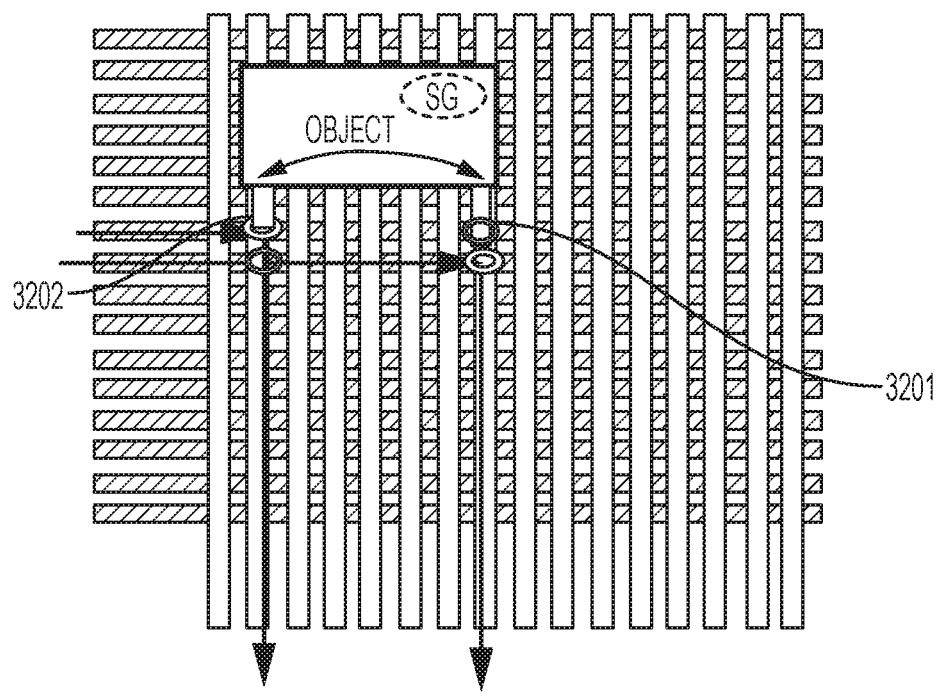
FIG. 32 shows a schematic top view illustrating an object resting on top of a sensor.

FIG. 32 shows an object resting on top of the sensor. In an embodiment, the object is a passive object without a signal generator SG. Such object can have a number of prongs that touch or are very close to the screen, and are electrically connected between them. As it is the case with users, this allows row-to-row or column-to-column coupling and the ability to identify what touches belong to the same object. Object identification can be achieved by identifying a number of prongs that are connected together and form a specific pattern, or by switching to electrical connections between the touches in a pattern that is recognizable to the touch surface. Thus, when a signal is coupled from row-to-row or column-to-column one can determine that the two touches are coming from the same object.

In an embodiment, the object shown in FIG. 32 is an active object equipped with a signal generator SG, emitting signals that can be detected on the columns, rows or both. These signals identify any contact as originating from the particular active device.

In an embodiment, active objects may be implemented by having multiple contact points which are connected or unconnected according to one or more switches. These switches can connect one or more of the touch points together when closed. The switch or switches may be opened and closed in a characteristic pattern in order to disambiguate one object from another.

Combination with Objects

In certain situations, it may be desirable to identify when contacts are made with objects held by the user. The present invention provides further enhancement to the user experience in such a situation. For example, the user might touch the screen with a stylus, which would be used for writing, differentiated from input made with a finger, for manipulation. The present invention can provide at least two advantages: easier identification of the object, and labeling of contacts as being made by the same user and/or hand holding the object.

Utilizing the user, hand and object discrimination techniques disclosed herein, labeling of objects which generate signals is significantly eased. A device employing the present techniques can be equipped with a signal generator to generate signals at a unique frequency, or at a frequency shared by more than one device or by signals that the touch surface can otherwise uniquely recognize. In some embodiments, the device can be recognized by its unique frequency, or by means of modulation of amplitude, frequency, or other known method. In so doing, the user can be assured that the device would receive a differentiated response from the system. For example, touching one pen to the screen might generate blue ink, another, red ink, their finger, translation of the canvas in a drawing application.

Additionally, a differentiated object, once identified, could also be labeled as being held by the same user making other contacts. This is possible with an active device, generating a signal picked-up by the digitizer, or with a passive device which is detected in the manner described above. In either case, further contacts made by the hand holding the device, or by other parts of the user's body, are differentiable in the same manner earlier described, and, in some embodiments, would be labeled with the same UID as those contacts. This could enhance the user experience in many ways. As an example, the system can be configured to choose to ignore touches from the hand holding the device, enhancing palm rejection, allowing the user to safely rest their hand on the screen while writing, while giving input with their other hand.

In some embodiments, a device can be configured to emit two or more different signals: at least one for recognition of the device, and at least one for coupling to the user as has been described. As an example, a stylus might generate one signal at its tip for location sensing, and a different one around its body for user pairing. In still other embodiments, objects might generate a signal only for the purposes of pairing (such as the watch described herein, or an otherwise passive stylus).

In an embodiment, a device can be configured such that objects enable user differentiation to persist across input frames. For example, in some embodiments, if a user were to wear a watch, hold a pen, or carry a mobile phone which generated signals of the type described herein, their touches to the device would carry that signal. Thus, touches made seconds, minutes, days, or years apart could be known to be coming from the same user (or, known to have both come from a user in contact with that device).

Operating at Mitigated Sensitivity

In order to lower the power consumption of a computer input device, we note the fact that the input device is used less than 100% of the time. Therefore, during the times when the input device is not in use it can be changed into a different mode that consumes less energy or otherwise operate with mitigated operating sensitivity. As used herein, "power" and "operating sensitivity" include but are not limited to power consumption, event frequency (i.e., update rate, which is strongly related to temporal resolution), touch sensitivity, spatial resolution (e.g., processing every other row or every row), touch latency, signal-to-noise ratio (which is strongly related to user interface accuracy and therefore the user experience), computational power, frame rate, user experience and availability of hover detection.

Further, we note that the computer system will not always require that the input device be operating at its highest performance level, because the user is using the system to perform a task that does not require the input device's full level of performance. Therefore, during these periods the computer system can place the input device in a mode that consumes less power, but may have lower performance.

The computer can place the input device in a power saving mode by automatically detecting that the full level of performance is not needed, or the input device can be commanded to operate at a lower power, lower performance level by application logic.

In an embodiment, there can be a plurality of modes—each of which has a different trade-off between operating performance and power consumption.

In an embodiment, the input device is a touch sensor.

In an embodiment, the input device is a multi-touch sensor.

In an embodiment, the input device is a low-latency touch sensor.

In an embodiment, the input device is a low-latency touch sensor that relies on orthogonal signals as disclosed in U.S. patent application Ser. No. 13/841,436 filed Mar. 15, 2013 entitled "Low-Latency Touch Sensitive Device," U.S. patent application Ser. No. 14/069,609 filed Nov. 1, 2013 entitled "Fast Multi-Touch Post Processing" and U.S. Patent Application No. 61/845,892 filed Jul. 12, 2013 entitled "Fast Multi-Touch Post Processing." The entire disclosures of such patent applications are incorporated herein by reference.

One application of this will be when the user is not using the input device, wherein the device will go into a low-power mode which may have degraded performance such as higher latency, lower update rate, etc. As soon as the user begins to use the input device, the device is immediately put into a higher performance mode, perhaps the full performance mode.

It may even be possible to leave the device in a lower performance, lower power state even after the user begins using the input device if it can be done for a short time period during which the lower performance of the input device is unlikely to be perceived by the end user or to effect the user's experience or productivity.

Different user action such as inking, drawing, scrolling, etc. may require higher performance than other user actions such as taping, menu picking, etc. In situations that require higher performance, the input device may be placed into a higher performance mode that may consume more power. In situations that do not require as much performance the input device can be placed into a lower power mode that may have lower performance.

In some embodiments, the characteristic of the input might indicate that a higher performance rate is required. For example, an input stroke that has a number of direction changes, might require a higher frame rate to capture the nuance of the stroke. Upon detection of such a shape, the device might be put into a faster mode. Conversely, an unnuanced stroke might indicate a lower sampling rate might be sufficient, and so the frame rate might be decreased. Similarly, the immediate vicinity around a finger might be sampled at a higher rate.

One user interaction with the device might be a non-contact mode such as hovering over the device with a finger or a stylus. In situations that may require less spatial resolution, less time resolution, or less input information such as single touch as opposed to multi-touch, the device can be put into a lower power mode that will still provide the requisite level of performance (spatial, temporal, etc.).

In an embodiment, the performance of the input device can be increased if the computer predicts that the user will soon require a higher level of performance. For example, if the device detects a user's finger hovering near but not touching a touch input device, it can use that information as a trigger to increase the performance of the touch input device such that when the user's finger finally touches the input device the input device has already ramped up to a performance level that will be required for a good user experience.

In an embodiment, the state of the application might indicate that a higher frame rate is required. This might be inferred by the operating system, by characteristics of the system utilization, or explicitly by the application, for example via inter-process communication, function call, or other means.

In an embodiment, the computer system can utilize algorithmic prediction techniques to create a temporal and/or spatial prediction of how the user will utilize the device next including when and where the user will next provide input. Specifically, for a touch input device, such as a temporal or spatial prediction of when and where a finger or stylus will contact the display could be used to put the user input device into a mode with a more appropriate performance/power-consumption mode or trade-off.

In an embodiment, we can use sensor fusion so that predictions on a plurality of sensors or user input devices included in the computer system can be used to algorithmically predict the required mode of performance/power-consumption trade-off. For example, in an embodiment, the accelerometer built into a smartphone can be used to change the mode of a touch-screen. The time history of the acceleration of the phone may be able to predict when a user is about to or has just touched a touch input device, and therefore can change the performance/power-consumption mode of the touch input device. In another embodiment, the thresholds and logic governing the switch from one power/performance trade-off mode to a different mode incorporates the battery level of the device as well as depending on the availability or condition of an external power source.

Statistical knowledge of the probabilities of accurately detecting these events can be used to optimize the power consumption of the device by trading off false alarm and correct detection rates (Receiver operating characteristic statistics), so that the power consumption and user experience are properly aligned. This optimization can be done either ahead of time at design time, manufacture time, or it can use learning techniques to adapt to a particular user's history and habits.

In an embodiment, a touch input device that can detect touches over an area can be placed into modes where different portions of the area have different performance/power-consumption trade-offs. For example, the entire touch area could be put into a mode where it cannot detect where within the area the user is touch but simply that it is being touched somewhere in the area. Likewise, some portion of the touch area can be placed into a mode with a specific trade-off between spatial resolution, temporal resolution, latency, or other touch parameters, while other portions of the touch area have different trade-offs of these parameters. In an embodiment, the portion of the touch area which controls a slider UI control may be in a mode with higher spatial and temporal resolution and lower latency than a portion of the touch area that has a push button and will require less spatial or temporal resolution and can withstand higher latency interaction while still providing the user with a satisfactory user experience.

In an embodiment, the input device's power/performance trade-off mode can be explicitly defined by the user via a human-to-computer interface, for example a control panel.

In an embodiment, there are a plurality of input devices. Each of them can be placed in a different power/performance trade-off mode to optimize the user's experience. For example, a single game console controller could have two multi-touch pads for the user's left and right hands respectively—each of which could be in active use at different times during game-play.

Decimation Strategies

When a user provides input to a high-speed input device, such as the one described in U.S. patent application Ser. No. 13/841,436 filed Mar. 15, 2013 entitled "Low-Latency Touch Sensitive Device," the high number of input events generated can overwhelm other portions of the input stack. To address this, we describe a number of techniques that can reduce the number of events in the event stream, so that other portions of the input stack can act in a timely manner, and not be overwhelmed by the sheer number of events on the stack.

Disclosed herein are systems and methods for "intelligent decimation", in which input events are selectively thrown away, combined, filtered, replaced, or otherwise selectively passed along from the input device (or whatever layer is doing decimation) to the next levels of the stack.

It should be understood that any reference to input "events" is meant simply to describe the flow of information between layers, whether this describes discrete input events in an event-driven computing model or the physical 'event' of a user giving input and the resulting signal in a non-input-driven system.

It might be the case that the number of events output by a high-speed sensor is too high for the operating system/display unit to process in time thus causing bottlenecks, or even overflows due to the high number of events in the pipeline, waiting to be processed.

Decimation is the process of transforming one input stream into one or many distinct output streams with the same, fewer, or a greater number of events. This decimation can be intelligently instructed by models, algorithms, functions, knowledge of the state of the system (including but not limited to the input device and user interface) or as simple as a cut of a number of events in a specific frequency, or given a threshold.

Decimation is the filtering, combining, replacing, or otherwise selectively passing along information describing user input (either faithfully or through a model). Although "decimation" literally means the culling by 10%, we use the term broadly to describe any kind of change in volume of information flow. Decimation might take place at any step in the flow of information processing between the user's physical input and the result being displayed on-screen. In this specification, any reference to decimation occurring at one layer should be understood as potentially applying equally at any other layer as well.

Figure 33A:
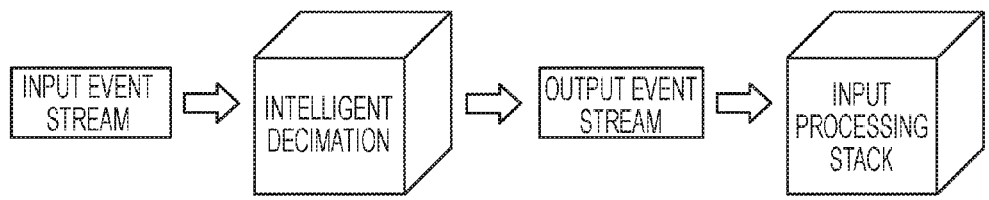
FIGS. 33A, 33B and 33C show diagrammatic views illustrating decimation processes.

FIG. 33A shows an overview of an intelligent decimation process. As shown, intelligent decimation takes an input event stream and filters, combines, replaces portions of, or otherwise selectively passes along this data to other portions of the system that act upon input.

Figure 33B:
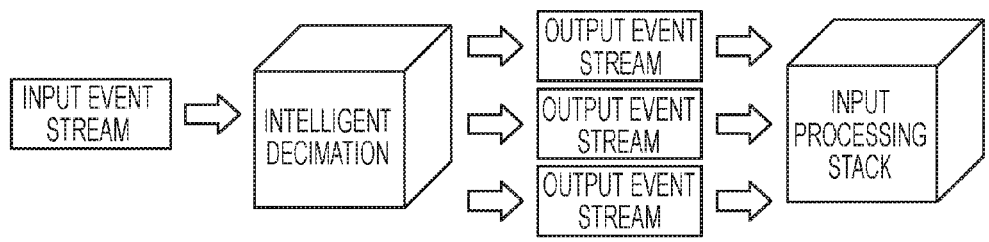

As shown in FIG. 33B, intelligent decimation may produce multiple output streams with the same or a different number of events.

Figure 33C:
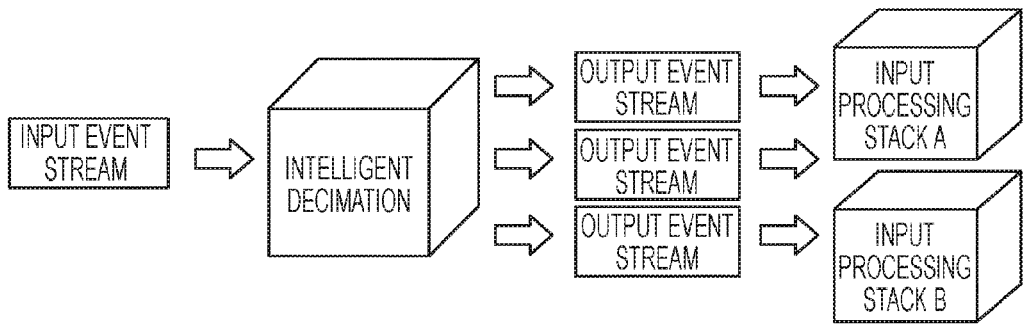

As shown in FIG. 33C, intelligent decimation may produce event streams that are passed to multiple input processing stacks, each of which may receive one or more output event streams.

The following sections describe a number of decimation strategies included in the presently disclosed system and method. It is understood that the system and method may use any one of these strategies, use derivations of the strategies described, or may combine a number of them to transform an input event stream into an output events stream destined for other portions of the system.

Every N Frames

In this embodiment, the input event stream is sampled every N events (where N is a tunable parameter, tunable meaning that it can be changed at arbitrary times by one or more components of the system) such that the output stream includes every Nth input event from the input stream, discarding the other N−1 events.

Figure 34:
FIG. 34 shows a diagrammatic view illustrating an example of intelligent decimation by "Every N Frames".
Figure 34:
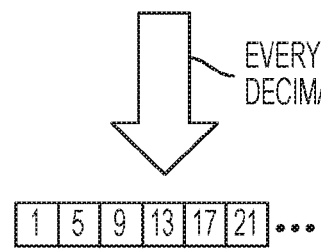

FIG. 34 shows an example of intelligent decimation by "Every N Frames". In this case, N=4 and every 4th input event from the input stream (top row) is included in the output stream (bottom row).

Every X Microseconds

In this embodiment, each input event in the input event stream is associated with a time, preferably the time at which the user input associated with the event occurred. The input event stream is sampled such that the output event stream includes events that occurred every X microseconds (or any other time unit required) in the input event stream, where X is a tunable parameter. In the case where there is not an event that corresponds exactly to the time value, the presently disclosed system and method could be configured to use the closest event from the input event stream, the next event, the previous event, create a fake event, or no event at all.

Figure 35:
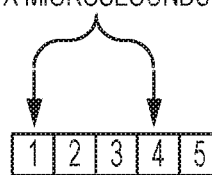
FIG. 35 shows a diagrammatic view illustrating an example of intelligent decimation by "Every X Microseconds".
Figure 35:
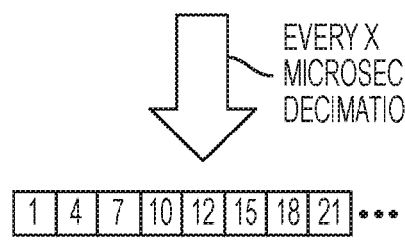

FIG. 35 shows an example of intelligent decimation by "Every X Microseconds". The input event stream (top row) is sampled every X microseconds, and those events that occur at these times are included in the output event stream (bottom row).

First and Last Input Event

When considering an input event stream, the first and last input events are considerably important as they indicate intent on the part of the user. When considering touch input, these first and last input events would correspond to the event generated when the user first activates the touch sensor and the final event generated when they lift their finger off of the touch sensor respectively. As such, in this embodiment, the first and last input events in the input event stream are included in the output event stream.

Figure 36:
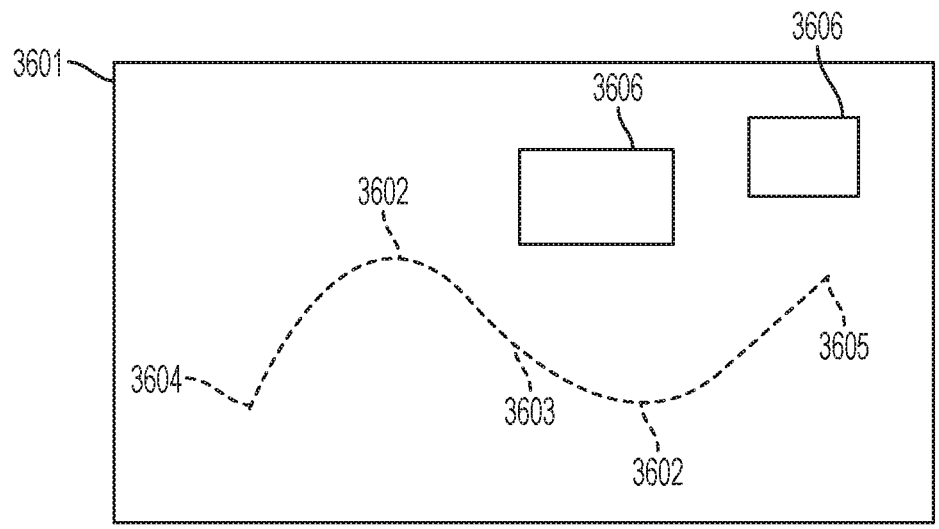
FIGS. 36-39 show illustrations of a display or portions of a display on which input is performed.

For example, consider FIG. 36 that includes a display or portion of a display 3601 on which input is performed. This display region 3601 may include a number of graphical user interface elements 3606. Consider the input event stream (dotted line) starting at the first event 3604 and extending to the last event 3605. In this embodiment, the first 3604 and last 3605 events would be included in the output event stream (an alternative scheme might provide only one of the first or last events).

Curvature

In this embodiment, the input event stream is sampled such that events that represent meaningful changes in the curvature of the input event stream are included in the output event stream. Consider FIG. 36, which includes a display or portion of a display 3601 on which an input event stream is performed (dotted line) starting at the first event 3604 and extending to the last event 3605. Events that correspond to the extent of curvature 3602 or the change in direction of curvature 3603 are included in the output event stream.

In a related embodiment, other characteristics of the input event curve can inform the decimation process. There are a variety of mathematical models that describe curves, and for any given model there is a minimum number of input events that are needed to reconstruct the curve. In this embodiment, only the events from the input event stream that are required to reconstruct the path of the input event stream are included in the output event stream. In this embodiment, the allowable error in curve reconstruction is a tunable parameter.

Input Mode

An input mode might explicitly select a decimation scheme. For example, a UI, application, or explicit user action might specify that less decimation is preferred in a given area or period of time. For example, when drawing on a canvas, one user-selectable 'brush' might provide smoother curves through curve-fitting to a more highly decimated input, while another brush might more faithfully follow the actual input of the user.

Input Hardware Characteristics

Input sensors are known to have non-uniform sensing capabilities. For example, capacitive touch sensors might have the tendency to 'snap' input to the locations of the sense-traces, and vision-based sensors are affected significantly by ambient light and optical characteristics of their sensors. In some embodiments, these input characteristics are taken into account. For example, in devices exhibiting behavior similar to the known the 'snapping' of capacitive sensors, events which are not snapped to the sense lines might be selected over those which are, in effect smoothing the user's input. All input devices exhibit some sort of bias in the events they report, and this scheme accounts for and to an extent compensates for those effects.

Gestural Decimation

Characteristics of the input might themselves inform the selection of a scheme. For example, it is known in the art to "lock-in" a 1-dimensional scrolling action once a user makes a mostly 1-dimensional gesture within a UI element that could normally be panned in 2 or more dimensions (e.g.: <cite to Apple's 949 patent>). Certain embodiments of the presently disclosed system and method might similarly note the "lock-in" of the UI upon a 1-dimensional movement, and change schemes. In this instance, 1-dimensional scrolling might require fewer events, and so a more aggressive decimation scheme might be employed. Similarly, an input might indicate that no 'lock-in' will occur, and so scrolling might happen in 2 or more dimensions simultaneously. Under such circumstances, some embodiments might reduce the aggressiveness of the decimation, or switch to a scheme more 'friendly' to multi-dimensional movement (e.g.: the "curvature" scheme described above). Some might characterize the examination of characteristics of an input scheme to indicate a mode a "gesture"; certain embodiments might use the gestures described above, or any other pattern to be defined based on the needs of the system.

GUI Element Boundary Transitions

In an embodiment, the decimation process takes into account the layout of the graphical user interface (GUI) that the user is interacting with. If one considers the elements in the GUI as existing in a plane, or a 1D, 2.5D, or 3D, space that can be converted to a plane or any other shape and allows the GUI to determine where the cursor is touching, and the input events as being located in this plane, then the bounds of the GUI elements provide important information that can inform the intelligent decimation process.

Figure 37:
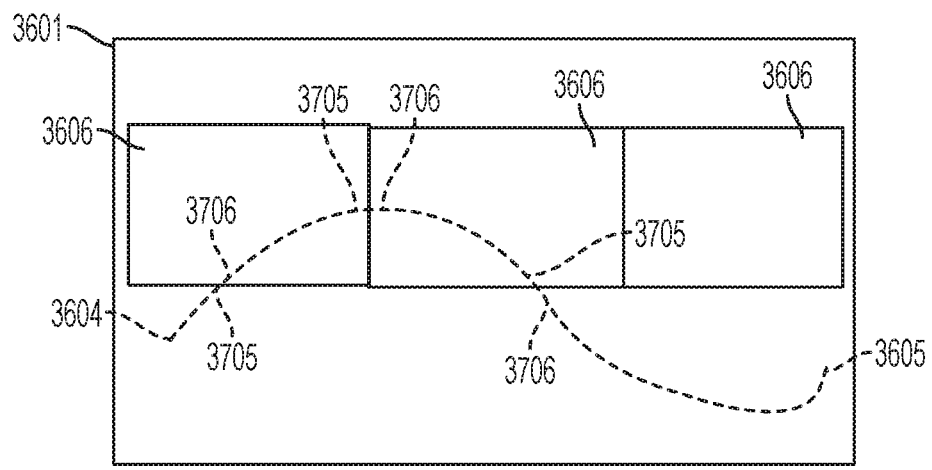

With reference to FIG. 37, many graphical elements are programmed to respond to the events "onEnter" and "onLeave" (or their equivalents). These events are called when the input events first move into or out of the bounds of a GUI element. As such, in this embodiment, when the input event stream (FIG. 37, dotted line) crosses the boundary of a GUI element 3606 (FIG. 36), the last input event outside of the element 3705 and the first input event inside of the element 3706 are both included in the output event stream, events at the border can be an alternative to 3705 and 3706. In similar embodiments, any combination of first, last, border event are included.

Note that a "last event inside" and "first event outside" might actually be the same event. For example, in FIG. 37, the left-most UI element 3606 has 'within' it one event labeled 3705 and another labeled 3706. That event 3705 is the last event inside the left-most UI element 3606, but it is also the last event outside the middle UI element 3606. In one decimation scheme, this single event might be duplicated and signaled to both of the UI elements. In another scheme, only one copy of one or both of these might be passed-along.

GUI Element Boundary

In an embodiment, the decimation process takes into account the layout of the graphical user interface (GUI) that the user is interacting with. If one considers the elements in the GUI as existing in a plane, or a 1D, 2.5D, or 3D, space that can be converted to a plane or any other shape and allows the GUI to determine where the cursor is touching, and the input events as being located in this plane, then the bounds of the GUI elements provide important information that can inform the intelligent decimation process.

Figure 38:
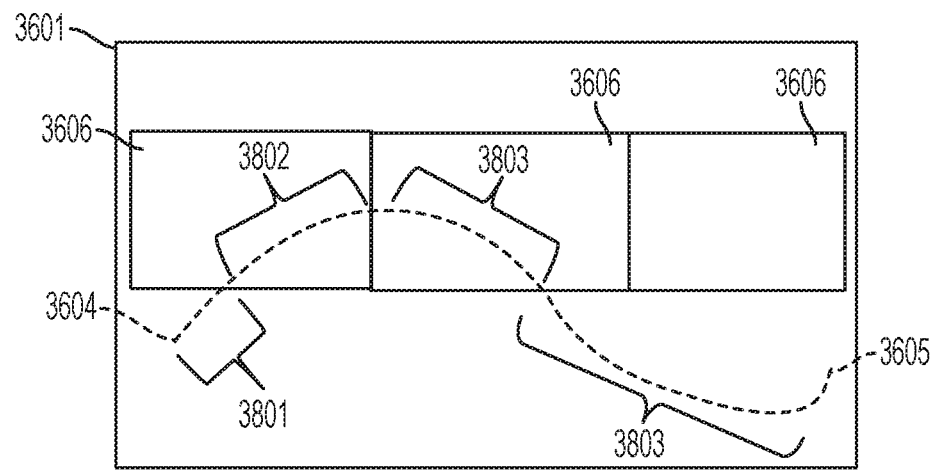

In this embodiment, shown in FIG. 38, the intelligent decimation processes chooses different decimation strategies for different sections of the input event stream 3801, 3802,3803,3804 based on their inclusion in or outside of the bounds GUI elements 3606. For example, those input events 3801,3804 that are outside of the bounds of specific GUI elements 3606 may be sampled at a lower frequency for inclusion in the output event stream than those input events 3802,3803 that are included inside of the bounds of GUI elements 3606. In a similar embodiment, those input events 3802 inside of one GUI element (left most 3606) might be decimated in a different manner than those 3803 inside of another GUI element (middle 3606).

Application software, or GUI toolkit software, can inform the touch sensor about the size/location/shape of GUI elements and that the decimation can take this information into consideration when choosing events to pass along, to drop, or to generate.

The decimator may pick the first event that is inside a GUI element and/or the first event that is outside a GUI element that the previous event was in. In this respect, application software can inform the touch sensor as to what events are most meaningful and can help drive the decimation process.

Multi-Modal Input

As described previously, the intelligent decimation engine may combine any number of the individual decimation techniques described in this document. In this embodiment, the system takes into account the input device being used by the user to generate input events. For example, in a system that includes both touch and pen input, detectable at any time of the input action, the disclosed system and method may use one set of individual decimation techniques and parameters for touch input while using a possibly different set of techniques and parameters for pen input. In an embodiment, the disclosed system and method may decide to switch decimation techniques at any point during interaction, accordingly to the actions being executed by a particular input device. In an embodiment, the scheme employed for a given modality might change when the user begins and/or stops making input with another modality.

Multi-User Input

As described previously, the intelligent decimation engine may combine any number of the individual decimation techniques described in this document. In an embodiment, the system takes into account the user generating input events. For example, in a system that includes several users, the presently disclosed system and method may use one set of individual decimation techniques and parameters for a first user while using a possibly different set of techniques and parameters for a second user. Further, events which are critical to differentiating input between users might be given extra weight in the decimation process, similar to events on UI boundaries described above.

Multi-Point Input

It is known in the art to track multiple 'points' (or areas) from a user in a single modality—for example, multi-touch input provides for tracking of multiple points of contact between the user and a sensor, and proximity sensors provide for tracking of multiple points of the user's body in proximity to the sensor. In some embodiments, different schemes might be applied to individual points. These schemes might be selected based on several factors, including but not limited to one or more of the user's input, a 'gesture' recognized by the system, the location of the point, the presence or absence of actual physical contact between the tracked object (e.g.: fingertip, pen tip) with a device, the speed or duration of a user's input, etc.

Application Informed

As described previously, the intelligent decimation engine may combine any number of the individual decimation techniques described in this document. In this embodiment, the system takes into account the application being run on the device, and may choose from among a number of decimation techniques and parameters accordingly.

Latency Informed

As described previously, the intelligent decimation engine may be aware of the input stack latency and, based on the input events, one or multiple, construct events, based on the touch velocity and system latency or any similar algorithm, that indicate where the future touch position is going to be.

Ambiguous Input

Figure 39:
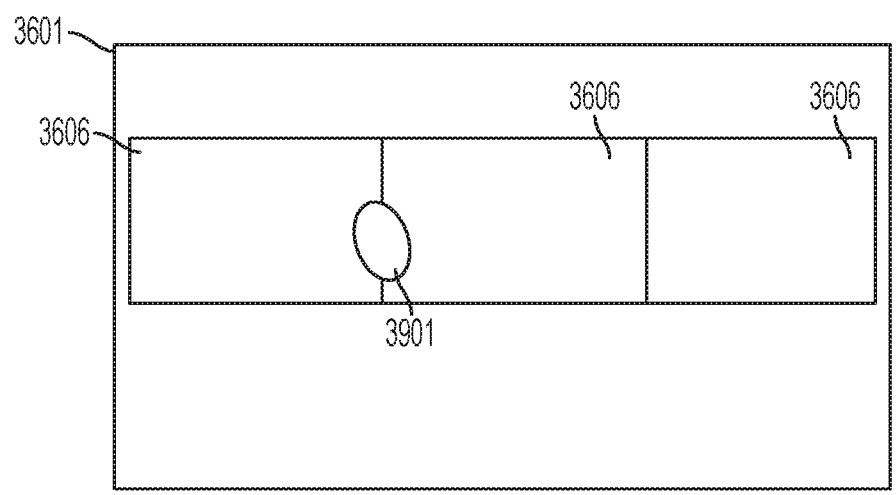

In this embodiment, the decimation engine may wait to include an input event from the input event stream in the output event stream if the input event is ambiguous in terms of user intent. By way of example, consider FIG. 39 in with input events that are generated by touches 3901 on a touch sensitive display. These input events have not only a point, but also an area of touch associated with them. In the case of an input event 3901 straddling two GUI elements 3606, this embodiment will wait to include in input event in the output event stream until subsequent input events disambiguate, or a timeout occurs, which GUI element 3606 the user is targeting.

Other Strategies

Once input is decimated, the system may make un-decimated input available to other layers of the stack. Either as a stream of input events or as a memory data bank. This availability does not affect the real-time of the input stream.

The system may request different kind of decimations processes and/or request previous, un-decimated events. The system may also inform how tune the decimation process, allowing for the decimation process to fine-tune how much decimation occurs based on the input device, action being performed, power consumption, or available processing power. Other variables might be used to fine-tune the decimation process. The system includes the remaining input stack, the operating system, any application, or be configurable by the user.

Once input is decimated, the system may make descriptions of the decimation available. These descriptions might, for example, be a pointer in memory to the chosen scheme, or other programmatic identifier. This descriptor might be passed alongside the results of decimation (perhaps, as an example, as part of an object describing the decimated or un-decimated input event).

The decimation scheme might be dynamically varied: one scheme might be selected for a given context, and switched to in another context. In some embodiments, more than one scheme might be used simultaneously. In such embodiments, a process (which might be thought of as a 'meta decimation' scheme) might make real-time decisions between the outputs of a plurality of schemes, or the results of a plurality of schemes might all be made available to a subsequent layer of the stack. This might occur contemporaneously, or one or more schemes might be passed along the chain, with the results of the others (and perhaps also the one sent) are stored for subsequent look-up.

Frequency Conversion

In order to decrease its power consumption and production cost, a capacitive touch sensor should perform as much signal processing as possible at lower frequencies. Techniques that can simply and cheaply lower signal frequencies are particularly valuable for low-latency, high event frame-rate capacitive touch sensors optimized for high performance input recognition. As such, this filing references, incorporates, and expands upon U.S. patent application Ser. No. 13/841,436 filed Mar. 15, 2013 entitled "Low-Latency Touch Sensitive Device," and U.S. patent application Ser. No. 14/069,609 filed Nov. 1, 2013 entitled "Fast Multi-Touch Post Processing," which contemplate a low-latency, high frame-rate capacitive touch sensor as an embodiment.

The high-speed analog-to-digital (A/D) converters required to support such a high-performance capacitive touch sensor consume considerable power and silicon die-size. These disadvantages and others, which will increase sensor power consumption and production cost, could be mitigated through techniques that lower a touch sensor's signal frequencies and thereby enable the use of slower A/D converters.

Another reason to down-convert the frequencies of interest is if a touch sensor in an embodiment is fabricated to use some processing technique, such as analog processing, that cannot be easily (or well) implemented at sufficiently high frequencies for a sensor to operate, or operate well, or be manufactured in a cost-effective manner.

Another reason to convert a sensor's operating signals would be to align these frequencies to a boundary that makes for easier processing. For example, spectral analysis processing using Fourier techniques can be more efficient if the frequency bands of interest are spaced at even intervals, often starting from (or near) DC. If "the frequencies of interest" (namely the sensor's operating signals) can be converted, either higher or lower, it is possible to make the signal processing more efficient by properly aligning the frequency bins. For example, in an embodiment, a Fourier transform and like techniques require that the frequency bins that a touch sensor's signals are broken into be evenly spaced to ensure efficient sensor operation. Therefore, a touch sensor may need to down-convert or up-convert its operating frequencies or signals regardless of whether a sensor is fabricated with more expensive, high-speed A/D converters.

One method of converting higher sensor signal frequencies pre-digital conversion to lower frequencies is through heterodyning techniques.

Heterodyning Techniques

Frequency conversion, or heterodyning, can be performed with a frequency mixer. Such a mixer can be either single or quadrature.

In a touch sensor that employs frequency division multiplexing (FDM), or that employs another multiplexing technique that is modulated onto a carrier, it may be desirable to convert a band of frequencies to a different band with a center frequency that is either higher or lower. For example, in the FDM case, it might be desirable to convert the sensor's original block of frequencies (representing the band of signals received from the sensor's row transmitters) to a lower center frequency to ease the digitization process and enable the use of slower and therefore cheaper A/D converters. The A/D converters used in connection with all embodiments disclosed herein may comprise sigma-delta A/D converters, such as continuous time sigma-delta A/D converters.

In an embodiment, the signals to be converted are first bandpass filtered to remove any extraneous signals or noise outside the band of the sensor's operating signals. The bandpass filter is optional and may be omitted if the presence of signals outside the sensor's operating band is negligible. The filtered signals are then put through a frequency mixer, which is fed with a local oscillator that has frequency $F_{LO}$. The frequency mixer outputs signals at the sum and difference of its inputs and the local oscillator. If the goal is to lower the frequency of the filtered signals, then the touch sensor will be fabricated to filter off the "sum" component of the mixer output and leave only the "difference" component, which comprises a lower-frequency version of the sensor's original operating signals. These lower-frequency signals can then be processed in a normal way, except that such processing can be done with components optimized for use at lower frequencies, such as a lower power, and perhaps less complex and therefore cheaper, A/D converter. As used herein, "local oscillator" means a signal source, not necessarily comprising a conventional oscillator. Such signal source could be driven, for example, by a table of values.

Figure 40:
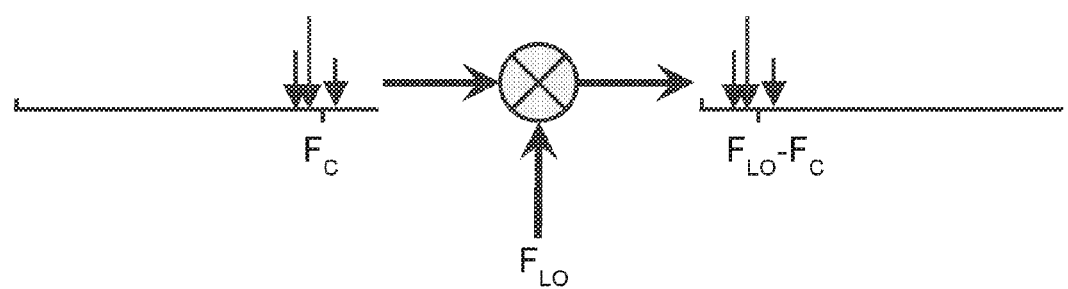
FIG. 40 shows a schematic diagram illustrating heterodyning of a set of frequencies to a lower frequency band using a single mixer and a "difference" signal.

FIG. 40 shows heterodyning a set of frequencies to a lower frequency band using a single mixer and the "difference" signal. Before entering the frequency mixer, the signals of interest are centered at frequency $F_C$. After mixing, they are centered at frequency $F_{LO}$-$F_C$.

In an embodiment, it may be desirable to convert a sensor's operating signals to a higher frequency band rather than a lower frequency band. One motivation to do so would be to shift some of the sensor's processing tasks to an existing component outside of the touch sensor within a given computer system that is better optimized to handle such higher frequency signals—such as but not limited to a commercial off-the-shelf (COTS) signal processing chip which is commonly found in other components of a computer system. In such a case, a touch sensor would be fabricated to choose the "sum" component of the frequency mixer output, and then to filter off any frequency component that is outside of the sensor's operating band.

In an embodiment, a quadrature frequency mixer is used to shift a sensor's operating signal frequencies to a different center frequency. The quadrature frequency mixer employs two frequency mixers that are driven from the same local oscillator, except that one of the mixers is fed with a copy of the local oscillator that has been shifted by 90 degrees. While the quadrature mixer requires more hardware, it has the advantage of being able to shift the signals of interest all the way down to "baseband", i.e. surround DC or "zero frequency", which is the lowest that such signal frequencies can go.

Figure 41:
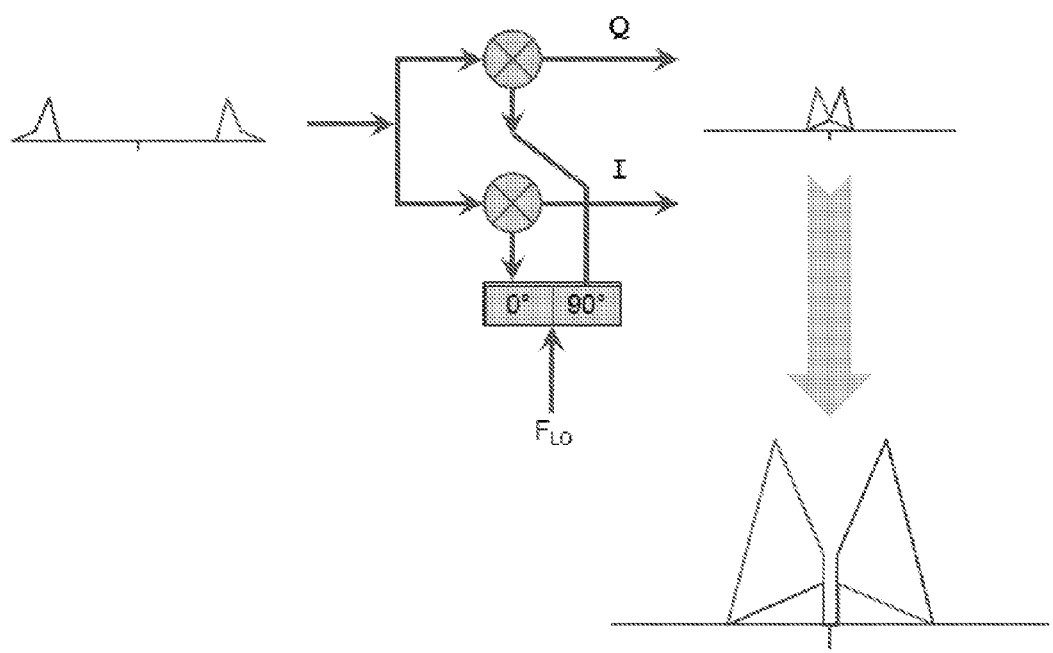
FIG. 41 shows a schematic diagram illustrating heterodyning a set of frequencies to baseband using a quadrature mixer.

FIG. 41 shows heterodyning a set of frequencies to baseband using a quadrature mixer. Only the "difference" frequencies are shown. Note the gap near DC in the zoomed-in diagram. The gap is likely to occur in many hardware implementations due to physical limitations of components.

A quadrature mixer also has the advantage of outputting "in-phase" (I) and "quadrature" (Q) components of the converted signals. These I & Q components can be fed directly into the "real" and "imaginary" inputs of a Fourier transform, simplifying the spectral analysis process.

Figure 42:
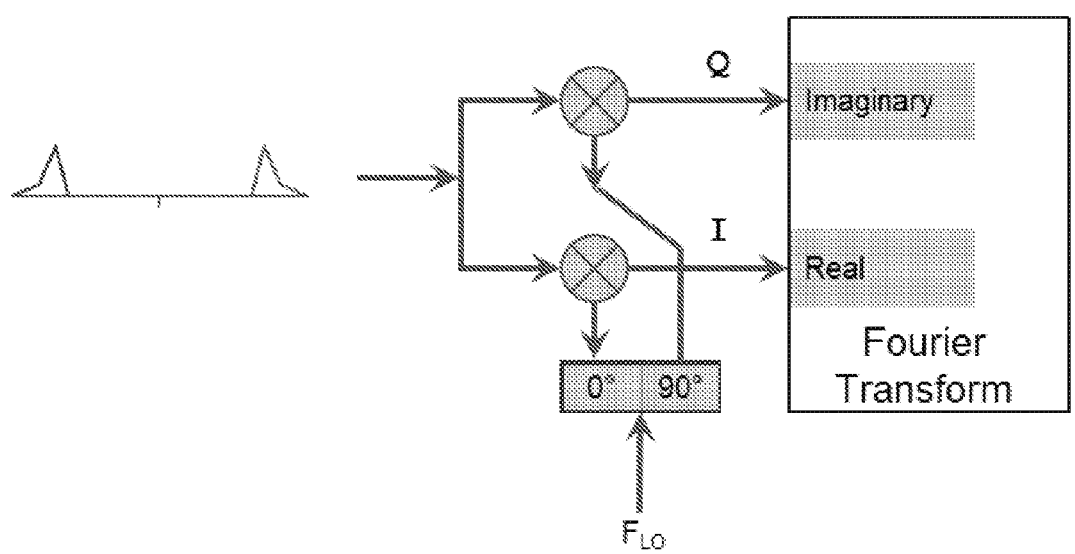
FIG. 42 shows a schematic diagram illustrating the in-phase and quadrature outputs of the quadrature mixer fed into the real and imaginary inputs (respectively) of a Fourier Transform.

FIG. 42 shows the in-phase and quadrature outputs of the quadrature mixer fed into the real and imaginary inputs (respectively) of a Fourier Transform, probably after digitization. The output of the Fourier transform contains the spectral information of "the frequency content of interest" (e.g. the sensor's operating signals), with the region centered on $F_{LO}$ shifted to DC. In a touch sensor that employs frequency-division multiplexing, or some other modulation scheme (such as CDMA of a carrier frequency) containing frequencies for analysis, a structure like that depicted above could go on every column in the sensor to measure which row signals are present in each column.

When using a quadrature frequency mixer to convert a frequency range to baseband, there is usually a region of frequencies, that would end up near DC after conversion, that cannot be used because the frequency mixing hardware will not produce outputs near DC. Therefore, a touch sensor employing a quadrature frequency mixer should be fabricated to ensure that any frequencies in that range are not necessary for proper sensor operation.

In an embodiment, a touch sensor that employs a quadrature frequency mixer to down-convert a range of frequencies to baseband does so in a manner in which the unusable frequency gap near DC falls between frequencies of interest, so that there is a negligible effect on sensor device operation.

In an embodiment—where the unusable frequency gap near DC is wide enough, or the frequencies of interest are spaced closely enough that the gap cannot be placed between the frequency content of interest utilized as a touch sensor's operating signals—a touch sensor using FDM as a modulation technique for a given time period across a given region of a sensor's surface-area, as described in prior filings "Low-Latency Touch Sensitive Device" (Ser. No. 13/841, 436, Filed on Mar. 15, 2013) and "Fast Multi-Touch Post Processing" (Ser. No. 14/069,609, Filed on Nov. 1, 2013), allocates frequencies such that there is a gap in frequency coverage, at the right frequency values and of sufficient width so that, once the frequency range of interest is downconverted to near baseband, the gap in allocation coincides with the unusable set of frequencies near DC, allowing correct operation of the sensor device.

In an embodiment, frequency conversion is employed on a touch sensor that uses FDM to lower the frequencies of "the signals of interest." In this case, "the signals of interest" are the signals transmitted onto the rows of the touch surface. The spectral content of signals received on the rows can be processed to determine where the user is touching on the touch surface. Instead of doing spectral analysis or bandpass filtering directly at this point, a sensor can be fabricated to heterodyne the signals to a lower frequency. These heterodyned signals are (optionally) bandpassed, and mixed with either a single or a quadrature frequency mixer to a lower frequency. There, they are (optionally) bandpass filtered again, (optionally) amplified, and then the aforementioned spectral analysis can be performed. If we do the spectral analysis digitally, then the signals can be digitized and the spectrum of each column analyzed to determine which and how much of "the signals of interest" from each sensor row are present in each sensor column.

Differential Transmission

A projected capacitive (PCAP) touch sensor as described above can suffer from several problems that reduce the sensitivity and signal-to-interference ratio. These problems can result in true touch events not being recognized, false touch events occurring, and other issues. One of these problems is "cross-talk", which is unintentional leakage of signals between rows and columns that is not caused by touch events. Cross-talk raises the noise floor so that signals from true touch events are more difficult to distinguish from interference. Therefore, a device and method that reduces cross-talk and mitigates these deleterious effects is desirable.

The embodiments of such device and method described below can be used independently of or in combination with any of the embodiments described above. For example, the differential techniques described below can be used particularly advantageously in combination with the stereo embodiments of a PCAP sensor described above under the heading "Fast Multi-Touch Noise Reduction." In such embodiments, both the rows and the columns of the device are configured to both transmit unique signals, and also to receive signals from the columns or rows of the device respectively.

Differential transmission is a method of reducing cross-talk between rows and columns in a projected capacitive touch sensor. Because the rows and columns of a PCAP touch sensor cross each other, there is an inherent capacitive coupling between them which means that some of the signals that are transmitted onto each row will be coupled onto the columns even in the absence of a touch at their intersection. If a PCAP sensor design employs a ground plane (or ground screen or ring or other conductive area close to the rows and columns), it will often act to increase this inherent cross-coupling between the rows and columns.

Figure 43:
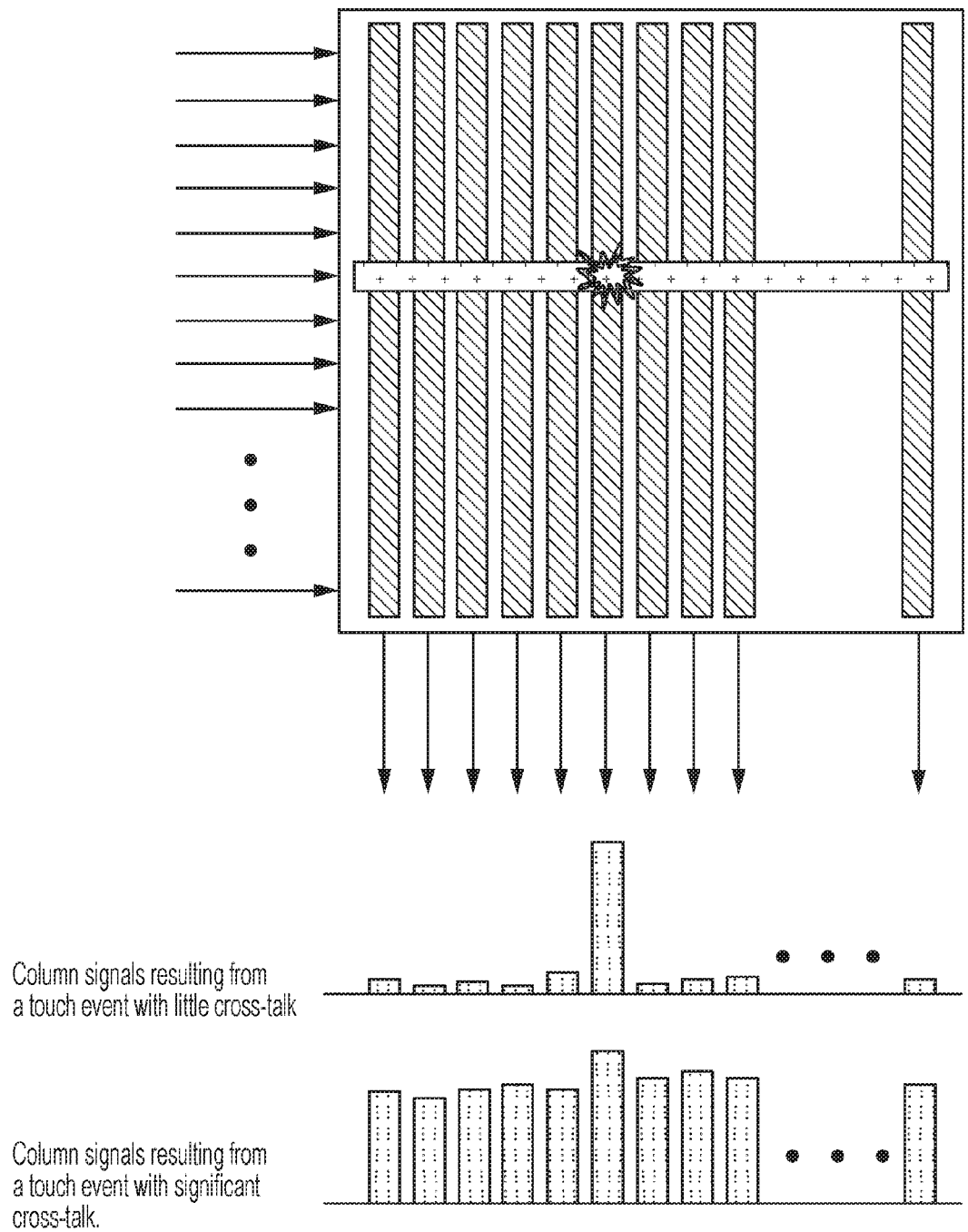
FIG. 43 shows a schematic diagram illustrating signals injected into the rows of a projected capacitive touch sensor and the column signals.

Because touch events in a PCAP sensor are caused by capacitive signals coupled between the rows and columns by the capacitance of a finger (or other conductive object touching or hovering near the sensor surface), inherent cross-talk between the rows and columns will be interpreted by a PCAP sensor in the same way as valid touch events caused by intended user action. This cross-talk between rows and columns thus results in a low-level baseline of interference that the signals from user-intended touch events must compete with in a given PCAP sensor reading. As shown in FIG. 43, signals are injected into the rows of a projected capacitive touch sensor. Initially, consider the system to be linear, so that contributions from each row signal onto the columns are independent and additive. While only a single row, and a subset of the columns, are shown for purposes of illustrating principles of the invention, it will be understood by those skilled in the art that full sets of columns will ordinarily be used in a working embodiment of a sensor employing the techniques described herein.

With continued reference to FIG. 43, a notional touch is shown at the intersection of the displayed row and the columns. Note that, in the chart depicting column signals resulting from a touch event with little cross-talk, the intentional signal on the touched column is much stronger than the cross-talk on the other columns. This baseline level of interference will lower the signal-to-interference ratio of the system, preventing it from detecting weaker touches and possibly causing it to register false touch events. It would therefore be advantageous to eliminate as much of the inherent cross-talk as possible so that the only signals coupled between the rows and columns are from user-intended touch events. Reducing this adverse cross-talk interference through the differential transmission techniques outlined herein improves the signal-to-interference ratio of any PCAP sensor regardless of its multiplexing or modulation scheme. Thus, these techniques can be applied to various types of capacitive sensors, including those that employ time-division multiplexing (TDM), code-division multiplexing (CDM), frequency-division multiplexing (FDM), and/or other orthogonal modulation schemes, etc.

The amount of cross-talk from the rows to the columns can be reduced by a large amount by simultaneously transmitting a particular signal and its negative (e.g., the signal multiplied by −1) at the same time on different rows. These differential row signals, which form a differential row group, will be additively combined in the columns, due to the cross-talk, and, because they are opposites, they will add up to a lower level of unintentional signal being present on each column. In the base case of a pair of differential row signals, this assumes that the coupling from the two rows (one positive, the other its negative) onto the columns is more-or-less equal for both of the rows. See FIG. 44. This will be true in some cases, no matter which two rows are chosen, but it may be advantageous to transmit the positive/negative signal pair on adjacent or nearby rows, which will be more likely to have a similar coupling to the columns.

For purposes of this disclosure, a differential row group is a group of two or more signals that, when combined, cancel each other or at least substantially mitigate each other. It will be understood by a person of skill in the art that complete cancellation, while desirable, may not be possible in specific implementations. For example, complete cancellation is likely to be unachievable in implementations using high resistivity conductors, including, by way of example and not limitation, conductors fabricated from Indium Tin Oxide (ITO), metal-mesh, and silver nanowire. Similarly, a person of ordinary skill in the art will understand that a differential row group may be implemented in the frequency domain, the code domain and/or the time domain, or combinations thereof. In an exemplary embodiment, a differential row group sums to zero or near zero. For example, in the frequency domain, a differential row group may consist of two signals that are 180 degrees (or at least close to 180 degrees) out of phase with each other; or alternatively, a differential row group may consist of three signals that are 120 degrees out of phase with each other, or more than three signals that are out of phase by amounts summing to 360 degrees.

Figure 44:
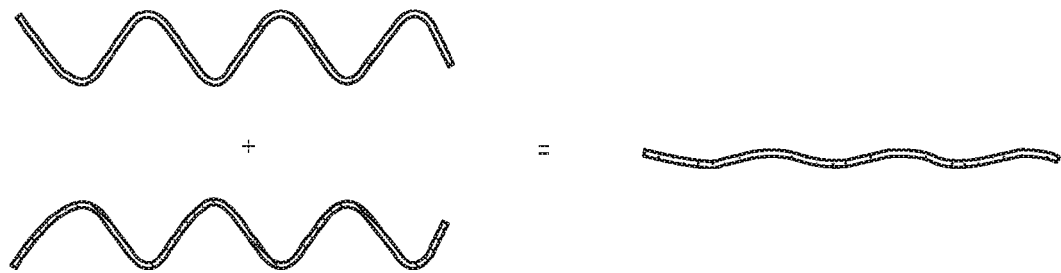
FIG. 44 shows a graph illustrating the result of addition of a signal to an inverse signal.

As shown in FIG. 44, one method of mitigating the cross-talk signals is to use destructive interference to cancel them out. Unfortunately, this method violates the previous assumption that the row signals are all orthogonal to each other, because it is impossible for a linear combination of orthogonal signals to "cancel out", or sum to zero, unless the amplitude of each is zero to begin with. The necessity of using non-orthogonal signals means that, in the absence of a technical solution, the sensor will not be able to unambiguously detect touch events. Because the locations of touch events are fundamentally unpredictable, it is possible that some combination of touches will produce a combination of row signals that also cancels out the legitimate touch, along with the undesired cross-talk. The signal structure can be configured to make such events unlikely.

In an embodiment, the number of rows that a PCAP sensor would normally have is increased and cancellation signals are sent on the extra rows. In a variation of this embodiment, the rows are designed to have a pitch that is less than the pitch of the columns so that the extra rows fit into the same area as a system not employing this differential technique.

Figure 45:
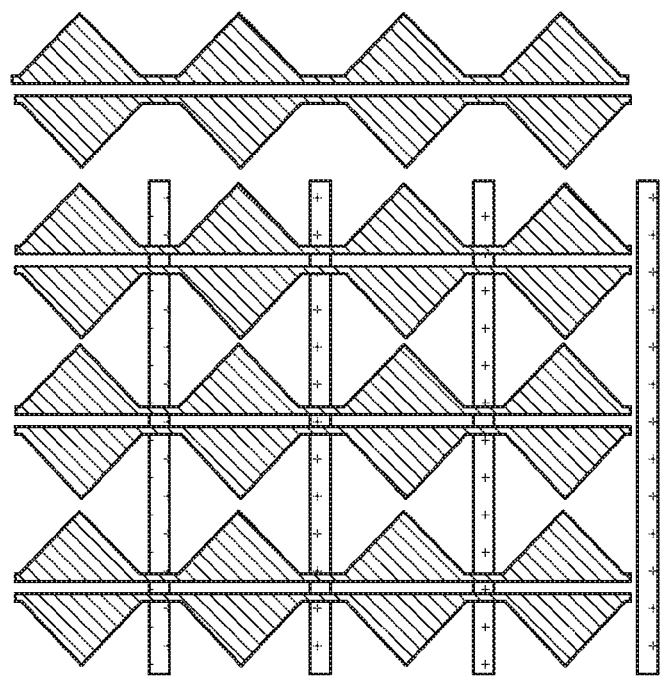
FIG. 45 shows a schematic diagram illustrating an embodiment wherein rows are split in half so that one half will carry the original signal and the other will carry its additive inverse.

In an embodiment, rows are organized into two groups so that one such group will carry the original signal and the other will carry its additive inverse (i.e., the original signal multiplied by −1). With reference to FIG. 45, in this embodiment, rows of the PCAP sensor are employed in pairs, with a signal and its inverse being sent on each pair. For example, the original signals are sent on the "a" rows, and the same signals, multiplied by −1, are sent on the "b" rows. If an intentional touch event occurs symmetrically across such a pair, then the contributions of the row signals cancel each other out. It is unlikely that the touch would be completely symmetric across a row pair, and the touch sensor can be designed so that a normal touch would extend beyond a single row pair. Any imbalance would cause uncancelled signal to be transmitted onto the columns.

This kind of differential transmission will also affect true touch events. If a touch event occurs symmetrically on the positive/negative row pair, the amount of signal coupled from rows to columns (that we are deliberately attempting to induce) is similarly reduced or eliminated. See FIG. 46. However, it is highly unlikely that an actual touch event would occur so symmetrically around the positive/negative signal pair. Therefore, while the resulting deliberate signal coupling will be reduced, it will still be likely to be of a useful amplitude so that a touch event can be recognized. Also, if the touched area covers many positive/negative row pairs, it is very unlikely that all of them will experience a completely symmetrical coupling—which would eliminate or greatly reduce their intentional signal coupling between rows and columns—and so some intentional signal will get through, and this amount is likely to be enough to enable detection and characterization of the touch event.

In an embodiment, in addition to positive/negative pairs, other types of and numbers of signals can be used, as long as the combined effect of their inherent cross-coupled signals will sum to approximately zero or at least to a point at which cross-talk is substantially mitigated. In an embodiment, if the row signal structure consists of sinusoids, groups of three rows can be used where on each row there is transmitted a signal 120 degrees apart from the others. For example, on one of the three rows would be transmitted a sinusoid with a phase offset of zero degrees, on the second would be transmitted the sinusoid with a phase offset of 120 degrees, and on the third would be transmitted the sinusoid with a phase offset of 240 degrees. If the three different signals are inherently coupled onto the rows in approximately equal amounts, then the signals will sum to near zero and thus largely eliminate the unintentional cross-talk signals.

In an embodiment, a plurality of row signals that are designed to sum to zero as cross-talk in the columns are transmitted.

If some rows have more coupling to the columns than others, then it is possible to adjust the amplitudes of the positive or negative signals transmitted onto the rows, so that the net result of their inherent cross-coupling is near zero. In an embodiment, the cross-coupling between rows and columns is measured in the absence of touches, and is used to adjust the amplitudes of the positive and negative signals transmitted onto the rows so that the net result of their cross-coupling is near zero.

In an embodiment, the columns will have different couplings to the rows, and so it will be impossible to completely cancel the cross-talk from the rows onto all of the columns. In such cases, the row signals can be designed or adjusted so that some function of the cross-talk on the column signals is minimized according to some criterion. In an embodiment, the criterion is the total energy in the column signals. In an embodiment, the criterion is energy of the column with the greatest cross-talk signal. In an embodiment, the criterion is a figure of merit that will increase the signal-to-noise-and-interference ratio of the true touch signals, as measured on the columns.

In an embodiment, the amplitudes, phases or other parameters of the waveforms in the row group (which, in an embodiment are positive/negative pairs or other groups that add to zero or near-zero) are adjusted dynamically by determining the amount of inherent cross-talk present on the columns, and then the parameters of the transmitted signals are adjusted so as to cancel it out. This can permit near-optimal cancellation of the unwanted cross-talk even under changing conditions, such as temperature variations, humidity variations, the effects of holding the touch-sensitive device, etc. In most cases it is possible to measure the amount of cross-talk, even if there are touch events occurring, because the touch events are localized while the inherent cross-talk largely covers the entire touch surface.

In an embodiment, when one row signal comprising a differential row group is touched, the touch processor distinguishes it by its sign. Note that this is why it is important to synchronize the signal generation with the signal reception means—time delays and offsets are important when trying to distinguish phase or sign.

When one row signal comprising a differential row group is touched, there are several possible cases of what happens to the received signal strength when a row and column are simultaneously touched, disregarding the differential transmission scheme. In a first case, the received signal strength in that column for that row signal decreases. In a second case, the received signal strength in that column for that row signal increases. In a third case, the received signal strength in that column for that row signal stays the same, and some other indicator, such as a phase shift, occurs.

These cases depend on various parameters of the touch sensor and signal structure, such as but not limited to the implementation of a ground-plane near the sensor, the particular frequencies involved, whether there are resonances in the sensor's frequency response, etc.

Under a differential transmission scheme, because of the inherent cancellation of the signals in the row pair, an uneven coupling of the row signals will often spoil the cancellation, causing the total received signal strength to increase, regardless of which of the three cases above is occurring. The touch processor of a touch sensitive device using the present differential transmission scheme should distinguish which row was actually physically touched in order to accurately decide where the touch event occurred on the sensor. Assuming that rows A and B comprise a differential row group and, therefore, that the signal on row B is the additive inverse of the signal on row A, the result is different depending on which of the three cases above has occurred.

For the first case above, if the user touches row A, then its contribution to the total received signal will decrease, causing the signal from row B to dominate the total received signal on the particular column. Therefore, if the touch processor measures more of row B's signal than row A's signal, it can be configured to assume that the touch actually occurred on row A.

For the second case above, if the user touches row A, then its contribution to the total received signal will increase, causing the signal from row A to dominate the total received signal on the particular column. Therefore, if the touch processor measures more of row A's signal than row B's signal, it can be configured to assume that the touch actually occurred on row A.

For the third case above, if the user touches row A, then its contribution to the total received signal will stay the same. However, there might be some other indicator (such as a phase shift) that would cause one of A or B to dominate the total received signal on that particular column. If neither dominates, then this may not be a particularly good method of detecting certain touches on the sensor. If one does dominate, then the touch processor can determine which row was actually physically touched, but that will depend on how a touch affects the signal coupling from row to column. If a touch causes a phase shift in the signal coupled from row A, then the signal from row B will likely dominate the total received signal on the particular column.

In an embodiment, the transmitter groups (possibly positive/negative pairs) are not statically assigned, but the assignment could change according to some conditions. Reasons to do this might include spreading the unwanted effects (e.g. somewhat symmetrical touches) of the technique across the entire surface, instead of leaving them localized in specific places on the touch surface. Also, it could allow for touches of duration longer than a single frame time to be detected even if they are symmetric around a specific row group, because the row groups are changing over time and the symmetrical coupling of the group is eliminated if that row group is dynamically moved during the touch event.

In an embodiment, the members of each row group are not adjacent to each other on the touch surface, and yet are still designed so that the combination of their signals is largely cancelled out in the columns. If these rows are farther apart than the width of a single touch event, then a single deliberate touch event will not be cancelled out by any row group. An advantage of this embodiment is that single touch events are not adversely affected, and yet the unwanted inherent cross-talk between rows and columns is greatly reduced. See FIG. 47. The fact that there is a plurality of rows with the same signal, but with different signs or phases would not affect single touch detection either, because these signals could still be disambiguated via matched-filter or other signal processing techniques.

Note that the signals of a given differential row group may not completely cancel out as well on compromised conductors typically used to fabricate touch sensors such as indium tin oxide (ITO), metal-mesh, silver nano-wire, etc. Therefore, when employing the differential signaling techniques outlined herein in a sensor composed of a compromised conductor, the members of the row group should not be placed arbitrarily far apart in order to ensure the maximum amount of cancellation possible.

In an embodiment, the members of each differential row group are not adjacent to each other, and are also dynamically assigned so that distance between members of each row group changes over time. In this way, multiple touches will be unlikely to be affected by the differential row signal scheme as long as they have a duration that is longer than a single frame time.

Figure 48:
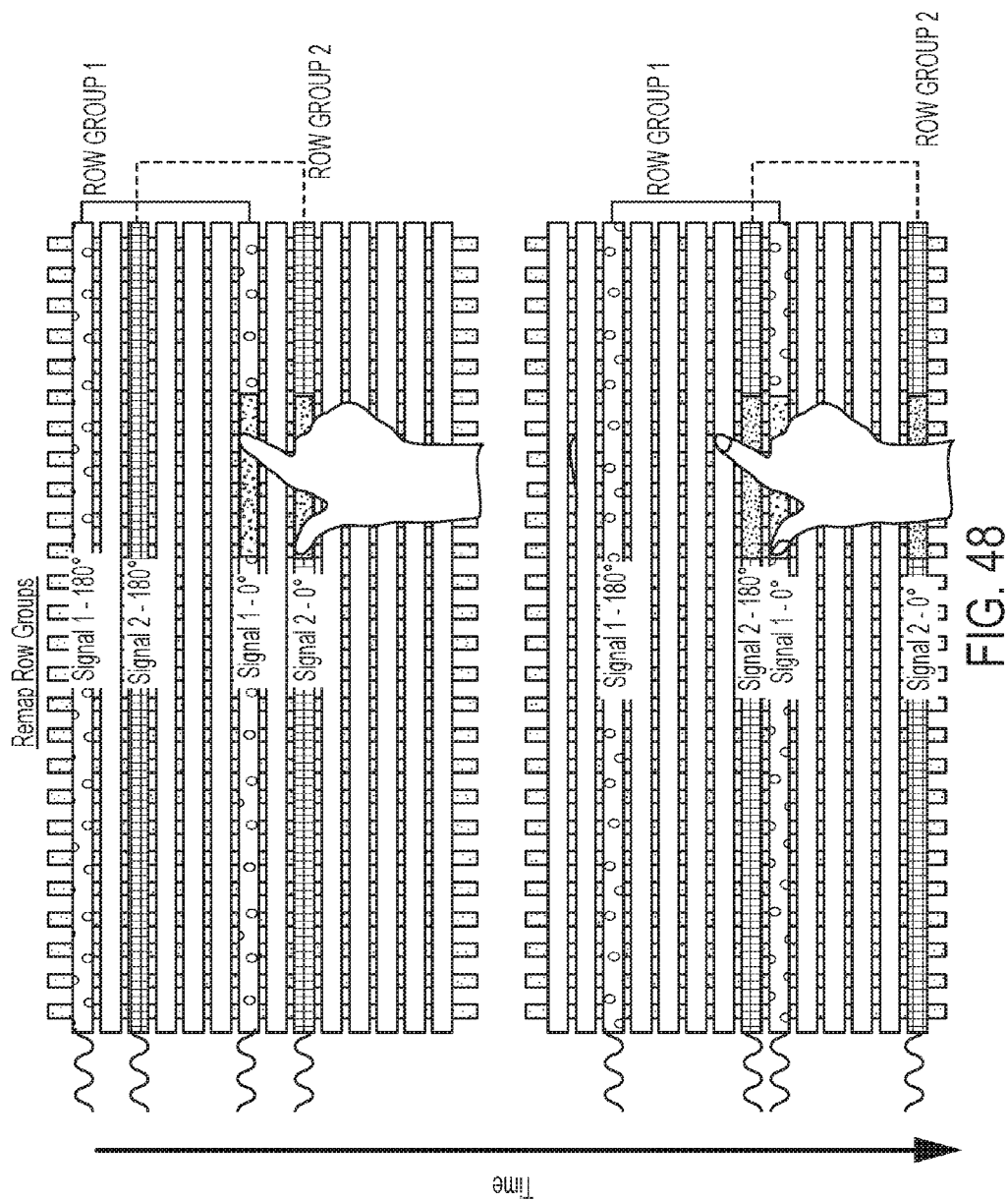
FIG. 48 shows a schematic diagram illustrating use of a statistical measure to minimize the maximum number of sequential frames in which an undesired cancellation of a user-intended touch event might occur.
Figure 48:
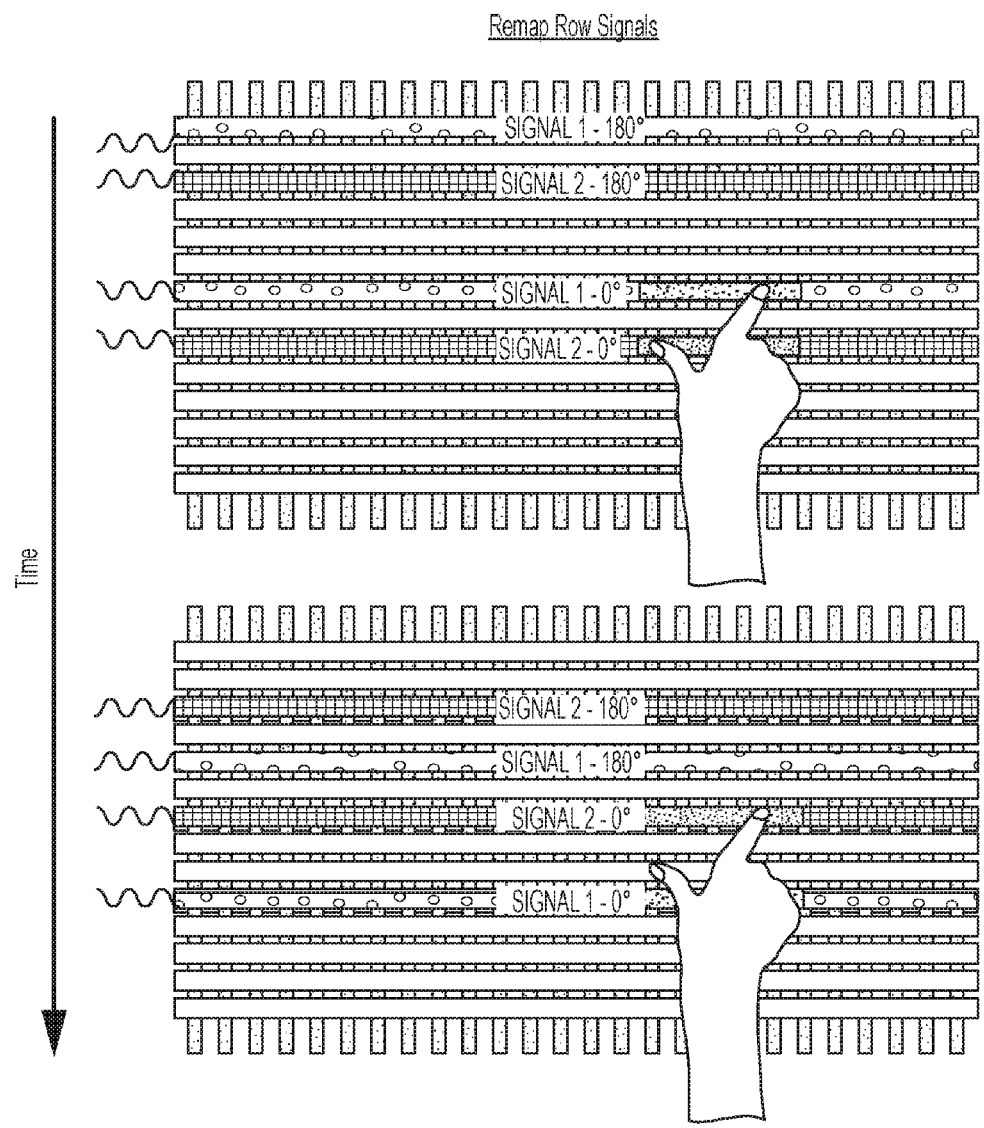

In an embodiment, the members of each differential row group or the row groups themselves are continuously re-mapped, on a frame-by-frame basis across the touch surface so that a touch event with a duration of more than a single frame time is unlikely to be cancelled out by an unfortunate and undesired assignment of row signals. In an embodiment, the members of each row group or the row groups themselves are continuously re-mapped according to a pattern that will statistically lessen the probability of a touch event being canceled by a substantially equal contribution from all of the out-of-phase signals that comprise a differential row group. In an embodiment, the statistical measure minimizes the mean number of frames in which an undesired cancellation of a user-intended touch event occurs. In an embodiment, the statistical measure minimizes the maximum number of sequential frames in which an undesired cancellation might occur. See FIG. 48.

In an embodiment, the members of each row group are spaced at constant intervals, but the rows signals are dynamically assigned so that, while the relative positions of each member of a particular row group do not change, their position with respect to the physical layout of the touch sensor does change.

In an embodiment, the dynamic assignment of the row signals is random. In an embodiment, the dynamic assignment of the row signals is pseudo-random. In an embodiment, the dynamic assignment of the row signals is mapped so that the row signals are assigned a fixed number of rows from their last assignment each frame time.

In an embodiment, the number of possible row signal groups is greater than the number of physical rows to which these could be assigned on a given PCAP sensor. This would mean that some subset of the row signals would not always be present during any particular assignment scheme.

With reference to FIG. 45, in an embodiment, the row signals are assigned such that there is a minimum physical distance between the physical rows of a PCAP sensor assigned to any particular differential row group.

In an embodiment, the row signals respond to the current set of touches. In an embodiment, the row signals of a row group are intentionally mapped to the physical rows of a sensor that correspond with an extended-area touch event in order to minimize detected touches of an extended-area touch event, such as when a user's palm rests on a touch sensor. In an embodiment, this technique is used to reject a palm at the hardware-level based on the previous frame, and thereby minimize posterior computation requirements. In an embodiment, the row signals of a row group that correspond with an extended-area touch event are mapped onto a user's palm to maximally reject the palm while still allowing for sufficient physical spacing of the row signals of a row group in order to allow for individual touch events to still register on the "palm-mapped" rows.

In an embodiment, the row signals are dynamically assigned so that the possibility of a touch being cancelled by the unfortunate and undesired relative position of a differential row group and a touch is minimized. In an embodiment, the row signals are assigned such that the maximum duration of a touch being cancelled by the unfortunate and undesired relative position of a row group and a touch is minimized, or is constrained to be less than a particular threshold.

Figure 49:
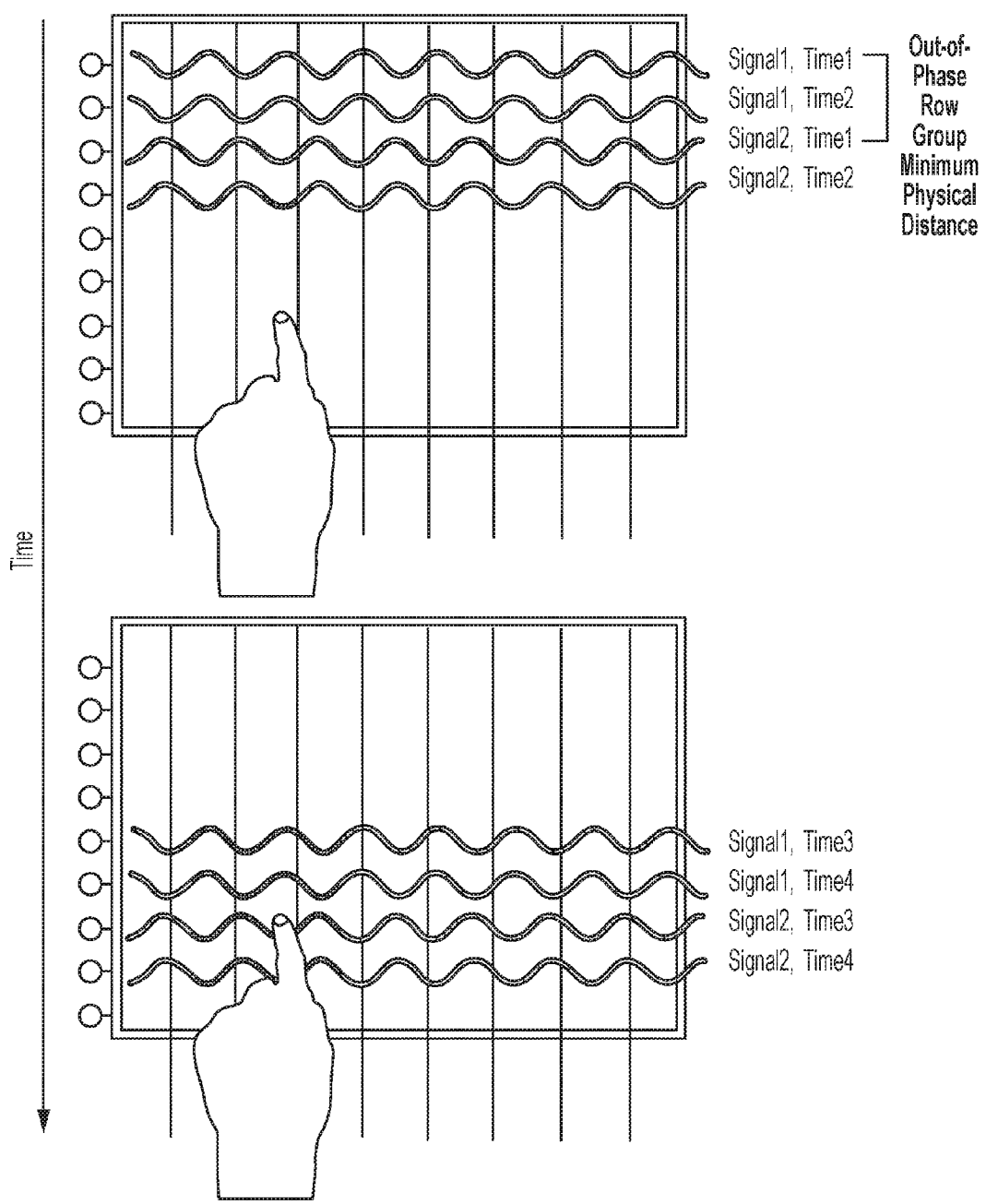
FIG. 49 shows a schematic diagram illustrating determination of the physical position of a given row signal of a row group.

In an embodiment that uses a TDM transmission scheme to transmit row signals, two or more simultaneous row signals of a differential row group whose signals collectively cancel each other out are transmitted on a portion of the physical rows of a given sensor. These simultaneous row signals are spaced across the physical rows of a sensor such that they are a minimum distance apart larger than the linear-extent of a typical touch. These row signals of a row group are transmitted such that over a given period of time they cycle across all of the physical rows of a sensor. During the course of their complete cycle across all of the physical rows of a sensor, the physical position of a given row signal of a differential row group can be determined according to a defined sequential pattern, assigned randomly, or assigned pseudo-randomly. See FIG. 49.

Figure 50:
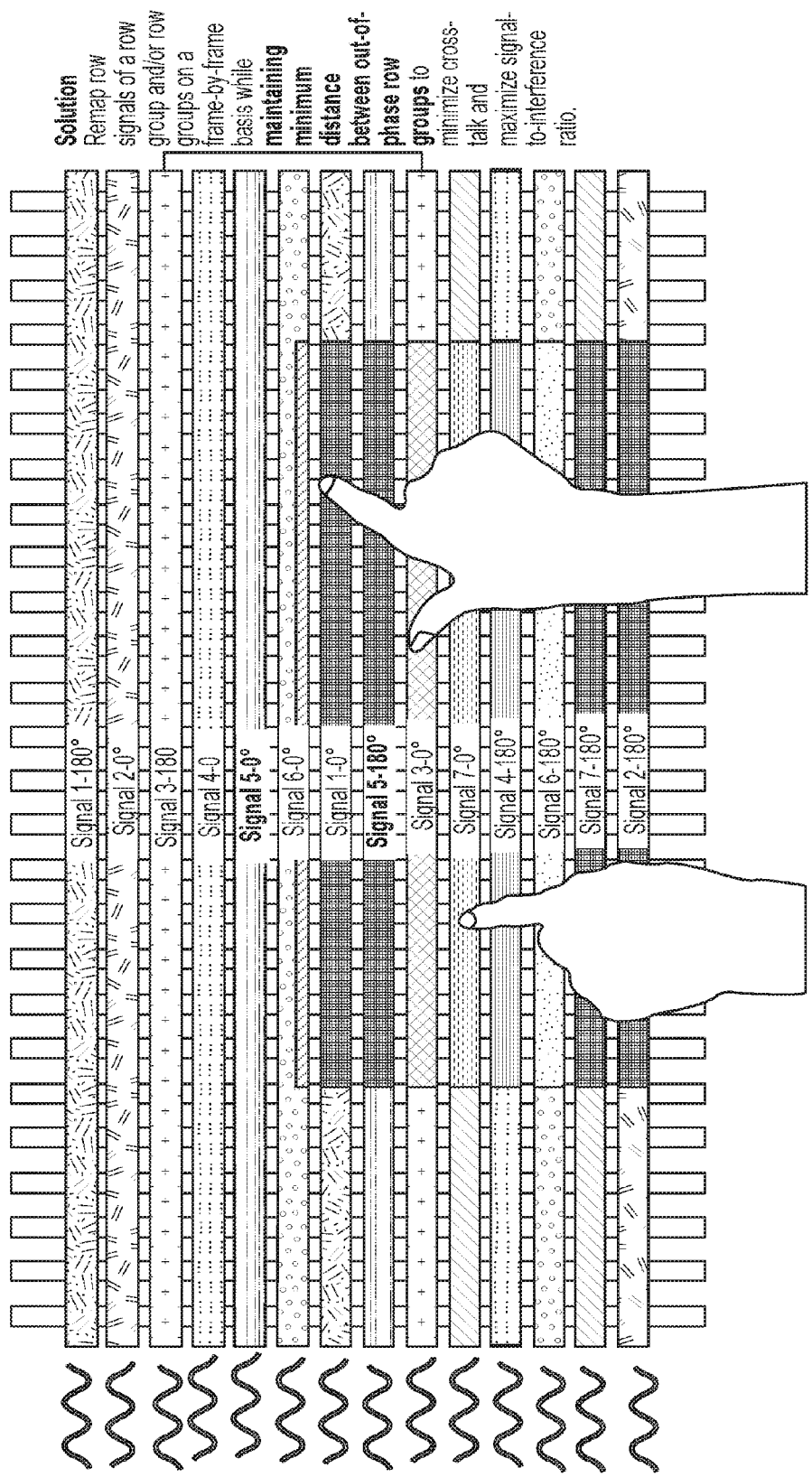
FIG. 50 shows a schematic diagram illustrating a differential sensing scheme for single- and multi-touch usage scenarios in which cross-talk is minimized and sensed touch events are maximized.

In an orthogonal signaling embodiment, row signals are transmitted across all of the physical rows of a sensor simultaneously. Two or more of these row signals comprise a row group whose signals collectively cancel each other out. Members of a row group are spaced across the physical rows of a sensor such that they are a minimum distance apart, the minimum distance being larger than the linear-extent of a typical touch. While maintaining this physical minimum spacing across the physical rows of a touch sensor, row signals of a row group and/or row groups are continuously remapped on a frame-by-frame basis across the physical rows of a touch sensor. The combination of ensuring a physical minimum distance between row signals of a row group with continuous physical, frame-by-frame remapping of row signals in a row group or the row groups themselves across a touch surface collectively enable a robust PCAP differential sensing scheme for single- and multi-touch usage scenarios in which cross-talk is minimized and sensed touch events are maximized. See FIG. 50.

In an embodiment, the row signals are not truly orthogonal, but contain a small amount of non-orthogonality. In this embodiment, the nearly-orthogonal row signals can be designed (or adjusted) so that their total contribution cancels out any cross-talk onto the columns, and yet a linear combination of a smaller subset of them (as might be encountered in likely true touch events) would not cause a complete (or nearly complete) cancellation of the row signals.

Figure 46:
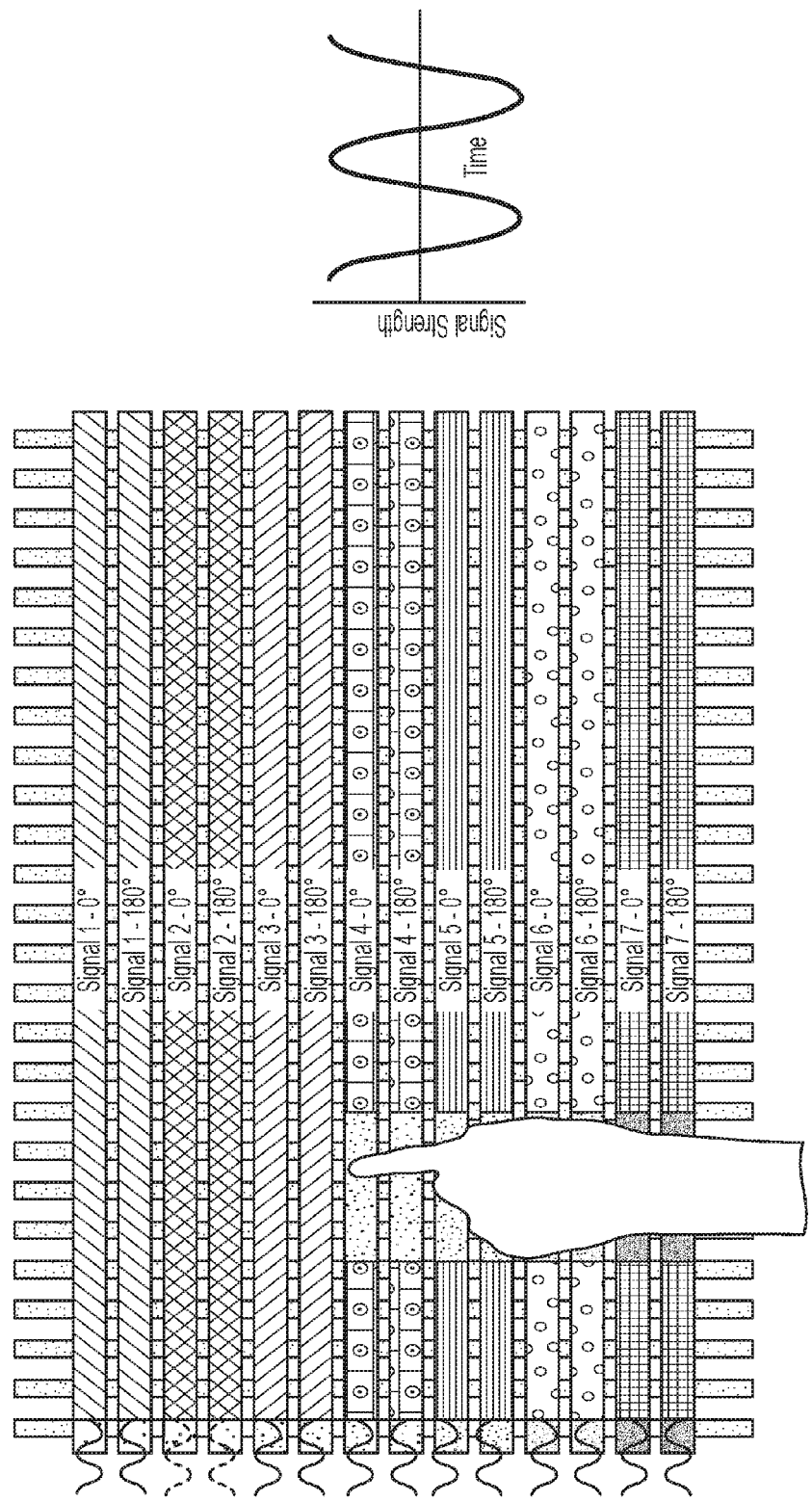
FIG. 46 shows a schematic diagram illustrating the result of a touch event occurring symmetrically on a positive/negative row pair.
Figure 46:
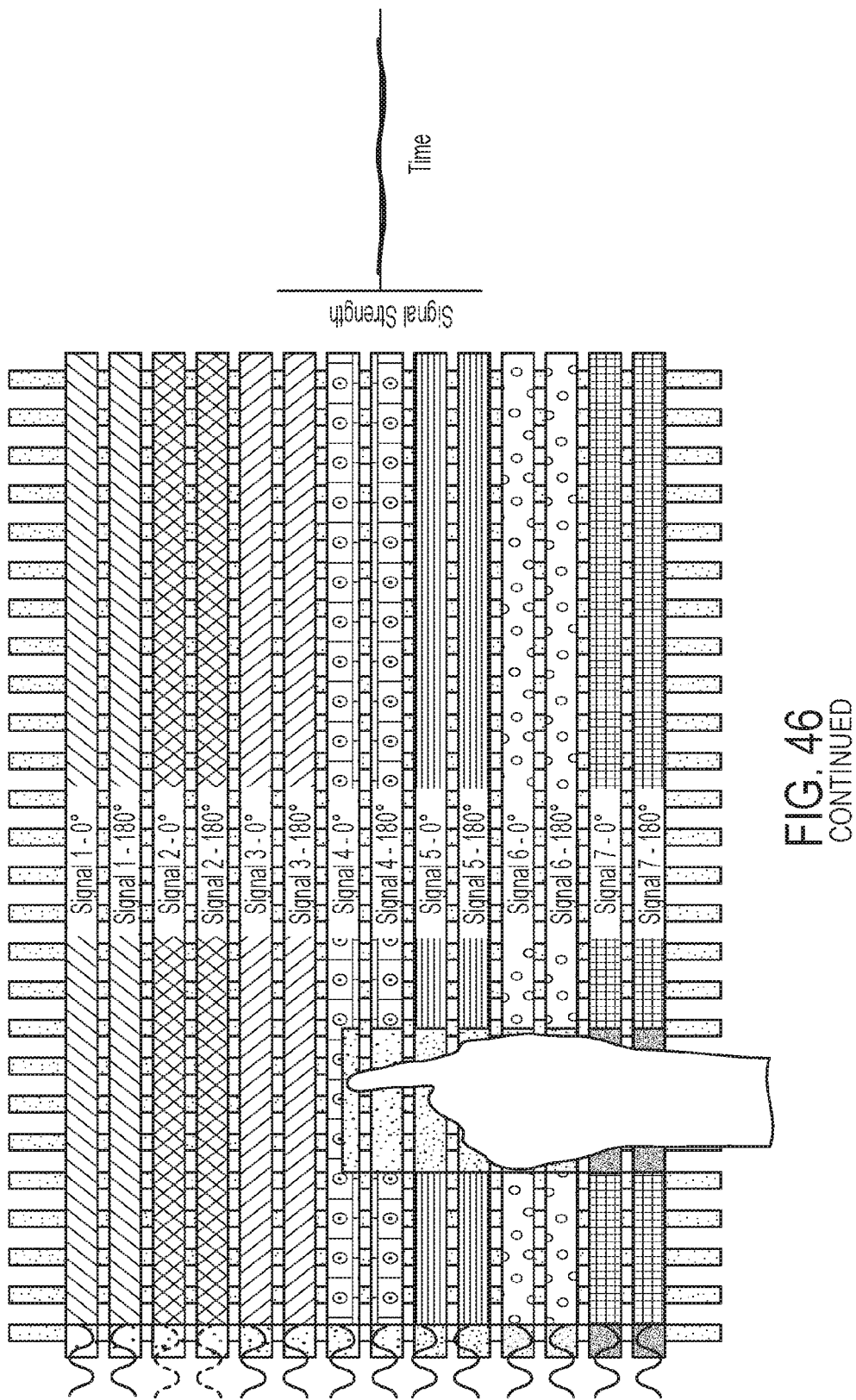
Figure 46:
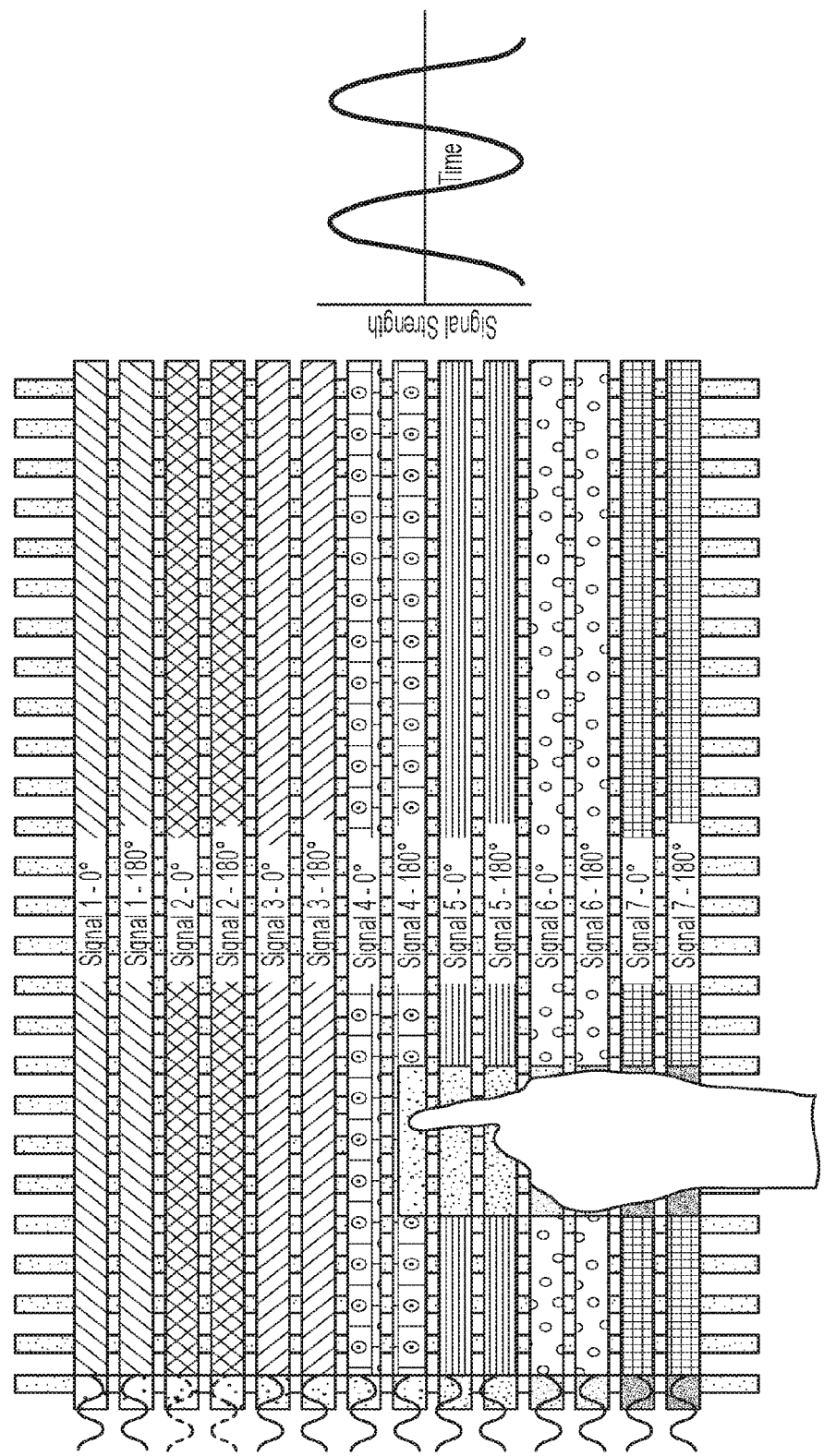
Figure 47:
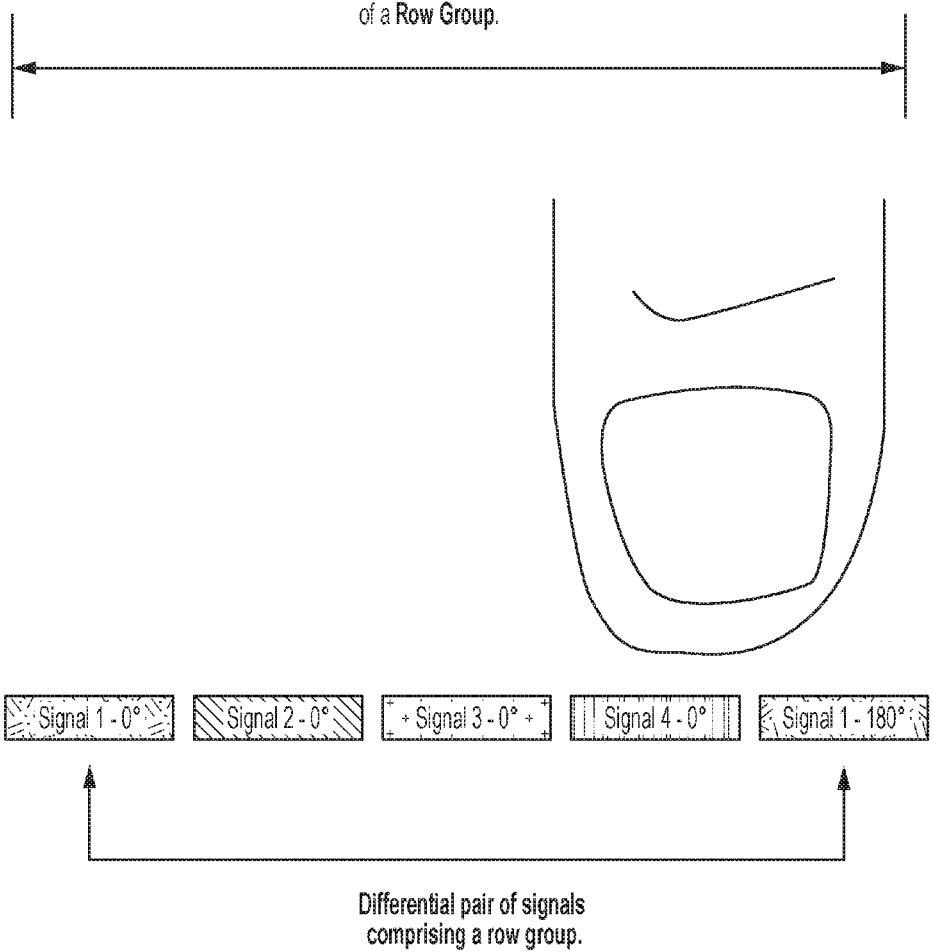
FIG. 47 shows a graphical view illustrating minimum physical spacing of row signals.

The differential techniques described above can be used to improve the signal-to-interference ratio by reducing adverse cross-talk interference in PCAP sensors (PCAP). This is regardless of their multiplexing or modulation scheme, including time-division multiplexing (TDM), code-division multiplexing (CDM), frequency-division multiplexing (FDM), and/or any other orthogonal modulation schemes. A fundamental concept is that, as shown in FIGS. 44-46, a single touch spanning a pair of differential row signals may cancel out any sensed contribution from a physical touch. As shown in FIG. 47, row signals within a differential row group can be physically separated by a minimum distance larger than the linear-extent of a typical touch to solve the problem of single touch events being canceled out by an adjacent or nearby differential pair.

As noted above, in sensors using a differential transmission scheme, because of the inherent cancellation of the signals in the row pair, an uneven coupling of the row signals will spoil the cancellation causing the total received signal strength to increase, regardless of which of the three cases described above is occurring. In an embodiment, the touch processor described herein distinguishes which row was actually physically touched in order to accurately decide where the touch event occurred on the sensor. To ensure reliable detection of multiple, simultaneous touch events, row signals in a row group and/or row groups themselves can be continuously remapped on a frame-by-frame basis randomly, pseudo-randomly, or according to a pattern that will statistically lessen the probability of a touch event being canceled by a substantially equal contribution from all of the out-of-phase signals that comprise a differential row group. In an embodiment, the statistical measure minimizes the mean number of frames in which an unfortunate cancellation occurs. In an embodiment, the statistical measure minimizes the maximum number of sequential frames in which an undesired cancellation might occur.

In the TDM embodiments as described above, two or more simultaneous row signals of a row group whose signals collectively cancel each other out are transmitted on a portion of the physical rows of a given sensor. These simultaneous row signals can be spaced across the physical rows of a sensor such that they are a minimum distance apart larger than the linear-extent of a typical touch. These row signals of a row group are transmitted such that over a given period of time they cycle across all of the physical rows of a sensor. During the course of their complete cycle across all of the physical rows of a sensor, the physical position of a given row signal of a row group can be determined according to a defined sequential pattern, assigned randomly, or assigned pseudo-randomly.

In some embodiments, the use of minimum physical row spacing of row signals within a differential row group as discussed above is combined with a continuous remapping of row signals within a differential row group and/or the row groups themselves on a frame-by-frame basis to enable a robust PCAP differential sensing scheme for single- and multi-touch usage scenarios in which cross-talk is minimized and sensed touch events are maximized.

In accordance with some embodiments described above, row signals within a differential row group that correspond to an extended-area touch event are mapped onto a user's palm to maximally reject the palm while still allowing for sufficient physical spacing of the row signals of a differential row group in order to allow for individual touch events to still register on the "palm-mapped" rows.

As noted above, in the absence of any touch event, non-adjacent differential row signals that are members of a differential row group may not entirely cancel each other out on compromised conductors such as ITO, metal-mesh, and silver nanowire. Therefore, when employing the differential signaling techniques outlined herein in a sensor composed of such a conductor, it is advantageous not to place the members of the row group arbitrarily far apart in order to ensure the maximum amount of cancellation possible.

The present systems and methods are described above with reference to block diagrams and operational illustrations of methods and devices for frequency conversion and heterodyning. It is understood that each block of the block diagrams or operational illustrations, and combinations of blocks in the block diagrams or operational illustrations, may be implemented by means of analog or digital hardware and computer program instructions. These computer program instructions may be provided to a processor of a general purpose computer, special purpose computer, ASIC, or other programmable data processing apparatus, such that the instructions, which execute via the processor of the computer or other programmable data processing apparatus, implements the functions/acts specified in the block diagrams or operational block or blocks. In some alternate implementations, the functions/acts noted in the blocks may occur out of the order noted in the operational illustrations. For example, two blocks shown in succession may in fact be executed substantially concurrently or the blocks may sometimes be executed in the reverse order, depending upon the functionality/acts involved.

Reference in this specification to "an embodiment" or "the embodiment" means that a particular feature, structure, or characteristic described in connection with the embodiment is included in at least an embodiment of the disclosure. The appearances of the phrase "in an embodiment" in various places in the specification are not necessarily all referring to the same embodiment, nor are separate or alternative embodiments mutually exclusive of other embodiments. Moreover, various features are described which may be exhibited by some embodiments and not by others. Similarly, various requirements are described which may be requirements for some embodiments but not other embodiments. Reference herein to the size of a user's finger shall mean the size of the contact area of the finger of an average user.

While the invention has been particularly shown and described with reference to a preferred embodiment thereof, it will be understood by those skilled in the art that various changes in form and details may be made therein without departing from the spirit and scope of the invention.

What is claimed is:

1. A touch sensitive device having a touch surface comprising:
    touch interface comprising first conductors and second conductors such that a touch event proximate to the touch surface causes a change in coupling between at least one of the first conductors and at least one of the second conductors;
    signal generator configured to transmit a plurality of unique orthogonal signals on a first plurality of first conductors, respectively;
    the signal generator further configured to transmit, concurrently with the transmission of the plurality of unique orthogonal signals, a plurality of first signals on a second plurality of first conductors, respectively, wherein respective ones of the plurality of first signals and ones of the plurality of unique orthogonal signals are part of a differential group;
    touch processor configured to identify a touch event on the touch interface by processing signals present on at least one of the second conductors;
    wherein the differential group comprises at least one conductor from the first plurality of first conductors and one conductor from the second plurality of first conductors, wherein the at least one conductor from the first plurality of first conductors and the one conductor from the second plurality of first conductors are spaced apart by a minimum physical spacing that maintains a minimum physical distance between conductors of the first differential group, and the conductors of the first differential group are nonadjacent and at least more than one conductor apart.

2. The device of claim 1, wherein each of the plurality of unique orthogonal signals are orthogonal with each other in at least one aspect selected from a group consisting of: time, frequency, and code.

3. The device of claim 1, wherein signals in each differential group substantially mitigate each other when combined equally, whereby cross-talk interference is substantially reduced.

4. The device of claim 1, wherein the minimum physical spacing is larger than a linear measure of a contact areas of an object affecting a touch event.

5. The device of claim 1, wherein the differential few group has a maximum physical spacing for maintaining maximum physical distance between the first first conductor and the second first conductor of the at least one differential group.

6. The device of claim 5, wherein the maximum physical spacing is small enough to ensure that signals in the differential group of signals substantially cancel each other out when combined equally when first and second conductors are fabricated from high resistivity conductors.

7. The device of claim 6, wherein the high-resistivity conductors comprise a material selected from the group consisting of: ITO, metal-mesh, and silver nanowire.

8. The device of claim 1, wherein the differential group is one of a plurality of differential groups and the device is configured such that the plurality of differential groups are remapped between a first frame and a second frame.

9. The device of claim 8, configured such that the differential groups are remapped on a frame-by-frame basis.

10. The device of claim 1, wherein the differential group is one of a plurality of differential groups and the device is configured such that the plurality of differential groups are randomly remapped.

11. The device of claim 8, configured such that the remapping is biased according to at least one goal selected from a group consisting of: (a) to lessen a probability of a touch event being canceled by a substantially equal contribution from all of the first signals comprising a differential group; (b) to minimize a mean number of frames in which an undesired cancellation of a user-intended touch event occurs; and (c) to minimize a maximum number of sequential frames in which an undesired cancellation of a user-intended touch event might occur.

12. The device of claim 1, wherein the differential group is one of a plurality of differential groups and the device is configured such that the plurality of differential groups are remapped according to a predetermined pattern.

13. The device of claim 2, configured such that the signals in the differential group are remapped on a frame-by-frame basis.

14. The device of claim 1, configured such that the signals in the differential group are remapped randomly.

15. The device of claim 1, configured such that the signals in the differential group are remapped according to a predetermined pattern.

16. The device of claim 1, wherein the touch processor is configured to determine whether a user is touching the touch interface with a body part other than and larger than a user's finger, and thus causing an extended-area touch event.

17. The device of claim 16, configured such that at least one differential group is mapped to the first conductors that correspond with an extended-area touch event.

18. The device of claim 17, wherein the device is configured to provide sufficient physical spacing of the first conductors comprising the at least one differential group to allow for individual touch events to register on the first conductors.

19. The device of claim 1, wherein the signals in the differential group substantially mitigate each other when combined equally.

20. The device of claim 1, wherein the touch processor is configured to identify a touch event by a change in phase shift of a received second signal when and where a first conductor and second conductor are simultaneously touched.

21. The device of claim 1, wherein the touch processor is configured to identify a touch event by a change in received signal strength of a first signal of a differential group on a second conductor when and where a first conductor and second conductor are simultaneously touched.

22. The device of claim 21, configured such that a touch event decreases a first signal's contribution to the combined signals received on a second conductor and the touch processor is configured to determine that a touch event has occurred on a particular first conductor of the differential group by measuring a combined signal and inferring which signal has decreased.

23. The device of claim 21, configured such that a touch event changes phase of a first signal's contribution to the combined signals received on a second conductor and the touch processor is configured to determine that a touch event has occurred on a particular first conductor of a differential group by measuring a combined second signal and inferring which first signal has changed phase.

24. The device of claim 1, wherein the touch processor is configured to identify a touch event on the touch interface by processing signals present on a plurality of the second conductors.

25. The device of claim 1, further comprising a second signal generator configured to transmit first and second unique orthogonal second signals on first and second second conductors, wherein the touch processor is further configured to identify the touch event on the touch interface by processing signals present on at least one of the first conductors.

26. The device of claim 25, wherein the second signal generator is further configured to transmit a third second signal on a third column second conductor, the third second signal and the first unique orthogonal column second signal being part of a differential group.

27. The device of claim 1, further configured to transmit at least two differential groups on the first conductors.

28. The device of claim 1, further configured to transmit at least three differential groups of signals on the first conductors.

29. A non-transitory computer readable medium having code for use in identifying touch events on a touch sensitive device having first conductors, second conductors and a signals generator, the touch sensitive device identifying a touch events by processing signals present on at least one of the second conductors, the computer readable medium comprising:
  code for causing the signals generator to transmit a plurality of unique orthogonal signals on a first plurality of first conductors, respectively;
  code for causing the signals generator to transmit, concurrently with the transmission of the plurality of unique orthogonal signals, a plurality of first signals on a second plurality of first conductors, respectively, wherein respective ones of the plurality of first signals and ones of the plurality of unique orthogonal signals are part of a differential group, wherein the differential group comprises at least one conductor from the first plurality of first conductors and one conductor from the second plurality of first conductors, wherein the at least one conductor from the first plurality of first conductors and the one conductor from the second plurality of first conductors are spaced apart by a minimum physical spacing that maintains a minimum physical distance between conductors of the first differential group, and the conductors of the first differential group are non-adjacent and at least more than one conductor apart.

30. The computer readable medium of claim 29, wherein the unique orthogonal signals are orthogonal in at least one aspect selected from the group consisting of: time, frequency, and code.

31. The computer readable medium of claim 29, wherein the signals in the differential group mitigate each other when combined equally, whereby cross-talk interference is substantially reduced.

32. The computer readable medium of claim 29, wherein the differential group is one of a plurality of differential groups and the plurality of differential groups are remapped between a first frame and a second frame.

33. The computer readable medium of claim 32, further comprising code for remapping the differential groups on a frame-by-frame basis.

34. The computer readable medium of claim 29, wherein the differential group is one of a plurality of differential groups and the computer readable medium further comprises code remapping the plurality of differential groups according to a predetermined pattern.

35. The computer readable medium of claim 33, further comprising code for generating the predetermined pattern according to at least one goal selected from a group consisting of: (a) to lessen a probability of a touch event being canceled by a substantially equal contribution from all of the first signals comprising a differential group; (b) to minimize a mean number of frames in which an undesired cancellation of a user-intended touch event occurs; and (c) to minimize the maximum number of sequential frames in which an undesired cancellation of a user-intended touch event might occur.

36. The computer readable medium of claim 29, further comprising code for remapping the signals in the differential group on a frame-by-frame basis.

37. The computer readable medium of claim 29, further comprising code for determining whether a user is touching the touch interface with a body part other than and larger than a user's finger.

38. The computer readable medium of claim 37, wherein first signals within the differential group that correspond with an extended-area touch event are mapped onto a location of the user's body part for improved palm rejection.

* * * * *